US012774396B2

(12) United States Patent
Pojman et al.

(10) Patent No.: US 12,774,396 B2
(45) Date of Patent: Oct. 27, 2026

(54) CURE-ON-DEMAND COATINGS

(71) Applicants: John Anthony Pojman, Baton Rouge, LA (US); Daniel Paul Gary, Sulphur, LA (US)

(72) Inventors: John Anthony Pojman, Baton Rouge, LA (US); Daniel Paul Gary, Sulphur, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 947 days.

(21) Appl. No.: 18/058,352

(22) Filed: Nov. 23, 2022

(65) Prior Publication Data

US 2023/0265311 A1 Aug. 24, 2023

Related U.S. Application Data

(60) Provisional application No. 63/283,057, filed on Nov. 24, 2021.

(51) Int. Cl.

| | |
|---|---|
| ***C09D 7/61*** | (2018.01) |
| ***B05D 3/02*** | (2006.01) |
| ***B05D 3/10*** | (2006.01) |
| ***B05D 7/14*** | (2006.01) |
| ***C08K 3/04*** | (2006.01) |
| ***C08K 3/36*** | (2006.01) |
| ***C08K 5/14*** | (2006.01) |
| ***C08L 33/10*** | (2006.01) |
| ***C09D 7/63*** | (2018.01) |
| ***C09D 133/10*** | (2006.01) |

(52) U.S. Cl.

CPC ......... *C09D 133/10* (2013.01); *B05D 3/0254* (2013.01); *B05D 3/108* (2013.01); *B05D 7/14* (2013.01); *C08K 3/04* (2013.01); *C08K 3/36* (2013.01); *C08K 5/14* (2013.01); *C08L 33/10* (2013.01); *C09D 7/61* (2018.01); *C09D 7/63* (2018.01); *B05D 2202/15* (2013.01); *B05D 2502/00* (2013.01); *B05D 2601/22* (2013.01); *C08L 2312/00* (2013.01)

(58) Field of Classification Search

CPC .......... C09D 133/10; C09D 7/61; C09D 7/63; C08K 3/36; C08K 3/04

USPC .......................................................... 524/560

See application file for complete search history.

(56) References Cited

U.S. PATENT DOCUMENTS

| | | | | |
|---|---|---|---|---|
| 2010/0143730 A1* | 6/2010 | Tai | C23C 18/32 427/430.1 |
| 2011/0195237 A1* | 8/2011 | Patel | B33Y 30/00 430/284.1 |
| 2015/0352782 A1* | 12/2015 | Lisitsin | B29C 64/135 522/64 |
| 2019/0330464 A1* | 10/2019 | Ushiyama | C08L 101/00 |

FOREIGN PATENT DOCUMENTS

WO WO-2012045660 A1 * 4/2012 .......... G03F 7/0037

OTHER PUBLICATIONS

A. Javadi, et al. Cure-on-command technology: A review of the current state of the art. Progress in Organic Coatings 2016, 100, 2.

Bansal, et al., Frontal Polymerization of a Thin Film on a Wood Substrate. ACS Macro Letters 2020, 9, 169.

C. Nason, et al. The effect of a trithiol and inorganic fillers on the photo-induced thermal frontal polymerization of a triacrylate. Journal of Polymer Science Part A: Polymer Chemistry 2008, 46, 8091.

C. Nason, et al. UV-Induced Frontal Polymerization of Multifunctional (Meth)acrylates. Macromolecules 2005, 38, 5506.

J. A. Pojman, et al. Snell's law of refraction observed in thermal frontal polymerization. Chaos 2007, 17, 033125.

J. S. Young, et al. Photopolymers in orthopedics: characterization of novel crosslinked polyanhydrides. Macromolecular Chemistry and Physics 1998, 199, 1043.

K. F. Fazende, et al. Frontal Polymerization of Deep Eutectic Solvents Composed of Acrylic and Methacrylic Acids. Journal of Polymer Science Part A: Polymer Chemistry 2017, 55, 4046.

P. A. Sørensen, et al. Anticorrosive coatings: a review. Journal of Coatings Technology and Research 2009, 6, 135.

P. Garra, et al. Photopolymerization processes of thick films and in shadow areas: a review for the access to composites. Polymer Chemistry 2017, 8, 7088.

P. Garra, et al. Redox two-component initiated free radical and cationic polymerizations: Concepts, reactions and applications. 2019, 94, 33.

*Primary Examiner* — Deve V Hall

(74) *Attorney, Agent, or Firm* — Thomas Horstemeyer LLP.

(57) ABSTRACT

The present invention relates to a resin composition comprising 20-70 wt % of an aromatic di(meth)acrylate component; 5-25 wt % of a flexible di(meth)acrylate component; and 10-70 wt % of a crosslinker component; wherein the resin composition further comprises: 0.1-10 phr initiator; 0-10 phr silica; and 5-50 phr milled carbon fiber. The invention also relates to a polymerized coating disposed over a substrate, the coating comprising 20-70 wt % aromatic di(meth)acrylate subunits; 5-25 wt % flexible di(meth) acrylate subunits; and 10-70 wt % crosslinker subunits; wherein the coating further comprises: 0.1-10 phr silica; and 5-50 phr milled carbon fiber. The invention also relates to a method of depositing a coating over a substrate, the method comprising the steps of: providing a resin composition; applying the resin composition over a substrate; and polymerizing the resin composition to form a solid coating.

19 Claims, 44 Drawing Sheets
(31 of 44 Drawing Sheet(s) Filed in Color)

(56) References Cited

OTHER PUBLICATIONS

V. Viner; G. Viner. Effect of Filler Choice on a Binary Frontal Polymerization System. J. Phys. Chem. B 2011, 115, 21, 6862-6867.

* cited by examiner

| | | | | |
|---|---|---|---|---|
| 2 | 15 | 11 | 7 | 3 |
| 6 | 19 | 23 | 20 | 16 |
| 10 | 22 | 25 | 24 | 12 |
| 14 | 18 | 21 | 17 | 8 |
| 1 | 5 | 9 | 13 | 4 |

Figure 3

| MIL-PRF-24667C: Type; Composition [Service Lifetime] | VOC Content (lbs/gal) | Touch Dry; Full Service Cure | Pot Life | Volumentric Mix Ratio (Volumetric) |
|---|---|---|---|---|
| Type V Comp G [3 Years] | 0.77 | 4 Hours<br>10 Days | 1 Hour @ 73 °F | 4:1 |
| | 0.95 | 7 Days | 2 Hours @ 70 °F | 4.6:1 |
| Type II Comp G [3 Years] | 1.4 | 5 Hours<br>Not Provided | 2 Hours @ 70 °F | 5:1 |
| | 1.21 | 5 Hours<br>10 Days | 1 Hour @ 73 °F | 4:1 |
| | 0.77 | 4 Hours<br>10 Days | 1 Hour @ 73 °F | 3:1 |
| | 3.9 | 24 Hours | 8 Hours @ 70 °F | 9:1 |
| | 4 | 12 Hours<br>7 Days | 2 Hours @ 70 °F | 5.7:1 |
| | 1 | 12 Hours<br>7 Days | 2 Hours @ 70 °F | 6.7:1 |
| | 1.6 | 12 Hours<br>7 Days | 4 Hours @ 70 °F | 7.9:1 |
| Type VI Comp G [1 Year] | 0.9 | 9 Hours<br>3 Days | 2 Hours @ 70 °F | 3.4:1 |
| Type VIII Comp G [1 Year] | 0.75 | 3 Hours<br>2 Days | 25 mins @ 77 °F | 4:1 |
| | 0.3 | 12 Hours<br>4 Days | 45 mins @ 70 °F | 3:1 |
| Type VII Comp G or L [30 Days] | 0.75 | 8 Hours<br>1 Day | 30 mins @ 73 °F | 5::1 |
| | 0.3 | 16 Hours<br>6 Days | 45 mins @ 70 °F | 2.9:1 |

Figure 28

CURE-ON-DEMAND COATINGS

CROSS-REFERENCE TO RELATED APPLICATIONS

This application claims priority under 35 U.S.C. § 119(e) to U.S. Provisional Application No. 62/283,057, filed Nov. 24, 2021, which is hereby incorporated by reference in its entirety.

STATEMENT REGARDING FEDERALLY SPONSORED RESEARCH OR DEVELOPMENT

This invention was made with government support under Contract No. N00174-20-1-0018 awarded by the Department of Defense. The government has certain rights in the invention.

BACKGROUND OF THE INVENTION

Cure-on-demand technology can be used to combat challenges in the development and application of coatings. Current coatings often require two-part mixing for application, long cure times, and the release of volatile organic components (VOCs). Cure-on demand technology includes traditional systems such as acrylate and epoxy-based formulations (A. Javadi, et al. Progress in Organic Coatings 2016, 100, 2). A moisture-cured urethane-based sealant utilized an encapsulated catalyst to control moisture release to reduce cure time to less than 24 hours (R. Keledjian & R. Lin. U.S. Pat. No. 9,518,197). Redox initiated polymerization can also be used to rapidly prepare materials such as coatings and composites. However, two-part mixing is required as well as the use of metal-based catalysts (P. Garra, et al. Progress in Polymer Science 2019, 94, 33).

Photocuring can be used to cure coatings rapidly, but the inner filter effect limits through-cure of thicker samples. In addition to thickness, the presence of fillers and or pigments impedes light penetration thereby reducing the curing of the material (P. Garra, et al. Polymer Chemistry 2017, 8, 7088). Such challenges can make photocuring a difficult process in the curing of nonskid coatings which are often thick and highly filled. A post thermal cure is a potential way to overcome this issue, but it requires additional time and resources (C. Chen, et al., In: Paint and Coatings Industry; IntechOpen, 2018).

Corrosion of maritime vessels is a significant economic and environmental issue. The annual cost of corrosion is estimated to constitute a significant percentage of the gross national product of the western world (P. A. Sorensen, et al. Journal of Coatings Technology and Research 2009, 6, 135). In addition, more drag on ships leads to higher fuel costs and more burning of fossil fuels. In addition to economics, corrosion failures have led to loss of life, such examples include collapse of bridges, airline accidents, and ruptures in pipes. Due these large economic and safety concerns, significant research and product development is done to protect against corrosion.

There is a need in the art for compositions and methods for cure-on-demand coatings. The present invention satisfies this unmet need.

SUMMARY OF THE INVENTION

In one aspect, the present invention relates to a resin composition comprising 20-70 wt % of a aromatic di(meth) acrylate component; 5-25 wt % of a flexible di(meth)

acrylate component; and 10-70 wt % of a crosslinker component; wherein the resin composition further comprises: 0.1-10 phr initiator; 0-10 phr silica; and 5-50 phr milled carbon fiber. In one embodiment, the resin composition comprises 40-50 wt % aromatic di(meth)acrylate component; 10-20 wt % flexible di(meth)acrylate component; and 30-50 wt % crosslinker component. In one embodiment, the resin composition further comprises 10-100 phr non-skid component. In one embodiment, the non-skid component comprises crushed/milled glass, silica, or aluminum oxide.

In one embodiment, the aromatic di(meth)acrylate component comprises a bisphenol A epoxy diacrylate, a bisphenol A epoxy dimethacrylate, ethoxylated bisphenol diacrylate, propoxylated bisphenol diacrylate, ethoxylated bisphenol A diacrylate, propoxylated bisphenol A diacrylate, ethoxylated bisphenol F diacrylate, propoxylated bisphenol F diacrylate, ethoxylated bisphenol S diacrylate, or propoxylated bisphenol S diacrylate. In one embodiment, flexible di(meth)acrylate component comprises at least one diacrylate or dimethacrylate ester of a substituted or unsubstituted, linear or branched, diol selected from aliphatic diols containing 3 to 18 carbon atoms, polyalkylene ether glycols containing 3 to 50 carbon atoms, cycloaliphatic diols containing about 4 to 18 carbon atoms, and combinations thereof. In one embodiment, the flexible di(meth)acrylate component is selected from the group consisting of polyethylene glycol-200-diacrylate, polyethylene glycol-400-diacrylate, polyethylene glycol-600-diacrylate, glyceryl ethoxylate diacrylate, glyceryl propoxylate diacrylate, hexanediol diacrylate, hydroxypivalic acid neopentanediol diacrylate, monomethoxy trimethylolpropane ethoxylate diacrylate, pentaerythritol diacrylate, polycaprolactone diol diacrylate, polypropylene glycol diacrylate, propoxylated trimethylolpropane diacrylate, tetraethylene glycol diacrylate, tetraethylene glycol dimethacrylate, tetrapropylene glycol diacrylate, thiodiethanol diacrylate, triethylene glycol diacrylate, triethylene glycol dimethacrylate, trimethylolpropane diacrylate, trimethylolpropane ethoxy triacrylate, tripropylene glycol diacrylate, and combinations, oligomers, co-polymers, and block co-polymers thereof. In one embodiment, the crosslinker component comprises a multifunctional (meth)acrylate compound having three or more (meth) acrylate moieties. In one embodiment, the crosslinker component comprises a multifunctional (meth)acrylate compound selected from the group consisting of dimethylolpropane tetraacrylate, dipentaerythritol ethoxylate pentaacrylate, dipentaerythritol hexaacrylate, dipentaerythritol hexamethacrylate, dipentaerythritol pentaacrylate, dipentaerythritol propoxylate pentaacrylate, ditrimethylolpropane ethoxylate tetraacrylate, ethoxy pentaerythritol triacrylate, ethoxy trimethylolpropane triacrylate, ethoxylated (15) trimethylolpropane triacrylate, ethoxylated (20) trimethylolpropane triacrylate, ethoxylated (3) trimethylolpropane triacrylate, ethoxylated (6) trimethylolpropane triacrylate, ethoxylated (9) trimethylolpropane triacrylate, ethoxylated glycerol triacrylate, ethoxylated pentaerythritol tetraacrylate, ethoxylated pentaerythritol triacrylate, glycerol propoxylate triacrylate, glycerol propoxylate trimethacrylate, glycerol triacrylate, glycerol trimethacrylate, glyceryl ethoxylate triacrylate, pentaerythritol tetraacrylate, pentaerythritol tetramethacrylate, pentaerythritol triacrylate, pentaerythritol trimethacrylate, sorbitol triacrylate, sorbitol trimethacrylate, sucrose pentaacrylate, sucrose tetraacrylate, sucrose triacrylate, trimethylolethane triacrylate, rimethylolpropane ethoxylate triacrylate, trimethylolpropane propoxylate triacrylate, and combinations, oligomers, copolymers, and block co-polymers thereof.

In one embodiment, the silica component comprises fumed silica, precipitated silica, silica sol, silica gel, or pyrogenic silica. In one embodiment, the initiator comprises 1,1-bis(t-butylperoxy)-3,3,5-trimethylcyclohexane.

In another aspect, the present invention relates to a polymerized coating disposed over a substrate, the coating comprising: 20-70 wt % aromatic di(meth)acrylate subunits; 5-25 wt % flexible di(meth)acrylate subunits; and 10-70 wt % crosslinker subunits; wherein the coating further comprises: 0.1-10 phr silica; and 5-50 phr milled carbon fiber. In one embodiment, the coating further comprises a non-skid component selected from the group consisting of crushed/milled glass, silica, and aluminum oxide. In one embodiment, substrate comprises steel from a maritime vessel. In one embodiment, the coating has a coefficient of friction greater than 1.7 when dry, and a coefficient of friction greater than 1.4 when wet.

In another aspect, the present invention relates to a method of depositing a coating over a substrate, the method comprising the steps of providing the resin composition described herein; applying the resin composition over a substrate; and polymerizing the resin composition to form a solid coating. In one embodiment, the method further comprises the step of adding a non-skid component to the resin composition, wherein the non-skid component is selected from the group consisting of crushed/milled glass, silica, and aluminum oxide. In one embodiment, the step of polymerizing the resin composition comprises the step of heating the resin composition to a temperature greater than 100° C.

BRIEF DESCRIPTION OF THE DRAWINGS

The following detailed description of embodiments of the invention will be better understood when read in conjunction with the appended drawings. It should be understood that the invention is not limited to the precise arrangements and instrumentalities of the embodiments shown in the drawings. The patent or application file contains at least one drawing executed in color. Copies of this patent or patent application publication with color drawing(s) will be provided by the Office upon request and payment of the necessary fee.

FIG. 3 is a diagram of the impact sequence for the impact test.

FIG. 28 is a chart showing cure times, pot lives, mix ratios, and VOC content of current nonskid coatings.

DETAILED DESCRIPTION

Figure 1:
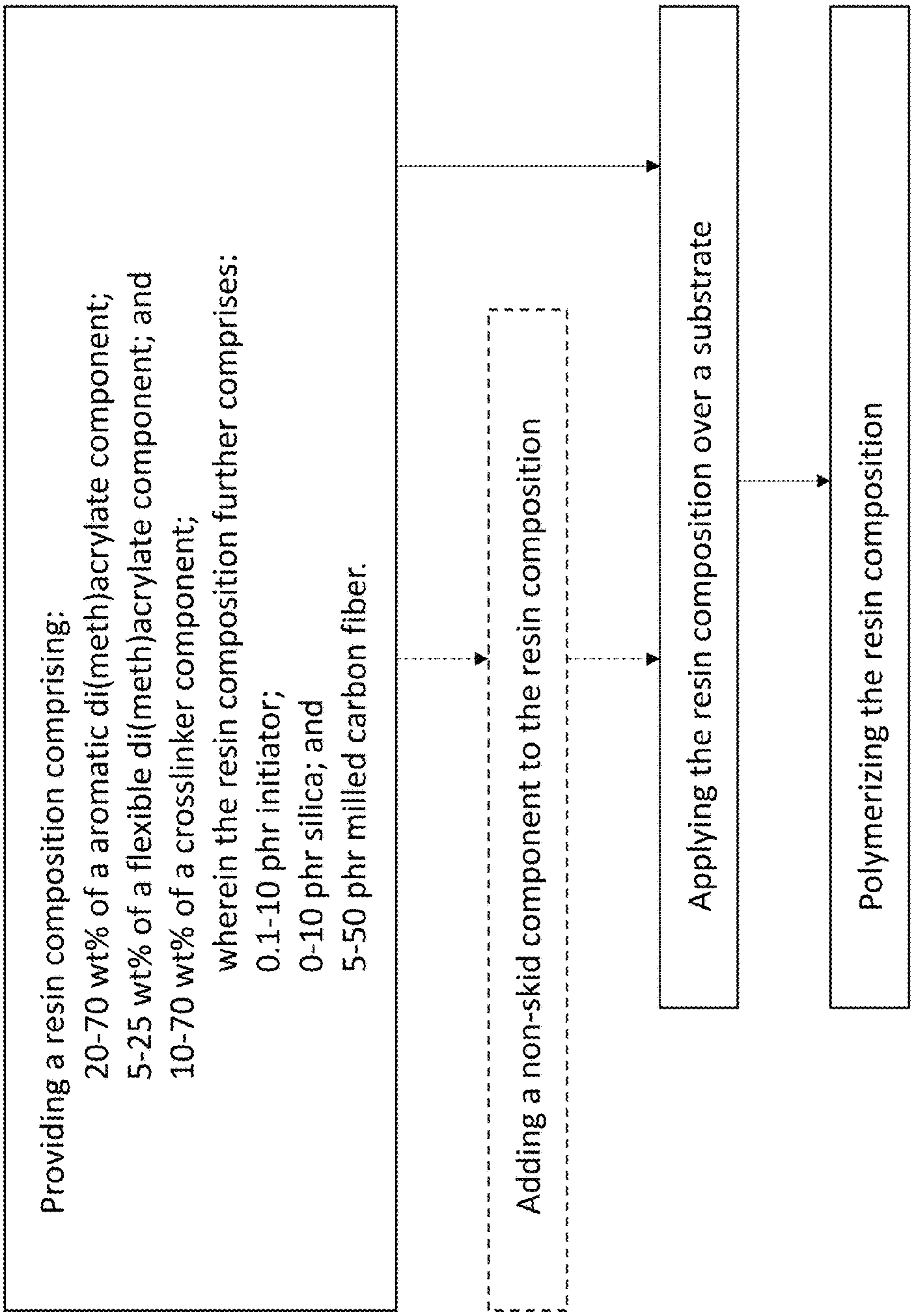
FIG. 1 is an exemplary method of depositing a coating over a substrate.

The present invention relates to compositions for cure-on-demand coatings and methods of applying said coatings.

Definitions

Unless defined otherwise, all technical and scientific terms used herein have the same meaning as commonly understood by one of ordinary skill in the art to which this invention belongs.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

As used herein, the term "alkyl," by itself or as part of another substituent means, unless otherwise stated, a straight or branched chain hydrocarbon having the number of carbon atoms designated (i.e. $C_{1-6}$ means one to six carbon atoms) and including straight, branched chain, or cyclic substituent groups. Examples include methyl, ethyl, propyl, isopropyl, butyl, isobutyl, tert-butyl, pentyl, neopentyl, hexyl, and cyclopropylmethyl.

As used herein, the term "substituted alkyl" means alkyl as defined above, substituted by one, two or three substituents selected from the group consisting of halogen, —OH, alkoxy, $—NH_2$, amino, azido, $—N(CH_3)_2$, —C(=O)OH, trifluoromethyl, —C≡N, $—C(=O)O(C_1-C_4)$alkyl, $—C(=O)NH_2$, $—SO_2NH_2$, $—C(=NH)NH_2$, and $—NO_2$. Examples of substituted alkyls include, but are not limited to, 2,2-difluoropropyl, 2-carboxycyclopentyl and 3-chloropropyl.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include $—O—CH_2—CH_2—CH_3$, $—CH_2—CH_2—CH_2—OH$, $—CH_2—CH_2—NH—CH_3$, $—CH_2—S—CH_2—CH_3$, and $—CH_2CH_2—S(=O)—CH_3$. Up to two heteroatoms may be consecutive, such as, for example, $—CH_2—NH—OCH_3$, or $—CH_2—CH_2—S—S—CH_3$ As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers.

As used herein, the term "halo" or "halogen" alone or as part of another substituent means, unless otherwise stated, a fluorine, chlorine, bromine, or iodine atom.

As used herein, the term "cycloalkyl" refers to a mono cyclic or polycyclic non-aromatic radical, wherein each of the atoms forming the ring (i.e. skeletal atoms) is a carbon atom. In one embodiment, the cycloalkyl group is saturated or partially unsaturated. In another embodiment, the cycloalkyl group is fused with an aromatic ring. Cycloalkyl groups include groups having from 3 to 10 ring atoms. Illustrative examples of cycloalkyl groups include, but are not limited to, the following moieties:

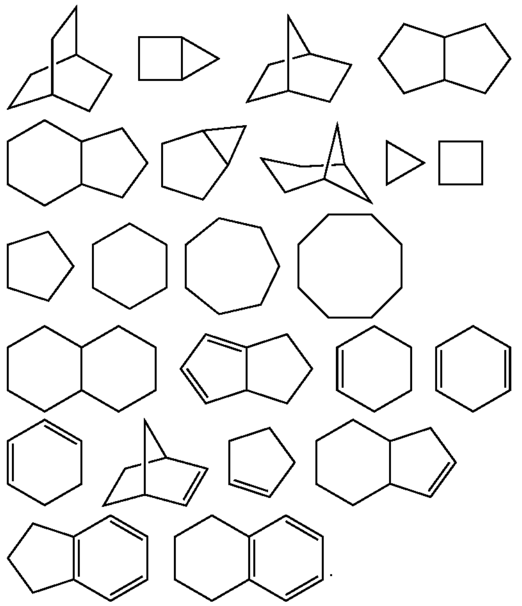

Monocyclic cycloalkyls include, but are not limited to, cyclopropyl, cyclobutyl, cyclopentyl, cyclohexyl, cycloheptyl, and cyclooctyl. Dicyclic cycloalkyls include, but are not limited to, tetrahydronaphthyl, indanyl, and tetrahydropentalene. Polycyclic cycloalkyls include adamantine and norbornane. The term cycloalkyl includes "unsaturated nonaromatic carbocyclyl" or "nonaromatic unsaturated carbocyclyl" groups, both of which refer to a nonaromatic carbocycle as defined herein, which contains at least one carbon double bond or one carbon triple bond.

As used herein, the term "heterocycloalkyl" or "heterocyclyl" refers to a cyclic group containing one to four ring heteroatoms each selected from O, S, and N. In one embodiment, each heterocycloalkyl group has from 4 to 10 atoms in its ring system, with the proviso that the ring of said group does not contain two adjacent O atoms. In another embodiment, the heterocycloalkyl group is fused with an aromatic ring. In one embodiment, the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

An example of a 3-membered heterocycloalkyl group includes, and is not limited to, aziridine. Examples of 4-membered heterocycloalkyl groups include, and are not limited to, azetidine and a beta lactam. Examples of 5-membered heterocycloalkyl groups include, and are not limited to, pyrrolidine, oxazolidine and thiazolidinedione. Examples of 6-membered heterocycloalkyl groups include, and are not limited to, piperidine, morpholine and piperazine. Other non-limiting examples of heterocycloalkyl groups are:

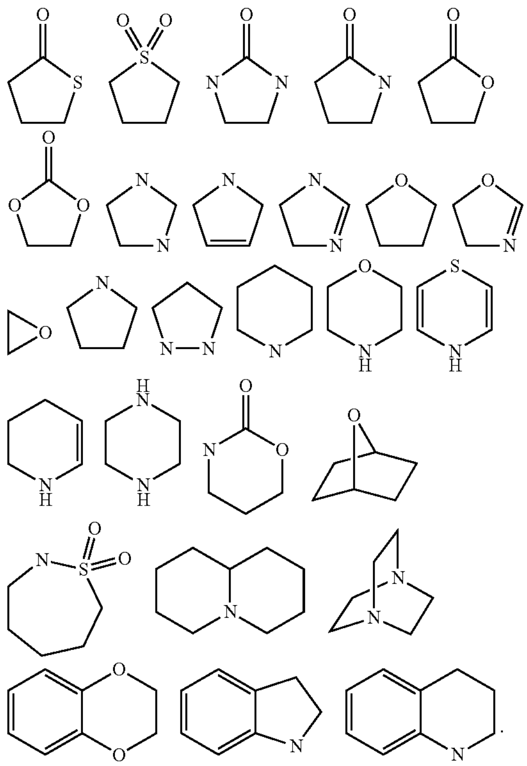

Examples of non-aromatic heterocycles include monocyclic groups such as aziridine, oxirane, thiirane, azetidine, oxetane, thietane, pyrrolidine, pyrroline, pyrazolidine, imidazoline, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin, and hexamethyleneoxide.

As used herein, the term "aromatic" refers to a carbocycle or heterocycle with one or more polyunsaturated rings and having aromatic character, i.e. having (4n+2) delocalized π (pi) electrons, where n is an integer.

As used herein, the term "aryl," employed alone or in combination with other terms, means, unless otherwise stated, a carbocyclic aromatic system containing one or more rings (typically one, two or three rings), wherein such rings may be attached together in a pendent manner, such as a biphenyl, or may be fused, such as naphthalene. Examples of aryl groups include phenyl, anthracyl, and naphthyl.

As used herein, the term "aryl-($C_1$-$C_3$)alkyl" means a functional group wherein a one- to three-carbon alkylene chain is attached to an aryl group, e.g., —$CH_2CH_2$—phenyl, —$CH_2$-phenyl (benzyl), aryl-$CH_2$— and aryl-CH($CH_3$)—. The term "substituted aryl-($C_1$-$C_3$)alkyl" means an aryl-($C_1$-$C_3$)alkyl functional group in which the aryl group is substituted. Similarly, the term "heteroaryl-($C_1$-$C_3$)alkyl" means a functional group wherein a one to three carbon alkylene chain is attached to a heteroaryl group, e.g., —$CH_2CH_2$-pyridyl. The term "substituted heteroaryl-($C_1$-$C_3$)alkyl" means a heteroaryl-($C_1$-$C_3$)alkyl functional group in which the heteroaryl group is substituted.

As used herein, the term "heteroaryl" or "heteroaromatic" refers to a heterocycle having aromatic character. A polycyclic heteroaryl may include one or more rings that are partially saturated. Examples include the following moieties:

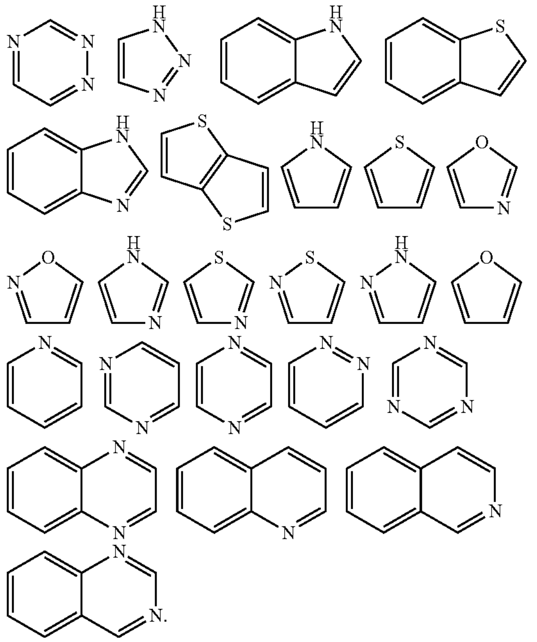

Examples of heteroaryl groups also include pyridyl, pyrazinyl, pyrimidinyl (particularly 2- and 4-pyrimidinyl), pyridazinyl, thienyl, furyl, pyrrolyl (particularly 2-pyrrolyl), imidazolyl, thiazolyl, oxazolyl, pyrazolyl (particularly 3- and 5-pyrazolyl), isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles and heteroaryls include indolyl (particularly 3-, 4-, 5-, 6- and 7-indolyl), indolinyl, quinolyl, tetrahydroquinolyl, isoquinolyl (particularly 1- and 5-isoquinolyl), 1,2,3,4-tetrahydroisoquinolyl, cinnolinyl, quinoxalinyl (particularly 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (particularly 3-, 4-, 5-, 6- and 7-benzofuryl), 2,3-dihydrobenzofuryl, 1,2-benzisoxazolyl, benzothienyl (particularly 3-, 4-, 5-, 6-, and 7-benzothienyl), benzoxazolyl, benzothiazolyl (particularly 2-benzothiazolyl and 5-benzothiazolyl), purinyl, benzimidazolyl (particularly 2-benzimidazolyl), benzotriazolyl, thioxanthenyl, carbazolyl, carbolinyl, acridinyl, pyrrolizidinyl, and quinolizidinyl.

As used herein, the term "substituted" means that an atom or group of atoms has replaced hydrogen as the substituent attached to another group. The term "substituted" further refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two.

As used herein, the term "optionally substituted" means that the referenced group may be substituted or unsubstituted. In one embodiment, the referenced group is optionally substituted with zero substituents, i.e., the referenced group is unsubstituted. In another embodiment, the referenced group is optionally substituted with one or more additional group(s) individually and independently selected from groups described herein.

In one embodiment, the substituents are independently selected from the group consisting of oxo, halogen, —CN, $—NH_2$, —OH, $—NH(CH_3)$, $—N(CH_3)_2$, alkyl (including straight chain, branched and/or unsaturated alkyl), substituted or unsubstituted cycloalkyl, substituted or unsubstituted heterocycloalkyl, fluoro alkyl, substituted or unsubstituted heteroalkyl, substituted or unsubstituted alkoxy, fluoroalkoxy, —S-alkyl, $S(=O)_2$ alkyl, $S(=O)_2N$[H, alkyl, or aryl], —C(=O)NH[substituted or unsubstituted alkyl, or substituted or unsubstituted phenyl], —C(=O)N[H or substituted or unsubstituted alkyl or aryl]2, —OC(=O)N[substituted or unsubstituted alkyl]2, —NHC(=O)NH[substituted or unsubstituted alkyl, or substituted or unsubstituted phenyl], —NHC(=O)alkyl, —N[substituted or unsubstituted alkyl]C(=O)[substituted or unsubstituted alkyl], —NHC(=O)[substituted or unsubstituted alkyl], —C(OH)[substituted or unsubstituted alkyl]2, and $—C(NH_2)$[substituted or unsubstituted alkyl]2. In another embodiment, by way of example, an optional substituent is selected from oxo, fluorine, chlorine, bromine, iodine, —CN, $—NH_2$, —OH, $—NH(CH_3)$, $—N(CH_3)_2$, $—CH_3$, $—CH_2CH_3$, $—CH(CH_3)_2$, $—CF_3$, $—CH_2CF_3$, $—OCH_3$, $—OCH_2CH_3$, $—OCH(CH_3)_2$, $—OCF_3$, $—OCH_2CF_3$, $—S(=O)_2—CH_3$, $—C(=O)NH_2$, $—C(=O)—NHCH_3$, $—NHC(=O)NHCH_3$, $—C(=O)CH_3$, $—ON(O)_2$, and —C(=O)OH. In yet one embodiment, the substituents are independently selected from the group consisting of $C_{1-6}$ alkyl, —OH, $C_{1-6}$ alkoxy, halo, amino, acetamido, oxo and nitro. As used herein, where a substituent is an alkyl or alkoxy group, the carbon chain may be branched, straight or cyclic.

Several references to integers and R, $R^1$, $R^2$, $R^3$, $R^4$, $R^5$, $R^6$, etc. are made in chemical structures and moieties disclosed and described herein. Any description of integers and R, $R^1$, $R^2$, $R^3$, $R^4$, $R^5$, $R^6$, etc. in the specification is applicable to any structure or moiety reciting integers and R, $R^1$, $R^2$, $R^3$, $R^4$, $R^5$, $R^6$, etc. respectively.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Compositions of the Invention

In one aspect, the present invention relates to a resin composition comprising 20-70 wt % of a aromatic di(meth) acrylate component, 5-25 wt % of a flexible di(meth)acrylate component; and 10-70 wt % of a crosslinker component; wherein the resin composition further comprises 0.1-10 phr initiator; 0-10 phr silica; and 5-50 phr milled carbon fiber.

In one embodiment, the aromatic di(meth)acrylate component comprises at least one diacrylate or dimethacrylate ester of a substituted or unsubstituted, linear or branched, diol having a backbone comprising at least one bisphenol moiety. The substituted diols may contain from 1 to 8 substituents independently selected from halo, hydroxy, oxo, $C_1$-$C_{10}$ alkyl, $C_2$-$C_{10}$ alkenyl, $C_6$-$C_{10}$ aryl, and $C_1$-$C_{10}$ alkoxy. The term "bisphenol", as used herein, is understood to mean any methylenediphenol, i.e., $HOC_6H_4CH_2C_6H_4OH$, such as, for example, p,p-methylenediphenol, and their substitution products, which are generally derived from condensation of two equivalent amounts of a phenol with an aldehyde or ketone. Thus, for example, the bisphenol moiety can be a bisphenol A residue originating from the reaction of bisphenol A with epichlorohydrin to produce the diglycidyl ether of bisphenol A, which may be reacted further with (meth)acrylic acid to produce a bisphenol A epoxy (meth)acrylate. Bisphenol epoxy acrylates typically do not have any free epoxy groups left from their synthesis but react through their acrylate ester end groups. Typically, the bisphenol epoxy acrylates of the present invention have molecular weights ranging from about 400 to about 1500, but higher or lower molecular weights can be used depending upon the specific coating formulation. These acrylates are well known to persons having ordinary skill in the art and many of them are commercially available. Commercial examples of such compounds include NOVACURE® 3701, EBECRYL® 3500, EBECRYL® 600 (available from UCB Chemicals), and CN117 and CN115 (available from Sartomer Company).

In addition to bisphenol A (4,4'-isopropylidenediphenol), examples of bisphenol moieties include, but are not limited to, bisphenol (p,p-methylenediphenol), bisphenol F (a mixture of 2,2'-, 2,4'-, and 4,4'-dihydroxydiphenylmethane), and bisphenol S (4,4'-dihydroxydiphenylsulfone). In one embodiment, the aromatic di(meth)acrylate component comprises at least one compound selected from bisphenol A epoxy diacrylates and diacrylate esters of ethoxylated bisphenol, propoxylated bisphenol, ethoxylated bisphenol A, propoxylated bisphenol A, ethoxylated bisphenol F, propoxylated bisphenol F, ethoxylated bisphenol S, and propoxylated bisphenol S. These materials are typically prepared by condensing a bisphenol with one or more equivalents of ethylene or propylene oxide to form an adduct followed by esterification with acrylic acid, methacrylic acid, their corresponding acid chlorides, or anhydrides. These compounds are known to persons skilled in the art and many are commercially available such as, for example, under the trade designations CD540, SR602, and SR349 from Sartomer Company.

Examples of commercially available aromatic di(meth) acrylate epoxies include those known by the trade designations Ebecryl® 600 (bisphenol A epoxy diacrylate of 525 molecular weight), Ebecryl® 629 (epoxy novolak acrylate of 550 molecular weight), Ebecryl® 860 (epoxidized soya oil acrylate of 1200 molecular weight), Ebecryl® 3700 (bisphenol A diacrylate of 524 molecular weight) and Ebecryl® 3720 (bisphenol A diacrylate of 524 molecular weight) available from UCB Chemical, Smyrna, GA; and PHOTOMER 3016 (bisphenol A epoxy acrylate), PHOTOMER 3038 (epoxy acrylate tripropylene glycol diacrylate blend), and PHOTOMER 3071 (modified bisphenol A acrylate, etc.) available from Henkel Corp., Hoboken, N.J. An example of epoxy (meth)acrylates that could be used include Ebecryl 3702 (a fatty acid modified bisphenol A epoxy diacrylate, Tg 56° C.), Ebecryl®3703 (an amine modified bisphenol A epoxy diacrylate, Tg 57° C.), Ebecryl® 3720 (a bisphenol A epoxy diacrylate, Tg 67° C.), Ebecryl 3721 (a modified bisphenol A epoxy diacrylate resin) from Allnex.

The resin composition comprises 20-70 wt % of the aromatic di(meth)acrylate component. In one embodiment, the resin composition comprises 30-60 wt % aromatic di(meth)acrylate. In one embodiment, the resin composition comprises 40-50 wt % aromatic di(meth)acrylate. In one embodiment, the resin composition comprises about 45 wt % aromatic di(meth)acrylate. In one embodiment, the resin composition comprises 30, 35, 40, 45, 50, 55, 60, 65, or 70 wt % aromatic di(meth)acrylate.

In one embodiment, the aromatic di(meth)acrylate component comprises a single aromatic di(meth)acrylate disclosed herein. In one embodiment, the aromatic di(meth) acrylate component comprises two or more aromatic di(meth)acrylates. In one embodiment, the aromatic di(meth)acrylate component comprises three or more aromatic di(meth)acrylates. In one embodiment, the aromatic di(meth)acrylate comprises a mixture, co-polymer, block co-polymer, or oligomer of more than one aromatic di(meth) acrylate compound.

For those embodiments wherein the aromatic di(meth) acrylate component comprises more than one aromatic di(meth)acrylate, any ratio or distribution of aromatic di(meth)acrylates is considered. In one embodiment, the resin composition comprises an equimolar amount of each aromatic di(meth)acrylate. In one embodiment the resin composition comprises an equal wt % of each aromatic di(meth) acrylate. However, any ratio between 0% and 100% of each aromatic di(meth)acrylate is similarly considered.

In one embodiment, the flexible di(meth)acrylate component comprises at least one diacrylate or dimethacrylate ester of a substituted or unsubstituted, linear or branched, diol selected from aliphatic diols containing 3 to 18 carbon atoms, polyalkylene ether glycols containing 3 to 50 carbon atoms, and cycloaliphatic diols containing about 4 to 18 carbon atoms. In one embodiment, the substituted diols comprise from 1 to 8 substituents independently selected from halo, hydroxy, oxo, $C_1$-$C_{10}$ alkyl, $C_2$-$C_{10}$ alkenyl, $C_6$-$C_{10}$ aryl, and $C_1$-$C_{10}$ alkoxy.

In one embodiment, the flexible di(meth)acrylate component is selected from the group consisting of 1,12-dodecanol diacrylate, 1,12-dodecanol dimethacrylate, 1,2-ethanediol diacrylate, 1,2-ethanediol diacrylate, 1,2-ethylene glycol diacrylate, 1,2-ethylene glycol dimethacrylate, 1,2-propanediol di(meth)acrylate, 1,3- and 1,4-cyclohexanedimethanol diacrylate and 2,2,4,4-tetramethyl-1,3-cyclobutanediol diacrylate (present as the pure cis or trans isomer or as a mixture of cis or trans isomers), 1,3 butylene glycol diacrylate, 1,3-propanediol diacrylate, 1,4 butane diol dimethacrylate, 1,4-butanediol diacrylate, 1,5-pentanediol, 1,6 hexane diol dimethacrylate, 1,6-hexanediol diacrylate, 2-(2-ethoxyethoxy) ethylacrylate, 2,2,4,4-tetramethyl-1,3-cyclobutanediol, 2,2,4-trimethyl-1,6-hexanediol, 2,2-bis(4-hydroxycyclohexyl)propane diacrylate, 2,2-dimethyl-1,3-propanediol diacrylate, 2-phenoxyethyl acrylate, 9-ethyleneglycol diacrylate, butanediol diacrylate, decamethylene glycol diacrylate, diethylene glycol diacrylate, diethyleneglycol dimethacrylate, dipolypropylene glycol diacrylate, ethoxylated hexanediol diacrylate, ethoxylated neopentyl glycol diacrylate, ethoxylated trimethylolpropane triacrylate, ethylene glycol diacrylate, ethyleneglycol dimethacrylate, glyceryl ethoxylate diacrylate, glyceryl propoxylate diacrylate, hexanediol diacrylate, hydroxypivalic acid neopentanediol diacrylate, lauryl acrylate, lauryl methacrylate, monomethoxy trimethylolpropane ethoxylate diacrylate, neopentyl glycol diacrylate, neopentyl glycol propoxylate diacrylate, neopentylglycol ethoxylate diacrylate, pentaerythritol diacrylate, polybutadiene diacrylate, polybutadiene dimethacrylate, polycaprolactone diol diacrylate, polyether polyols having a molecular weight up to about 3000, polyethylene glycol, polyethylene glycol diacrylate, polyethylene glycol diacrylate having a molecular weight up to about 3000, polyethylene glycol-200-diacrylate, polyethylene glycol-400-diacrylate, polyethylene glycol-600-diacrylate, polypropylene glycol diacrylate, propoxylated neopentyl glycol diacrylate, propoxylated trimethylolpropane diacrylate, tetraethylene glycol diacrylate, tetraethylene glycol dimethacrylate, tetrapropylene glycol diacrylate, thiodiethanol diacrylate, triethylene glycol diacrylate, triethylene glycol dimethacrylate, trimethylolpropane diacrylate, trimethylolpropane ethoxy triacrylate, tripropylene glycol diacrylate, and combinations, oligomers, co-polymers, and block co-polymers thereof.

In one embodiment, the flexible di(meth)acrylate component comprises a single flexible di(meth)acrylate disclosed herein. In one embodiment, the flexible di(meth)acrylate component comprises two or more flexible di(meth)acrylates. In one embodiment, the flexible di(meth)acrylate component comprises three or more flexible di(meth)acrylates.

The resin composition comprises 5-25 wt % of the flexible di(meth)acrylate component. In one embodiment, the resin composition comprises 7.5-22.5 wt % flexible di(meth)acrylate component. In one embodiment, the resin composition comprises 10-20 wt % flexible di(meth)acrylate component. In one embodiment, the resin composition comprises 12.5-17.5 wt % flexible di(meth)acrylate component. In one embodiment, the resin composition comprises about 15 wt % flexible di(meth)acrylate component. In one embodiment, the resin composition comprises 5, 7.5, 10, 12.5, 15, 17.5, 20, 22.5, or 25 wt % flexible di(meth)acrylate component.

For those embodiments wherein the flexible di(meth) acrylate component comprises more than one flexible di(meth)acrylate, any ratio or distribution of flexible di(meth) acrylates is considered. In one embodiment, the resin composition comprises an equimolar amount of each flexible di(meth)acrylate. In one embodiment the resin composition comprises an equal wt % of each flexible di(meth) acrylate. However, any ratio between 0% and 100% of each flexible di(meth)acrylate is similarly considered.

In one embodiment, the crosslinker comprises a multifunctional (meth)acrylate compound having three or more (meth)acrylate moieties. In one embodiment, the crosslinker comprises 3 to 5 (meth)acrylate groups. Exemplary multifunctional (meth)acrylate monomers include, but are not limited to, bistrimethylolpropane tetraacrylate, dimethylolpropane tetraacrylate, dimethylolpropane tetramethacrylate, dipentaerythritol ethoxylate pentaacrylate, dipentaerythritol hexaacrylate, dipentaerythritol hexamethacrylate, dipentaerythritol pentaacrylate, dipentaerythritol propoxylate pentaacrylate, ditrimethylolpropane ethoxylate tetraacrylate, ditrimethylolpropane tetraacrylate, ethoxy pentaerythritol tetraacrylate, ethoxy pentaerythritol triacrylate, ethoxy trimethylolpropane triacrylate, ethoxylated (15) trimethylolpropane triacrylate, ethoxylated (20) trimethylolpropane triacrylate, ethoxylated (3) trimethylolpropane triacrylate, ethoxylated (6) trimethylolpropane triacrylate, ethoxylated (9) trimethylolpropane triacrylate, ethoxylated dipentaerythritol hexaacrylate, ethoxylated glycerol triacrylate, ethoxylated pentaerythritol tetraacrylate, ethoxylated pentaerythritol triacrylate, ethoxylated pentaerythritol triacrylates, ethoxylated pentaerytritol tetraacrylate, ethoxylated trimethylolpropane triacrylate, ethoxylated trimethylolpropane trimethacrylate, glycerol propoxylate triacrylate, glycerol propoxylate trimethacrylate, glycerol triacrylate, glycerol trimethacrylate, glyceryl ethoxylate triacrylate, glyceryl propoxylate triacrylate, highly propoxylated (5.5) glycol triacrylate, pentaerythritol tetraacrylate, pentaerythritol tetramethacrylate, pentaerythritol triacrylate, pentaerythritol trimethacrylate, polyoxyethyltrimethylolpropane triacrylate, polyoxypropyltrimethylolpropane triacrylate, propoxylated (3) glycerol triacrylate, propoxylated (3) trimethylolpropane triacrylate, propoxylated (6) trimethylolpropane triacrylate, propoxylated dipentaerythritol hexaacrylate, propoxylated glycerol triacrylate, propoxylated pentaerythritol tetraacrylate, propoxylated pentaerythritol triacrylate, propoxylated trimethylol triacrylate, propoxylated trimethylolpropane triacrylate, sorbitol triacrylate, sorbitol trimethacrylate, sucrose pentaacrylate, sucrose pentamethacrylate, sucrose tetraacrylate, sucrose tetramethacrylate, sucrose triacrylate, sucrose trimethacrylate, trimethylolethane triacrylate, trimethylolethane trimethacrylate, trimethylolpropane ethoxylate triacrylate, trimethylolpropane propoxylate triacrylate, trimethylolpropane triacrylate, trimethylolpropane trimethacrylate, and combinations, oligomers, co-polymers, and block co-polymers thereof.

In one embodiment, the crosslinker comprises a single multifunctional (meth)acrylate disclosed herein. In one embodiment, the crosslinker component comprises two or more multifunctional (meth)acrylates. In one embodiment, the crosslinker component comprises three or more multifunctional (meth)acrylates.

The resin composition comprises 10-70 wt % of the crosslinker component. In one embodiment, the resin composition comprises 20-60 wt % crosslinker component. In one embodiment, the resin composition comprises 30-50 wt % crosslinker component. In one embodiment, the resin composition comprises 35-45 wt % crosslinker component. In one embodiment, the resin composition comprises about 40 wt % crosslinker component. In one embodiment, the resin composition comprises 10, 20, 30, 40, 50, 60, or 70 wt % flexible di(meth)acrylate component.

For those embodiments wherein the crosslinker component comprises more than one multifunctional (meth)acrylate, any ratio or distribution of multifunctional (meth) acrylates is considered. In one embodiment, the resin composition comprises an equimolar amount of each multifunctional (meth)acrylate. In one embodiment the resin composition comprises an equal wt % of each multifunctional (meth)acrylate. However, any ratio between 0% and 100% of each multifunctional (meth)acrylate is similarly considered.

For each component which is an acrylate component, the corresponding methacrylate is also considered. Further, for components having more than one acrylate component, any corresponding mixtures of acrylate and methacrylate are similarly considered. For example, the flexible di(meth) acrylate component may comprise any or all of tripropylene glycol diacrylate, tripropylene glycol dimethacrylate, and tripropylene glycol monoacrylate monomethacrylate.

In one embodiment, the initiator is a free radical initiator. Exemplary initiators include, but are not limited to, 3-hydroxy-1,1-dimethylbutyl peroxyneodecanoate, a-cumyl peroxyneodecanoate, 3-hydroxy-1,1-dimethylbutyl peroxyneoheptanoate, a-cumyl peroxyneoheptanoate, t-amyl peroxyneodecanoate, t-butyl peroxyneodecanoate, di(2-ethylhexyl) peroxydicarbonate, di(n-propyl) peroxydicarbonate, di(sec-butyl) peroxydicarbonate, t-butyl peroxyneoheptanoate, t-amyl peroxypivalate, t-butyl peroxypivalate, diisononanoyl peroxide, didodecanoyl peroxide, 3-hydroxy-1,1-dimethylbutylperoxy-2-, didecanoyl peroxide, 2,2'-azobis(isobutyronitrile), di(3-carboxypropionyl) peroxide, 2,5-dimethyl-2,5-di(2-ethylhexanoylperoxy)hexane, dibenzoyl peroxide, t-amylperoxy 2-ethylhexanoate, t-butylperoxy 2-ethylhexanoate, t-butyl peroxyisobutyrate, t-butyl peroxy-(cis-3-carboxy)propenoate, 1,1-di(t-amylperoxy)cyclohexane, 1,1-bis(t-butylperoxy)-3,3,5-trimethylcyclohexane, 1,1-di(t-butylperoxy)cyclohexane, tert-amyl peroxy 2-ethylhexyl carbonate, tert-butyl peroxy isopropyl carbonate, tert-butyl peroxy 2-ethylhexyl carbonate, polyether tetrakis(t-butylperoxycarbonate), 2,5-dimethyl-2,5-di(benzolyperoxy) hexane, t-amyl peroxyacetate, t-amyl peroxybenzoate, t-butyl peroxyisononanoate, t-butyl peroxyacetate, t-butyl peroxybenzoate, di-t-butyl diperoxyphthalate, 2,2-di(t-butylperoxy)butane, 2,2-di(t-amylperoxy)propane, n-butyl 4,4-di(t-butylperoxy)valerate, ethyl 3,3-di(t-amylperoxy) butyrate, ethyl 3,3-di(t-butylperoxy)butyrate, dicumyl peroxide, a,a'-bis(t-butylperoxy)diisopropylbenzene, 2,5-dimethyl-2,5-di(t-butylperoxy)hexane, di(t-amyl) peroxide, t-butyl a-cumyl peroxide, di(t-butyl) peroxide, 2,5-dimethyl-2,5-di(t-butylperoxy)-3-hexyne, and combinations thereof. In one embodiment, the intiator comprises two or more free radical initiator compounds.

The loading of initiator is between 0.1 and 10 phr. "phr" as used herein refers to parts per hundred parts resin, where the resin is the sum amount of aromatic (meth)acrylate component, flexible (meth)acrylate component, and crosslinker component). In one embodiment, the amount of initiator is 0.5-5 phr. In one embodiment, the amount of initiator is 0.75-2.5 phr. In one embodiment, the amount of initiator is about 0.5, 1, 1.5, 2, 2.5, 3, 3.5, 4, 4.5, 5, 5.5, 6, 6.5, 7, 7.5, 8, 8.5, 9, 9.5, or 10 phr.

In one embodiment, the silica comprises fumed silicas, precipitated silicas, silica sols, silica gels, pyrogenic silicas, silica compounds of natural or synthetic origin, aluminosilicates, smectites, magnesium silicates, clays, wollastonite, talc, mica, attapulgite, sepiolite, montmorillonite and/or bentonites.

In one embodiment, the silica is a hydrophilic silica. In one embodiment, the silica is a hydrophobically modified silica. In one embodiment, the surface of the silica is modified with at least one organic component, such as surface-modified silicas. Surface modification is understood to mean the chemical and/or physical attachment of organic components to the surface of the silica particles. In other words, in the case of surface-modified silicas, at least part of the surface of at least some of the silica particles is covered with the surface modifiers. In the present case, the silicas are silanized by reacting fumed silica with trimethylchlorosilane or trimethylsilanol or hexamethyldisilazane in a known manner, the trimethylsilyl groups being fixed on the surface of the silica.

In one embodiment, the silica has a specific surface area of at least 100 $m^2/g$. In one embodiment, the silica has a specific surface area of 100-300 $m^2/g$. In one embodiment, the silica has a specific surface area of 150-250 $m^2/g$. In one embodiment, the silica has a specific surface area of 175-225 $m^2/g$. In one embodiment, the silica has an average specific surface area of 100, 125, 150, 175, 200, 225, 250, 275, or 300 $m^2/g$.

The loading of silica is between 1 and 10 phr. In one embodiment, the amount of silica is 2-9 phr. In one embodiment, the amount of initiator is 3-8 phr. In one embodiment, the amount of initiator is 4-7 phr. In one embodiment, the amount of initiator is 5-6 phr. In one embodiment, the amount of initiator is about 1, 2, 3, 4, 5, 6, 7, 8, 9, or 10 phr.

The milled carbon fiber comprises any commercial or synthetic milled carbon fiber. In one embodiment, the milled carbon fiber is manufactured from polyacrylonitrile (PAN) precursor. In one embodiment, the milled carbon fiber comprises a commercial carbon fiber such as Zoltek® PX35. In one embodiment, milled carbon fiber comprises a high purity carbon fiber such as Zoltek® PX30. In one embodiment, milled carbon fiber comprises an oxidized PAN fiber such as Zoltek® OX. Though one manufacturer is described herein, any manufacturer of milled carbon fiber is similarly considered herein.

The loading of milled carbon fiber is between 5 and 50 phr. In one embodiment, the amount of milled carbon fiber is 10-40 phr. In one embodiment, the amount of milled carbon fiber is 15-30 phr. In one embodiment, the amount of milled carbon fiber is 15-25 phr. In one embodiment, the amount of milled carbon fiber is about 5, 10, 15, 20, 25, 30, 35, 40, 45, or 50 phr.

In one embodiment, the resin composition further comprises a non-skid component. In one embodiment, the non-skid component minimizes the slipperiness of any resulting polymer material formed form polymerization of the resin composition. In one embodiment, the non-skid material increases the coefficient of friction of a coating comprising the resin composition. In one embodiment, the non-skid material is a granular/particulate material. Exemplary non-skid materials include, but are not limited to crushed/milled glass, silica, aluminum oxide, and the like. In one embodiment, the resin composition comprises aluminum oxide. In one embodiment, the non-skid material is 14 mesh/16 grit. In one embodiment, the non-skid material is 30 mesh/36 grit. In one embodiment, the non-skid material is 46 mesh/54 grit. In one embodiment, the loading of non-skid component is between 0 and 200 phr. In one embodiment, the loading is between 10 and 100 phr. In one embodiment, the loading is about 25 phr or about 100 phr. In one embodiment, the amount of non-skid component is about 5, 10, 15, 20, 25, 30, 35, 40, 45, 50, 55, 60, 65, 70, 75, 80, 85, 90, 95, or 100 phr.

In one embodiment, the resin composition further comprises a filler. Examples of fillers useful herein include, but are not limited to, hollow or solid ceramic microspheres, clays, aluminum iron magnesium silicate, aluminum silicon oxide, aluminum silicate, calcium magnesium carbonate, calcium silicate hydrate, calcium carbonate, calcium metasilicate, silica anhydrite+kaolinite, magnesium aluminum silicate hydrate, magnesium aluminum silicate hydrate, magnesium silicate, magnesium silicate hydrate, silicon dioxide, silicon oxide, and mixtures thereof. The above list of compounds is not meant to be limiting and various other fillers known in the art are also considered and should be considered to be within the scope of this invention. In a further aspect, the average particle size of the filler is between 270 mesh (0.053 mm) and 400 mesh (0.037 mm) or is about 325 mesh (0.044 mm). In another aspect, the average particle size of the filler is 270 mesh, 300 mesh, 325 mesh, 350 mesh, 375 mesh, or 400 mesh, where any value can be a lower or upper endpoint of a range. In another aspect, the particle size of the filler is from 1 μm to 10 μm ($90^{th}$ percentile) or is 1, 2, 3, 4, 5, 6, 7, 8, 9, or 10 μm, or is about 7.7 μm, where any value can be a lower or upper endpoint of a range.

In one aspect, the filler loading is from 1 to 30 phr based on the total of reactive acrylates. In another aspect, the amount of filler can be 1, 5, 10, 15, 20, 25, or 30 phr. In any of these aspects, the filler can contribute to overall mechanical stability and strength of the anti-skid composition and can assist in reducing the drying time of the anti-skid composition. In a further aspect, the filler imparts increased chemical resistance to the anti-skid composition.

In one embodiment, the resin composition comprises a thickener. Various thickeners are contemplated. Examples of thickeners useful herein include, but are not limited to, cellulose and related polymers such as, for example, hydroxyethyl cellulose, hydroxypropyl cellulose, hydroxyethyl methyl cellulose, hydroxypropyl methyl cellulose, ethyl hydroxyethyl cellulose, carboxymethyl cellulose, and combinations thereof.

In one embodiment, the thickener can be from about 0.01 to 1 phr, or can be about 0.1 about 0.2, about 0.3, about 0.4, about 0.5, about 0.6, about 0.7, about 0.8, about 0.9, or about 1 phr. In one aspect, the thickener keeps the filler in suspension and/or prevents the filler from settling. In this aspect, preventing the filler from settling leads to a longer shelf life for the finished product.

In some aspects, the resin composition comprises plasticizer. Various phthalate and non-phthalate plasticizers are contemplated. In one aspect, the plasticizer is a non-phthalate plasticizer. In another aspect, the plasticizer sold under the trade names EASTMAN 168 ® (i.e., 1,4-benzenedicarboxylic acid, bis (2-ethylhexyl) ester) or BENZOFLEX® 2088 benzoate plasticizer manufactured by Eastman Chemical Company is useful as the plasticizer. In another aspect, K-FLEX® 500 dibenzoate plasticizer manufactured by Kalema is useful as the plasticizer. In one aspect, the plasticizer lowers the overall glass transition temperature of the composition without softening and/or weakening the mechanical stability of the composition.

Coatings of the Invention

In one aspect, the present invention relates in part to a polymerized coating comprising 20-70 wt % aromatic di(meth)acrylate subunits, 5-25 wt % flexible di(meth)acrylate subunits, and 10-70 wt % crosslinker subunits, wherein the coating further comprises 0.1-10 phr silica and 5-50 phr milled carbon fiber. The aromatic di(meth)acrylate subunits are formed from any aromatic di(meth)acrylate component disclosed herein. The flexible di(meth)acrylate subunits are formed from any flexible di(meth)acrylate components disclosed herein. The crosslinker subunits are formed from any crosslinker components disclosed herein.

In one embodiment, the coating further comprises a non-skid component as described herein. In one embodiment, the coating further comprises a filler component.

In one embodiment, the coating is disposed over a substrate. In one embodiment, the substrate is selected from the group consisting of wood, plastic (such as vinyl), metal, and the like. In one embodiment, the substrate comprises steel. In one embodiment, the substrate is the steel of a marine vessel. In one embodiment, the substrate is the steel of a metal storage tank. In one embodiment, the substrate is any steel which may be exposed to harsh conditions, such as seawater and caustic chemicals.

In one embodiment, an additional layer is disposed between the substrate and the coating of the present invention. In one embodiment, the additional layer comprises a primer which enhances the binding of the coating to the substrate. In one embodiment, the additional layer comprises an epoxy resin. There is no particular limit to the composition of the additional layer, and any primer material known in the art may be used.

In one embodiment, the coating is a non-skid coating. In one embodiment, the coating has a coefficient of friction (COF) value of greater than 1.4 when the coating is dry. In one embodiment, the dry coating has a COF of greater than 1.5. In one embodiment, the dry coating has a COF of greater than 1.6. In one embodiment, the dry coating has a COF of greater than 1.7. In one embodiment, the dry coating has a COF of greater than 1.8. In one embodiment, the dry coating has a COF great than or equal to 1.8.

In one embodiment, the coating has a coefficient of friction (COF) value of greater than 1.1 when the coating is wet. In one embodiment, the wet coating has a COF of greater than 1.2. In one embodiment, the wet coating has a COF of greater than 1.3. In one embodiment, the wet coating has a COF of greater than 1.4. In one embodiment, the wet coating has a COF of greater than 1.5. In one embodiment, the dry coating has a COF great than or equal to 1.5.

In one embodiment, the coating is resistant to impact. In one embodiment, the coating shows little or no wear upon repeated impact with a 4 lb weight.

In one embodiment, the coating shows no delamination or softening when submerged in any or all of ethanol, salt water, detergent, anti-freeze, or motor oil. In one embodiment, the coating offers resistance to oxidation of the substrate. In one embodiment, the coating prevents the substrate from rust.

Methods of the Invention

In one aspect, the present invention relates to a method of depositing a coating over a substrate. Exemplary method 100 is shown in FIG. 1. In step 110, a resin composition is provided, said composition comprising 20-70 wt % of an aromatic di(meth)acrylate component, 5-25 wt % of a flexible di(meth)acrylate component; and 10-70 wt % of a crosslinker component; wherein the resin composition further comprises 0.1-10 phr initiator; 0-10 phr silica; and 5-50 phr milled carbon fiber. In step 140, the resin composition is applied over the substrate. In step 170, the resin composition is polymerized to form a solid coating.

In one embodiment, the method further comprises step 120, in which a non-skid component is added to the resin composition. In one embodiment, the non-skid component can cause the solid coating to have enhanced non-skid properties. In one embodiment, the non-skid component has minimal impact on the strength of the resulting solid coating.

In one embodiment, the step of polymerizing the resin composition comprises the step of heating the resin composition to a temperature greater than 100° C. In one embodiment, the heat is applied using an infrared heater. In one embodiment, the heat is applied using an electric heater. In one embodiment, the heat is applied using a heat gun. In one embodiment, the heat is applied to the entire coating. In one embodiment, the heat is applied to a central portion of the coating and the remaining resin polymerizes via frontal polymerization.

In one embodiment, the step of polymerizing the resin composition further comprises the step of releasing less than 5 wt % volatile organic compounds (VOCs). In one embodiment, the resin composition and initiator are selected so that release of VOCs is minimized. In one embodiment, the weight loss of the coating upon polymerization is less than 10%. In one embodiment, the weight loss of the coating upon polymerization is less than 5%. In one embodiment, the weight loss of the coating upon polymerization is less than 4.9%, 4.8%, or 4.7%.

In one embodiment, the step of polymerizing the resin composition application on the substrate having a thickness of about 1000 μm and an area of about 6 inches by 4 inches requires a cure time of than 10 minutes. In one embodiment, the cure time is less than 9 minutes. In one embodiment, the cure time is less than 8 minutes. In one embodiment, the cure time is less than 7 minutes. In one embodiment, the cure time is about 6.5 minutes.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore are not to be construed as limiting in any way the remainder of the disclosure.

Example 1: Compositions for Frontal Polymerization of Cure-On-Demand Coatings Frontal Polymerization (FP) is a potential method that can the challenges of cure-on-demand coatings. In FP, a front propagates in a localized reaction zone in which monomer is converted into polymer as the front passes through an unstirred medium (J. A. Pojman, et al., Journal of the Chemical Society, Faraday Transactions 1996, 92, 2825). This method can be used to rapidly cure a highly filled and or thick coating without the drawbacks of photocuring.

Frontal polymerization was originally discovered by Chechilo and Enikolopyan in the 1970s (N. M. Chechilo, et al., Dokl. Akad. Nauk SSSR 1972, 204, 1180; N. M. Chechilo and N. S. Enikolopyan. Dokl. Phys. Chem. 1974, 214, 174; N. M. Chechilo and N. S. Enikolopyan. Dokl. Phys. Chem. 1975, 221, 392; N. M. Chechilo and N. S. Enikolopyan. Dokl. Phys. Chem. 1976, 230, 840) and then independently discovered by Pojman in the early 1990s (J. A. Pojman. J. Am. Chem. Soc. 1991, 113, 6284; J. A. Pojman, et al. J. Phys. Chem. 1992, 96, 7466; J. A. Pojman, et al. J. Am. Chem. Soc. 1993, 115, 11044; J. A. Pojman, et al. J. Polym. Sci. Part A: Polym Chem. 1995, 33, 643; J. A. Pojman, et al. Trends Polym. Sci. (Cambridge, U.K.) 1996, 4, 253; J. Pojman, et al. Int. J. Self-Propag. High-Temp. Synth. 1997, 6, 355; J. A. Pojman. 36th Aerospace Sciences Meeting, Reno, NV, 1998). Since its discovery, FP research has been extended to other areas such as ATRP (S. Bidali, et al, A. Mariani. e-Polymers 2003, 3), Deep Eutectic Solvents (J. D. Mota-Morales, et al. Journal of Materials Chemistry A 2013, 1; J. D. Mota-Morales, et al. Journal of Polymer Science Part A: Polymer Chemistry 2013, 51, 1767; K. F. Fazende, et al. Journal of Polymer Science Part A: Polymer Chemistry 2017, 55, 4046), hydrogels (R. P. Washington and O. Steinbock. Journal of the American Chemical Society 2001, 123, 7933), ROMP (A. Mariani, et al. Macromolecules 2001, 34, 6539), and Cationic-initiated polymerization (S. Scognamillo, et al., Journal of Polymer Science Part A: Polymer Chemistry 2010, 48, 2000). FP has been employed make thin films on wooden substrates (K. Bansal, et al., ACS Macro Letters 2020, 9, 169).

However, no work has demonstrated the use of FP to manufacture thin films on steel substrates. One of the drawbacks of FP is heat loss to the substrate which can be exacerbated more on steel and other substrates that absorb barrier properties. PETIA is a mixture of multifunctional acrylates that was used as a reactive diluent to reduce cure time, increase crosslink density, and maintain adhesion. Fumed silica is added to reduce buoyancy-driven connection. Zoltek® PX35 is a high aspect ratio milled carbon fiber filler used to reduce cracking from thermal stresses. The high crosslink density and choice of fillers minimize cure time and help provide a barrier against chemicals and corrosion. All materials were used as received. The chemical structures of monomers/oligomers, crosslinkers, and initiator are presented below.

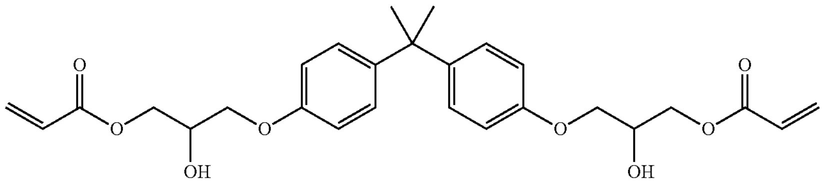

bisphenol A epoxy diacrylate

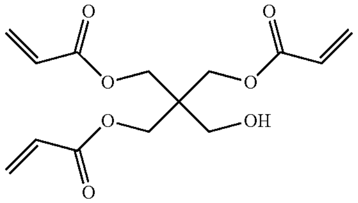

pentaerythritol triacylate

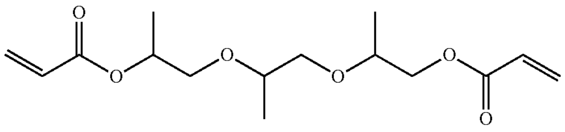

tripropyleneglycol diacrylate

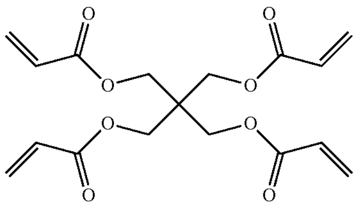

pentaerythritol tetracylate

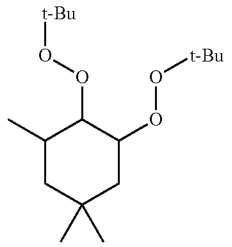

1,1-bis(tert-butylperoxy)
-3,3,5-tricyclohexane large amounts of heat. In addition to heat loss from the substrate, the addition of fillers results in further heat loss (C. Nason, et al. Journal of Polymer Science Part A: Polymer Chemistry 2008, 46, 8091). Because of this, it is difficult to maintain a front without continuous input of energy. In addition, buoyancy driven convection from the density difference between the formed polymer and resin creates an instability that can quench the front (K. F. Fazende, et al. Journal of Polymer Science Part A: Polymer Chemistry 2017, 55, 4046). Adding fillers to form a moldable putty is one way to eliminate buoyancy driven convection (J. A. Pojman, et al. Chaos 2007, 17, 033125; V. Viner and G. Viner. J Phys Chem B 2011, 115, 6862).

Described herein is a method of frontal polymerization to rapidly cure a novel non-skid cure-on-demand one-pot coating formulation for maritime usage. Unlike traditional FP, where the front self-propagates after initiation, the coating is continuously irradiated with heat to sustain FP. A base formulation consisting of Ebeceryl®605, a bisphenol A epoxy acrylate mixture, and PETIA (a 1:1 mixture of pentaerythritol triacrylate and pentaerythritol tetraacrylate) were used as the resin. Ebecryl®605 was chosen as the oligomer to impart adhesion to the epoxy primer and provide

Materials and Methods

Ebecryl®605 (75 wt % bisphenol A epoxy acrylate diluted with 25 wt % tripropylene glycol diacrylate) and pentaerythritol triacrylate (PETIA) were purchased from Allnex (Alpharetta, GA). 1,1-bis(tert-butylperoxy)-3,3,5-tricyclohexane (Luperox®231) was obtained from Sigma Aldrich. Fumed silica (Aerosil®200, 175-225 $m^2/g$ BET surface area) was obtained from Evonik Industries (Parsippany, NJ). Zoltek® PX35 (referred to as Zoltek or milled carbon fiber, 150×7.2 squared microns) was provided by Zoltek Companies, Inc. (St. Louis, MO). Aluminum oxide (16 grit, 14 mesh) was obtained from Floorguard Products, Inc. (Aurora, IL). Polygloss®90 (referred to simply as kaolin for the remainder of the paper) a kaolinite clay (0.4 microns) was obtained from KaMin performance minerals (Macon, GA). Hubercarb® Q3 (calcium carbonate, 3.2 microns median particle size) was purchased from Huber Materials (Quincy, IL) and Natural Minerals (Van Horn, TX), respectively. Natural seawater was obtained from the Gulf of Mexico (Gulf Shores, Al). Synthetic seawater (following ASTM D1141) was obtained from Grainger (Arlington, TX). Skilcraft®1064006 (nonionic liquid detergent)

was purchased from SkyGeek (LaGrangeville, NY). Ethanol (200 proof) was purchased from Koptek (King of Prussia, Pa). Castrol® GTX High Mileage (synthetic motor oil) was purchased from BP Lubricants USA, Inc (Wayne, NJ). AVL-TKS anti-icing de-icing fluid was purchased from Aviation Laboratories, Inc. (Houston, TX).

Figure 2:
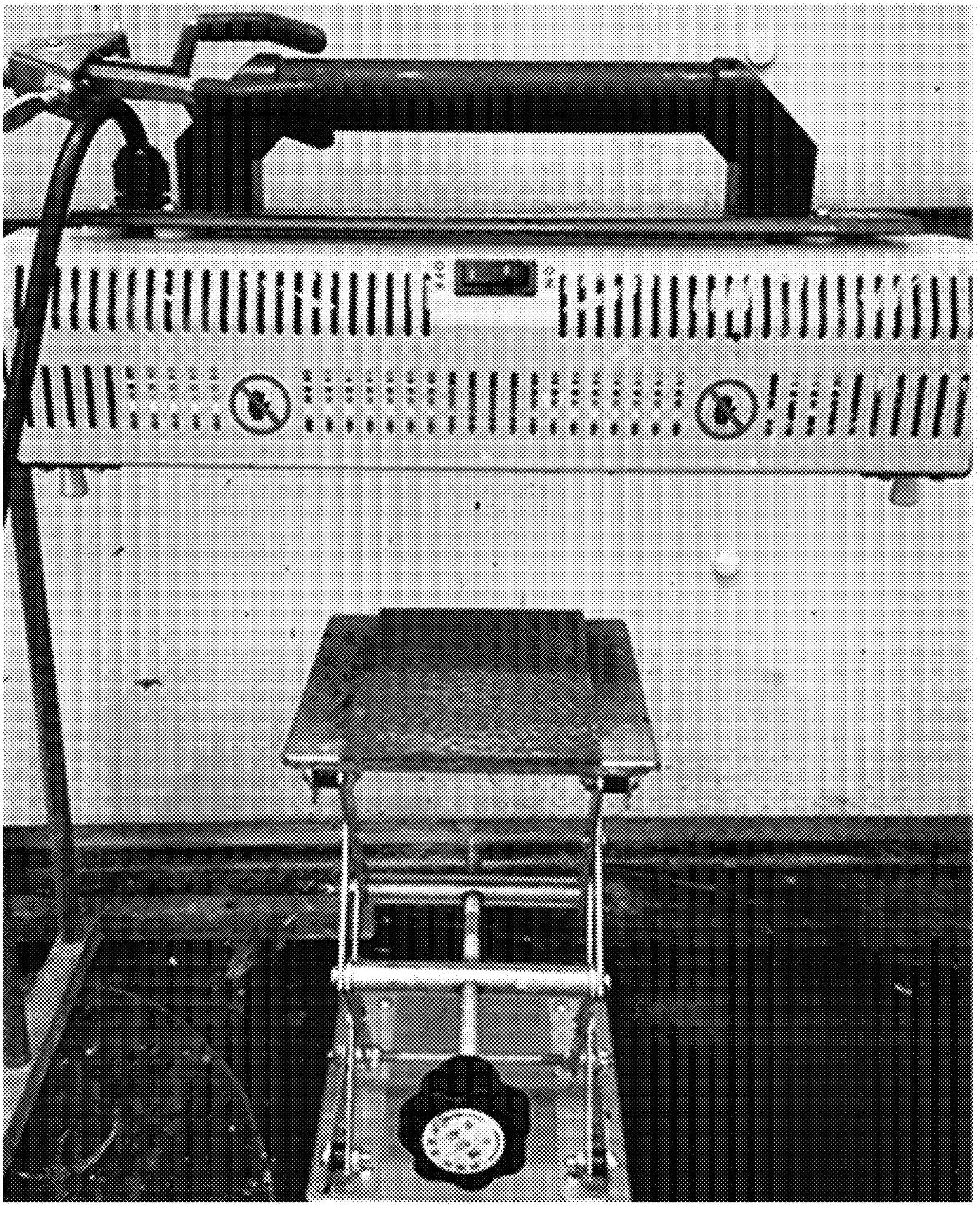
FIG. 2 is a photo of the general set-up for experiments.

Addition of fumed silica to reduce cure time: A resin consisting of Ebecryl®605 (60 wt %) and PETIA (40 wt %) was prepared and one parts per hundred resin (phr) of Luperox®231 was added. Phr refers to the amount of material added (in grams) for every 100 grams of resin. Various amounts of fumed silica were then added (0 to 5 phr). The formulations were mixed after the addition of each component. 6"×4"×1/8" steel panels primed with polyamine-cured epoxy (Seaguard™ 5000 HS, from Sherwin-Williams) were used as the substrates. The panels were previously primed, and all coatings in this work were applied after the overcoat window. The panels were sanded down using 60 grit sandpaper and then cleaned with ethanol before coating application. All surfaces disclosed herein were prepared in this manner. A drawdown bar (10 cm×2 cm) was used to apply the coatings to a wet film thickness of 1000 μm (40 mils). The curing of the coatings was initiated using an infrared heater (110 V, 15"×2.75") hanging from approximately 10 cm (4") above the coating. FIG. 2 shows the general experimental setup. Temperatures were recorded using an infrared thermometer, NUB®8500H. The thermometer laser was pointed towards the center of the coating surface from approximately 45 cm. A stopwatch is used to record time parameters. There is an apparent color change when the coating is done curing; each coating was probed to ensure a complete cure.

A resin consisting of 60 wt % Ebecryl®605 and 40 wt % PETIA was prepared and 1 part per hundred resin (phr) of Luperox®231 initiator was added. Phr refers to the amount of material in grams added for every 100 grams of resin. Various amounts of fumed silica were then added (0 to 5 phr). The formulations were mixed after the addition of each component. 6"×4"×1/8" steel panels primed with epoxy (Interbond® 998 from International Paint) were used as the substrate; the panels were sanded down using 60 grit sandpaper and then cleaned with ethanol before coating application. This surface preparation was used for all experiments described herein. A drawdown bar was used to apply the coatings to a wet film thickness of 1000 μm (40 mils). The curing of the coatings was initiated using an infrared heater hanging from approximately 4 inches above the coating. FIG. 2 shows the general experimental setup.

Fillers as additives to reduce internal stresses and prevent cracking: The resin and initiator were added as previously mentioned. A filler (milled carbon fiber, kaolin, or calcium carbonate) was added, and the formulation was then applied and cured as previously mentioned. For the milled carbon fiber formulations, the fillers were added in increments of 5 phr. 20 phr of filler was added for the kaolin and calcium carbonate-containing formulations. Fumed silica (5 phr) was then added. The formulations were mixed after the addition of each component.

Wet Film thickness: The resin and initiator were added as described earlier. Fumed silica (5 phr) was then added, and the formulation was mixed. The wet film thickness was controlled using a drawdown bar and varied from 250 μm to 1000 μm (10 to 40 mils).

Resin composition study: The composition of the resin mixture was varied from 0 to 100 wt % PETIA or Ebecryl®605. Fumed silica (5 phr) was added, and the formulation was mixed. The coatings were then applied (40 mils) and cured as previously mentioned.

Varying the distance of heat source: The distance between the infrared heater and panel was varied from 2" (5 cm) to 8" (20 cm). For these experiments, a resin consisting of Ebecryl®605 (60 wt %) and PETIA (40 wt %) was prepared and 1 part per hundred resin (phr) of Luperox®231 was added. 5 phr of fumed silica was added last and the formulations were mixed. Each coating was applied to the panel at a wet film thickness of 40 mils through the drawdown bar.

Preparation of nonskid coatings: A resin consisting of Ebecryl®605 (60 wt %) and PETIA (40 wt %) was prepared and 1 part per hundred resin (phr) of Luperox®231 was added. 20 phr of milled carbon fiber was added followed by fumed silica (5 phr). Initially, 100 phr of aluminum oxide was added (the preliminary non-skid), this was later reduced to 25 phr. The formulations were mixed after the addition of each component. The coating with 25 phr of aluminum oxide was applied on the substrate using a fiberglass aluminum alloy roller (11" total length). The roller (3"×0.75") had 1 mm deep groves. The preliminary non-skid was applied by a 2" flat edge paintbrush onto 6"×4"×1/8" primed panel. In the preparation of the non-skid for impact testing, the temperature of the panel surface not coated with non-skid is measured. A stopwatch is used to record the time. The curing of the coating is apparent with a color change. Each coating was probed to ensure a complete cure. The mass change of the resin between the wet and cured state was determined for the preliminary non-skid.

Impact testing: Impact testing was done following ASTM G14. A 4 lb. weight is dropped onto an indenter punch that is resting on the coated panel. A total of 25 impacts are made in a 3"×3" area using the sequence shown in FIG. 3. A 1" chisel is then used to remove any loosened nonskid around the impact zone. The number of connections between adjacent impacts is counted. The score is determined by multiplying the sum of these connections by 2.5 and then subtracting from 100. The total score reflects the percentage of intact coating remaining in between the impact sites. The coating formulation was applied in a 6"×6" area (one half of the panel) on a 12"×6"×1/8" primed panel. Two non-skid panels were impacted without treatment and four were impacted after treatment with synthetic salt water in accordance with ASTM D1141.

Chemical testing: Qualitative chemical testing was done to determine the relative resistance of the non-skid to various chemicals including ethanol, natural saltwater (obtained from Gulf Shores, Al), motor oil, detergent, and deicing-defrosting fluid. For each test, two non-skid coatings were prepared (see the preparation of non-skid for details) on 6"×4"×1/8" primed steel panels. One non-skid was impacted twice, with the impacts being four inches apart from each other and one inch from the edges. Each non-skid coating was placed in a beaker (1500 mL) and halfway submerged in each chemical; the beakers were then sealed with foil. The non-skid coatings were submerged for 24 hours in ethanol and deicing-defrosting fluid and four weeks in the seawater, motor oil, and detergent. After being removed, each non-skid was probed with a 1" chisel for loss of adhesion or softening of the coating. The unsubmerged and submerged parts were compared along with the impacted versus non-impacted coating. The coatings submerged in ethanol and deicing-defrosting fluid were given A six-hour recovery period before evaluation.

Flexibility Test: The flexibility was determined by bending over a 5" mandrel. The non-skid was prepared on 6"×3"× flexible steel prime panels. To test for flexibility, the nonskid panels were bent over the mandrel until cracking appeared. ridges of the non-skid profile ran parallel to the axis of the bend. Cracking within ½" of the edge was ignored. The degree of bending at which cracking appeared is recorded. The panels were then bent 20° over the mandrel. Cure parameters such as time and temperature are recorded like previously mentioned. All the panels were conditioned at room temperature for 24 hours before testing in accordance with ASTM F137.

The Results of the Experiments Will Now be Discussed

Figure 4:
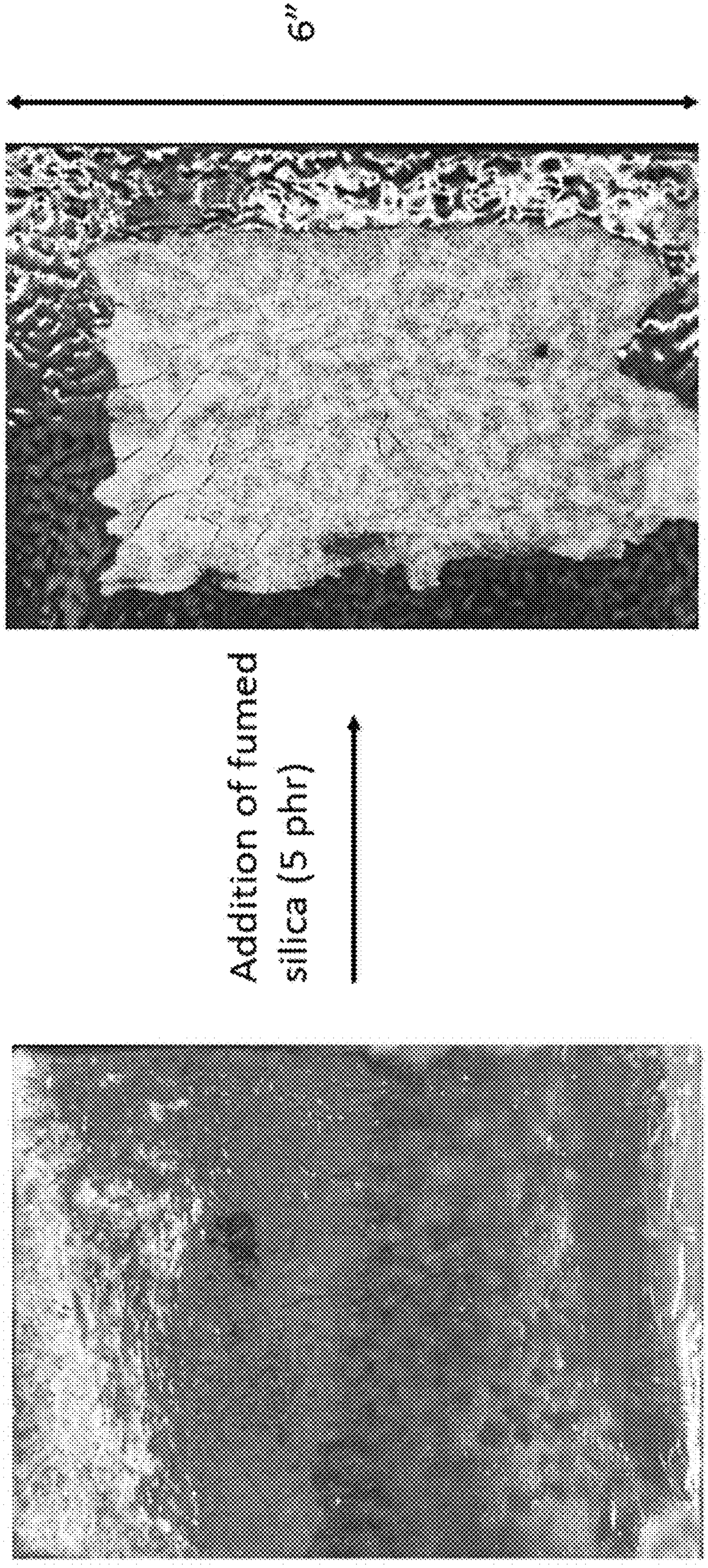
FIG. 4 is a photo of the unfilled coating after curing (right) and coating filled with fumed silica (left). Both coatings were cured when the substrate was 10 cm below the heater. The wet coating thickness is kept constant (40 mils) through a drawdown bar. Cracking is present in both coatings.

Base Formulation: The initial formulation consisted of the initiator and resin. As shown in FIG. 4, convection and spread of the resin occurred during curing. The resin spreads and form a thinner coating at the edges. These edges along with other areas required additional time to cure. This formulation could not support a front and overall cure time was in the 10-minute range.

Figure 5:
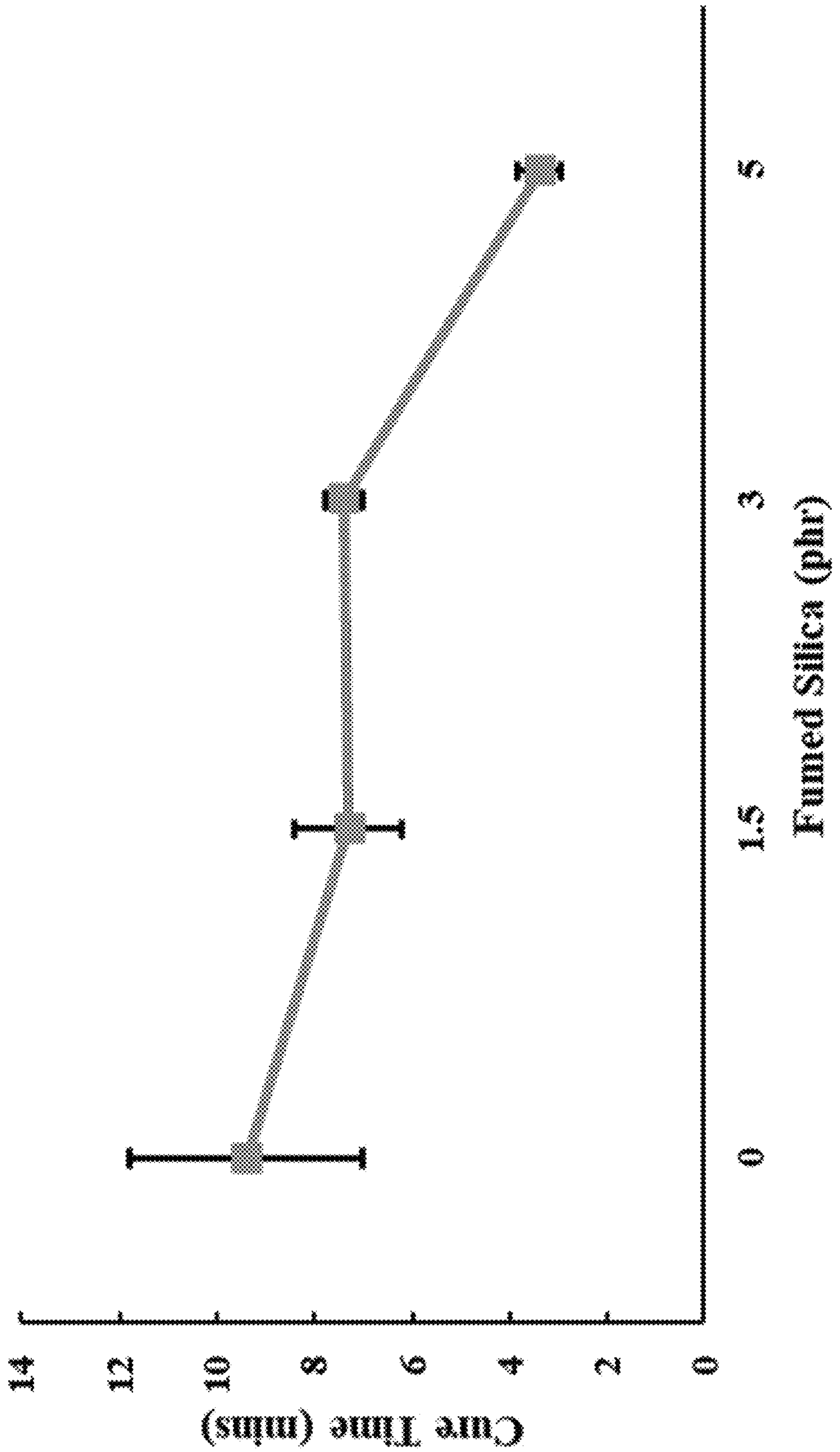
FIG. 5 is a plot of the effect of fumed silica loading on cure time of coatings.

Fumed silica was added to increase the viscosity and eliminate convection. As shown in FIG. 5, the cure time as a function of fumed silica loading is studied. The results demonstrate that the cure time decreases as the amount of fumed silica increases. 5 phr was the amount of fumed silica needed to eliminate convection and sustain a front. The average front start time was approximately two minutes with a temperature of 105° C. on the surface of the coating. The fronts could not be sustained without constant irradiation of heat. Despite this, the generation of fronts significantly reduced cure time. FIG. 4 shows the coating formed after the addition of fumed silica. The coating adheres to the substrate; however, cracking is apparent. These cracks were formed during the cure process and after as the coating cooled to ambient temperature. Fumed silica (5 phr) is added to each formulation from this point forward.

TABLE 1

Amount of fumed silica vs. front start time and onset temperature

| Fumed Silica Loading (phr) | Front Start Time (min) | Cure Start Temperature (° C.) |
|---|---|---|
| 0 | 2.3 +/− 0.4 | 111 +/− 13 |
| 1.5 | 2.2 +/− 0.1 | 110 +/− 9 |
| 3.0 | 2.0 +/− 0.2 | 108 +/− 11 |
| 5.0 | 1.9 +/− 0.1 | 105 +/− 2 |

One important issue to note is the cracks in the coatings. Some of the formed coatings have several cracks that formed during the curing or cooling process. The areas where coating appears to be missing in FIG. 4 is a result of the drawdown bar having a more difficult time applying the more viscous formulations containing 5 phr of fumed silica. The latter statement is important to keep in mind throughout the remainder of this report. Despite the higher viscosity, enough of the formulation can still be applied to study the cure time and general kinetic properties. A drawdown bar is used to maintain thickness so these fundamental parameters can be accurately studied. In some embodiments, a roller or paintbrush may be used to apply the composition in practical applications. It can be concluded that the addition of fumed silica reduces the cure time by reducing the convection; however, it does not prevent cracking from occurring due to a build-up of internal stress.

Cracking is prevalent in all the samples containing the fumed silica along, with the standard resin formulation. Cracking occurred either during the curing process or after the system cooled. Cracking is likely occurring due to internal stresses in the film resulting from a thermal expansion mismatch between the film and the steel substrate. Steel is known to have a significantly lower coefficient of thermal expansion (CTE) compared to a polymeric film. A CTE mismatch can cause internal stresses in the coating as it responds to thermal changes (H. Zhou, et al. Coatings 2019, 9, 243). One way to reduce a CTE mismatch is by adding fillers, which generally have a significantly lower CTE compared to polymers (C. DeArmitt and R. Rothon. Encyclopedia of polymers and composites (Springer-Verlag Heidelberg, Berlin, 2015) 2017, 1).

Figure 6:
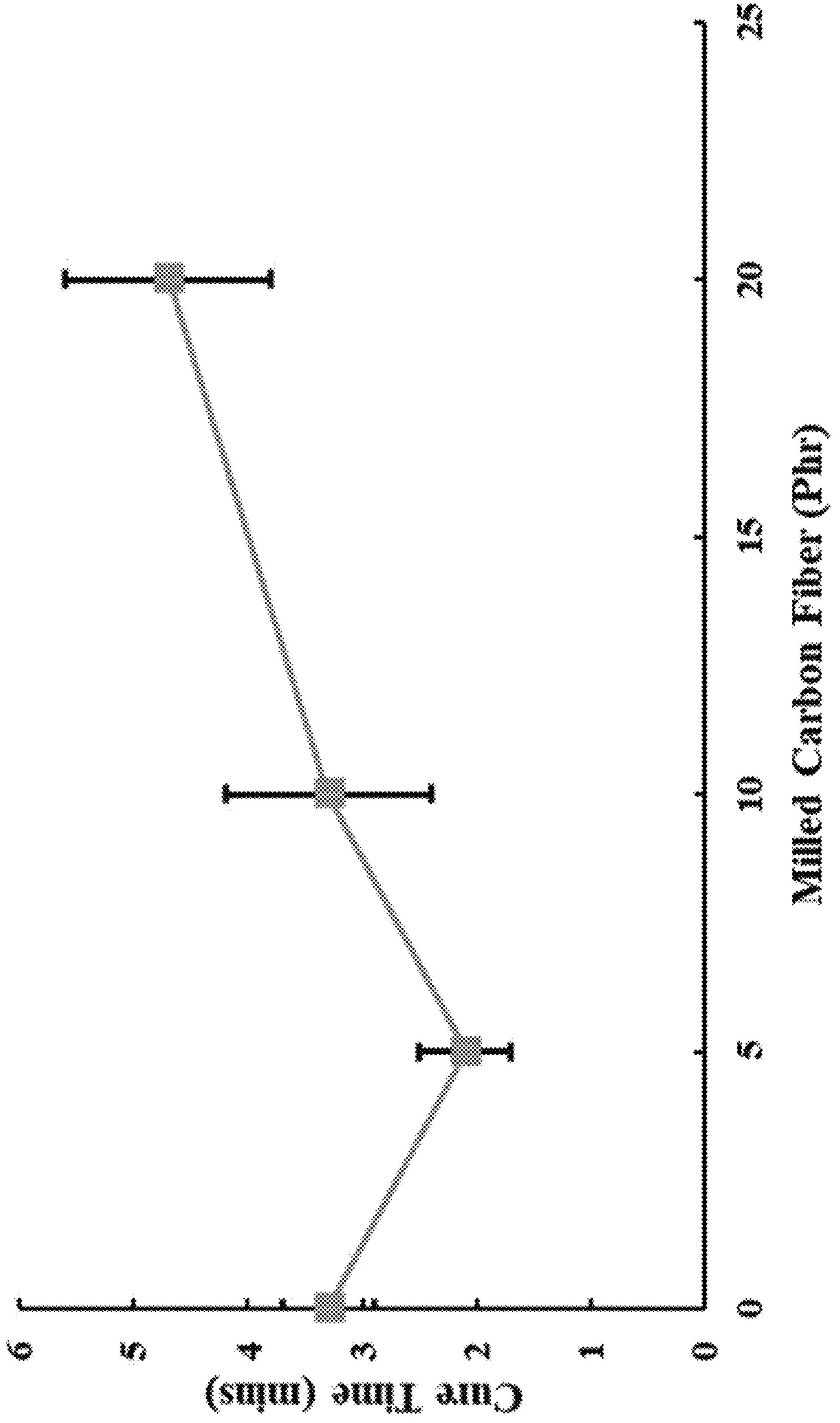
FIG. 6 is a plot of the effect of Zoltek® PX35 milled carbon fiber loading on cure time of coatings.

Milled carbon fibers have a negative CTE and shrink while heating. Zoltek® PX35 (150×7.2 microns) is a commercially available milled carbon fiber. According to the Zoltek corporation, Zoltek® PX35 is a high aspect ratio filler with a negative coefficient of thermal expansion (CTE) of $-0.75\times10^{-6}$/K). The following results will demonstrate the impact that adding Zoltek® PX35 has on the cure speed and physical properties (appearance) of the coatings. FIG. 6 is a plot of the effect of Zoltek® PX35 milled carbon fiber loading on cure time of coatings. Based on the results in FIG. 6, there is a slight increase in cure time as milled carbon fiber is added. When factoring in error, the overall average cure time for each loading was relatively similar, in all cases, it took between 2 and 6 minutes for a coating to cure.

Table 2 shows that the average front start time and temperatures were similar for each loading of milled carbon fiber. Overall, the cure time, front start time, and onset temperature were similar for each filler loading and no trend could be found.

TABLE 2

Cure time and onset temperature for milled carbon fiber study

| Milled Carbon Fiber Loading (phr) | Front Start Time (mins) | Front Start Temperature (° C.) |
|---|---|---|
| 0 | 1.9 +/− 0.1 | 105 +/− 2 |
| 5 | 1.4 +/− 0.1 | 99 +/− 6 |
| 10 | 1.4 +/− 0.2 | 106 +/− 2 |
| 20 | 1.5 +/− 0.2 | 106 +/− 8 |

Figure 7:
FIG. 7 is an image showing the coatings formed after the additional of 5 phr Zoltek® PX35 milled carbon fiber.
Figure 8:
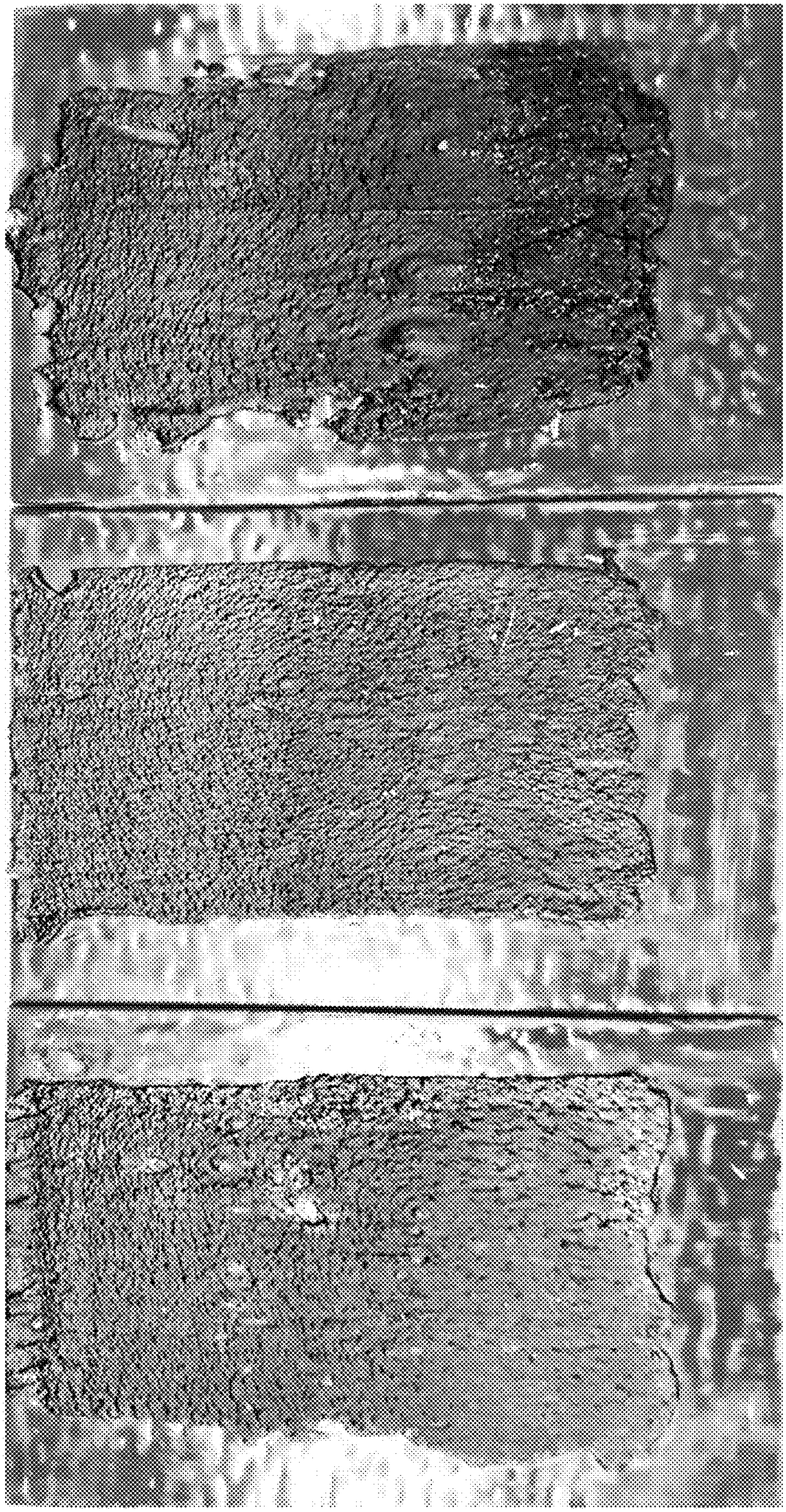
FIG. 8 is an image showing the coatings formed after the additional of 10 phr Zoltek® PX35 milled carbon fiber.
Figure 9:
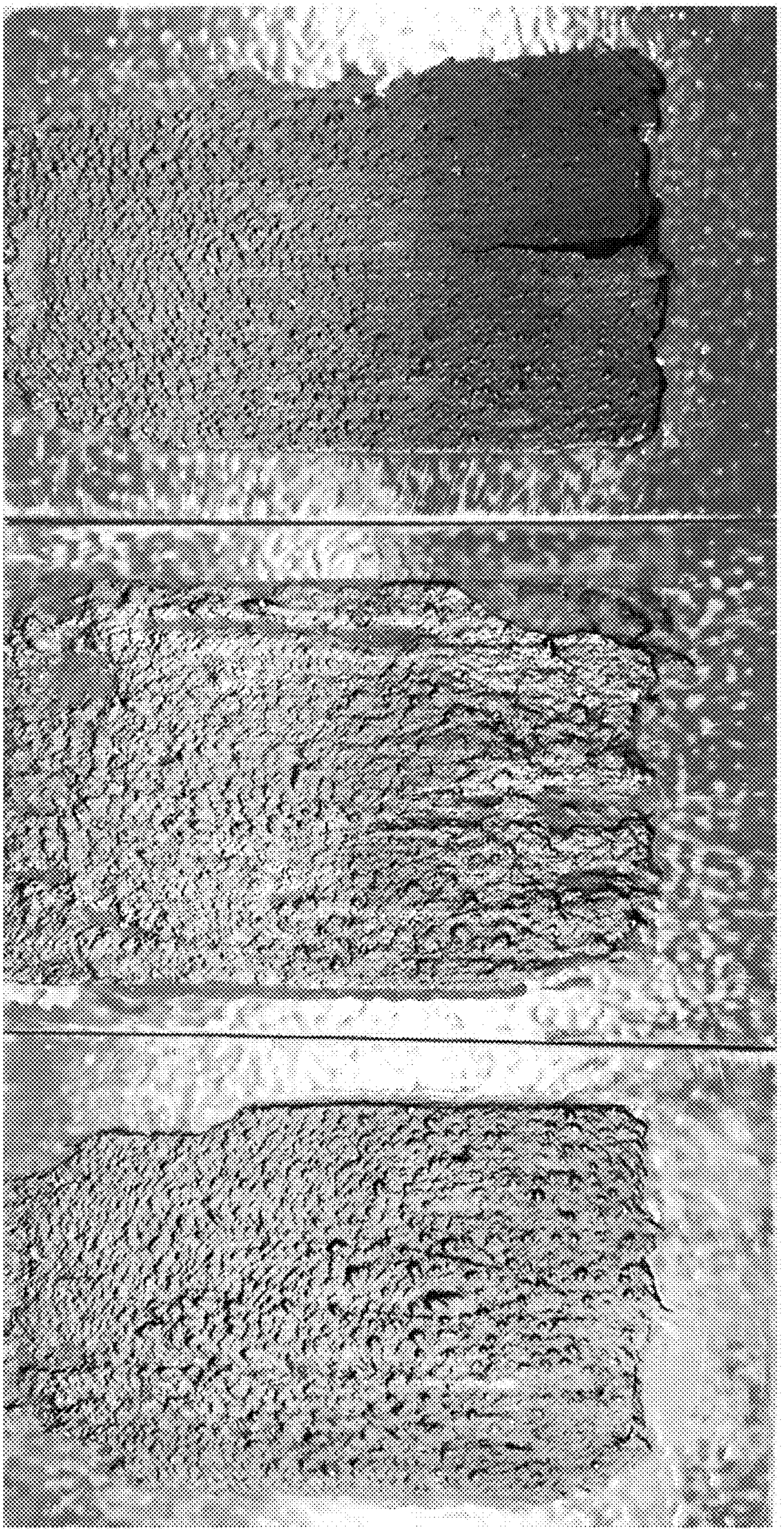
FIG. 9 is an image showing the coatings formed after the additional of 20 phr Zoltek® PX35 milled carbon fiber.

FIGS. 7, 8, and 9 show the coatings formed after the addition of different loadings (5 phr, 10 phr, and 20 phr) of Zoltek® PX35 milled carbon fiber. FIG. 7 shows that the addition of 5 phr of the milled carbon fiber did not successfully decrease cracking, as two out of three of the coatings formed have severe cracking and delamination. The third coating has minor cracking. As shown in FIGS. 8 and 9, higher loadings of milled carbon fiber minimized cracking and delamination. Only one out of the 6 coatings shown in FIGS. 8 and 9 had a large crack formed at the edge where the coating appeared to be partly delaminating. The other 5 cured coatings had very little or no cracks.

Aspect ratio is the ratio of length to width and is another important parameter when considering a filler. High aspect ratio fillers are known to reduce cracking under thermal stresses. Zoltek® PX35 is an elongated filler with an aspect ratio of 21:1. By comparison, microglass 6608® (a milled fiber made from E-glass filaments) has an aspect ratio of 27:1 and can be added to thermosets to decrease distortion at high temperatures. Zoltek® PX35 has a CTE of $-0.75\times10^{-6}$/K and E-glass has a CTE of $5.4\times10^{-6}$/K. The milled fiber was added to determine if adding fibers with high aspect ratios reduces cracking.

Figure 10:
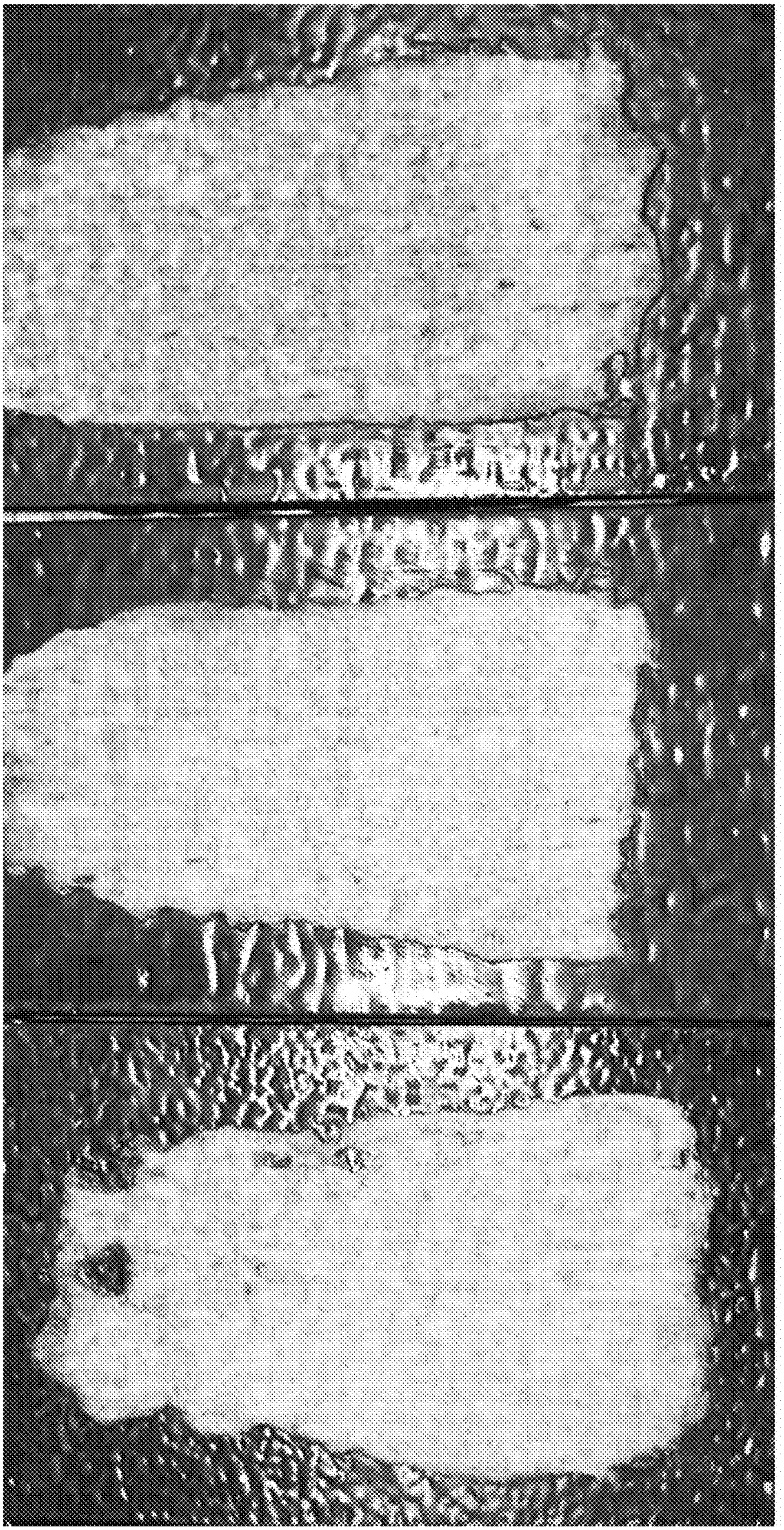
FIG. 10 is an image showing cured films made from standard resin formulation and 5 phr of microglass milled fiber.
Figure 11:
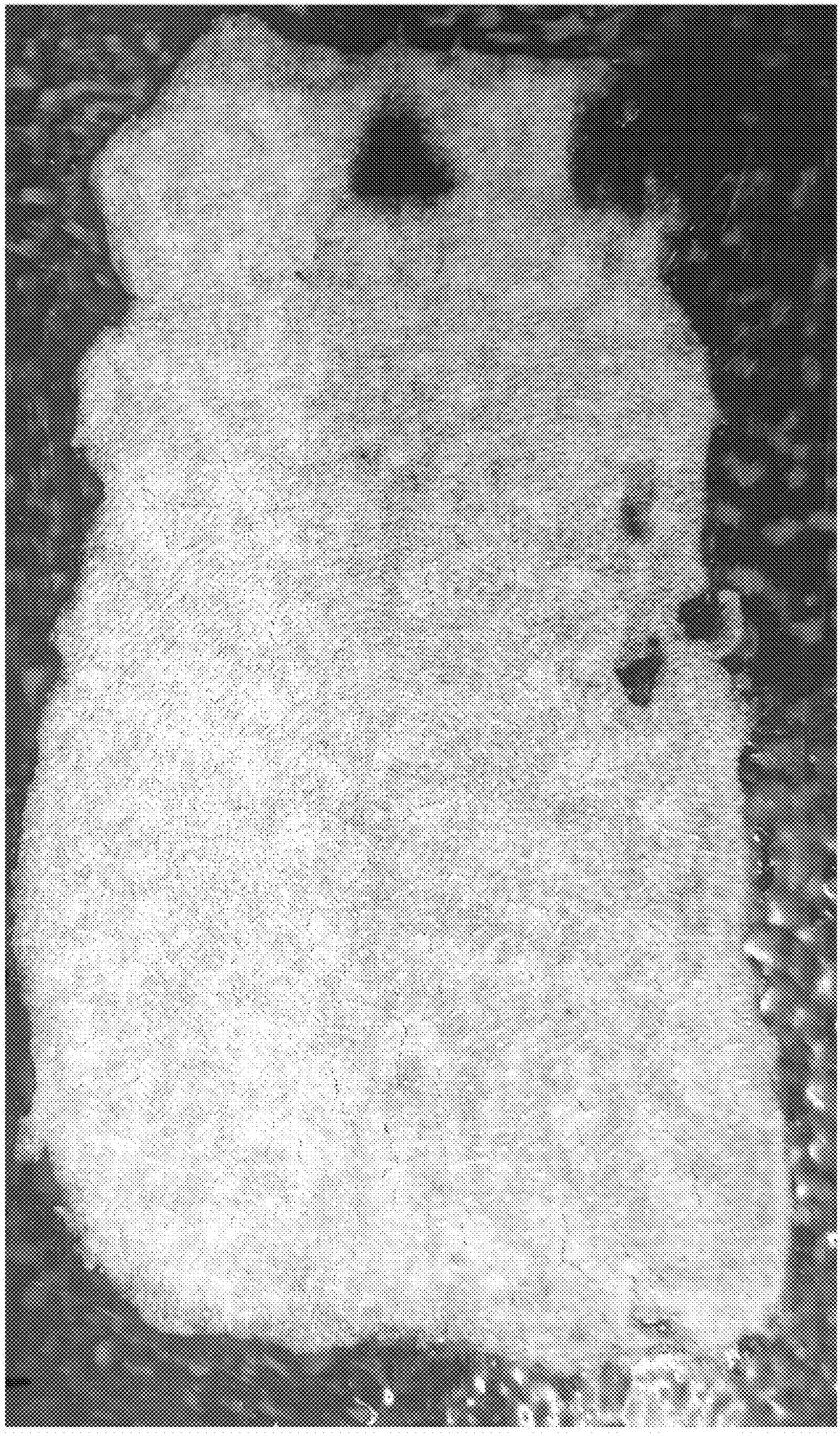
FIG. 11 is a close-up image of a film containing 5 phr of microglass milled fiber. The cracks are small but can be seen up close.
Figure 12:
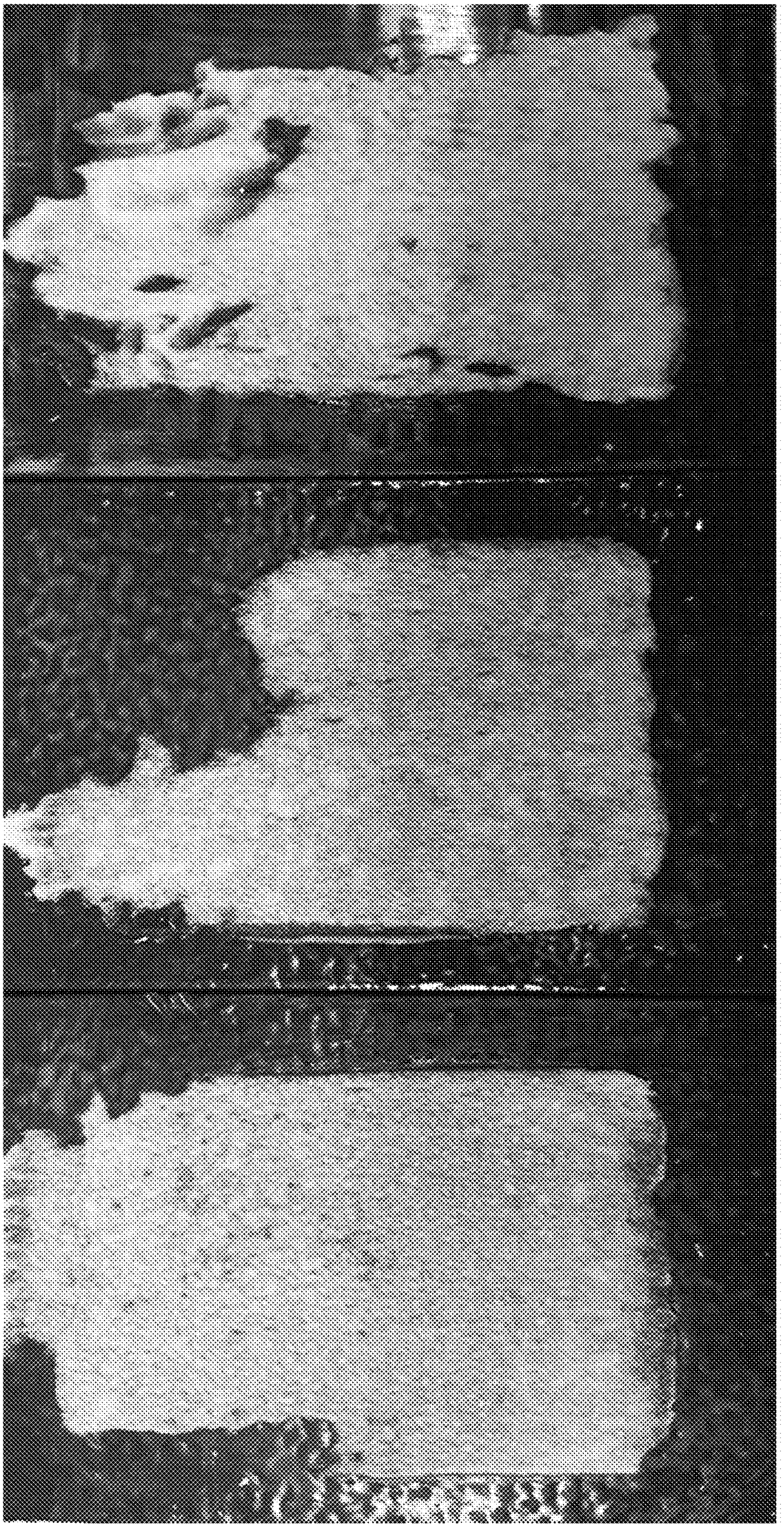
FIG. 12 is an image showing cured films made from standard resin formulation and 10 phr of microglass milled fiber.
Figure 13:
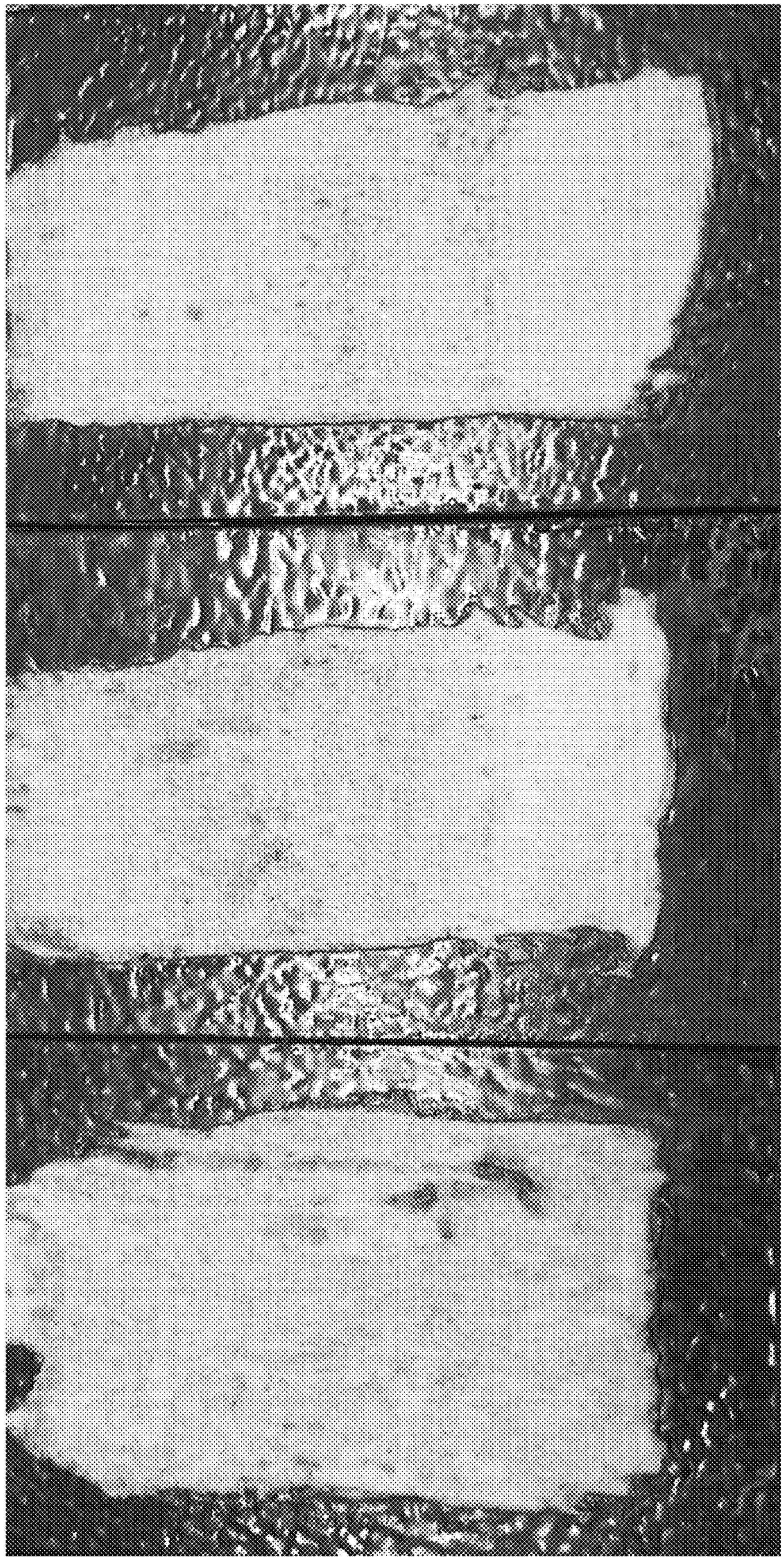
FIG. 13 is an image showing cured films made from standard resin formulation and 20 phr of microglass milled fiber.

Addition of milled fiber: As seen in FIGS. 12 and 13, initially no visible cracks can be seen in cured coatings formed from the formulations containing 10 phr and 20 phr of the microglass milled fiber. However, a closer inspection reveals very minor cracking on some samples and there appear to be areas where the coatings are clearer. The non-uniform color of the coating may be a result of poor wetting between the milled fiber and the resin. The formulation containing 5 phr of milled carbon fiber had more apparent cracking, the cracks were still (small) minor but larger in number in comparison to the cracks in the samples containing more milled fiber. The three replicates of the 5 phr milled fiber samples can be seen in FIG. 10 and a larger image in FIG. 11 shows the cracking in one of the samples.

Figure 14:
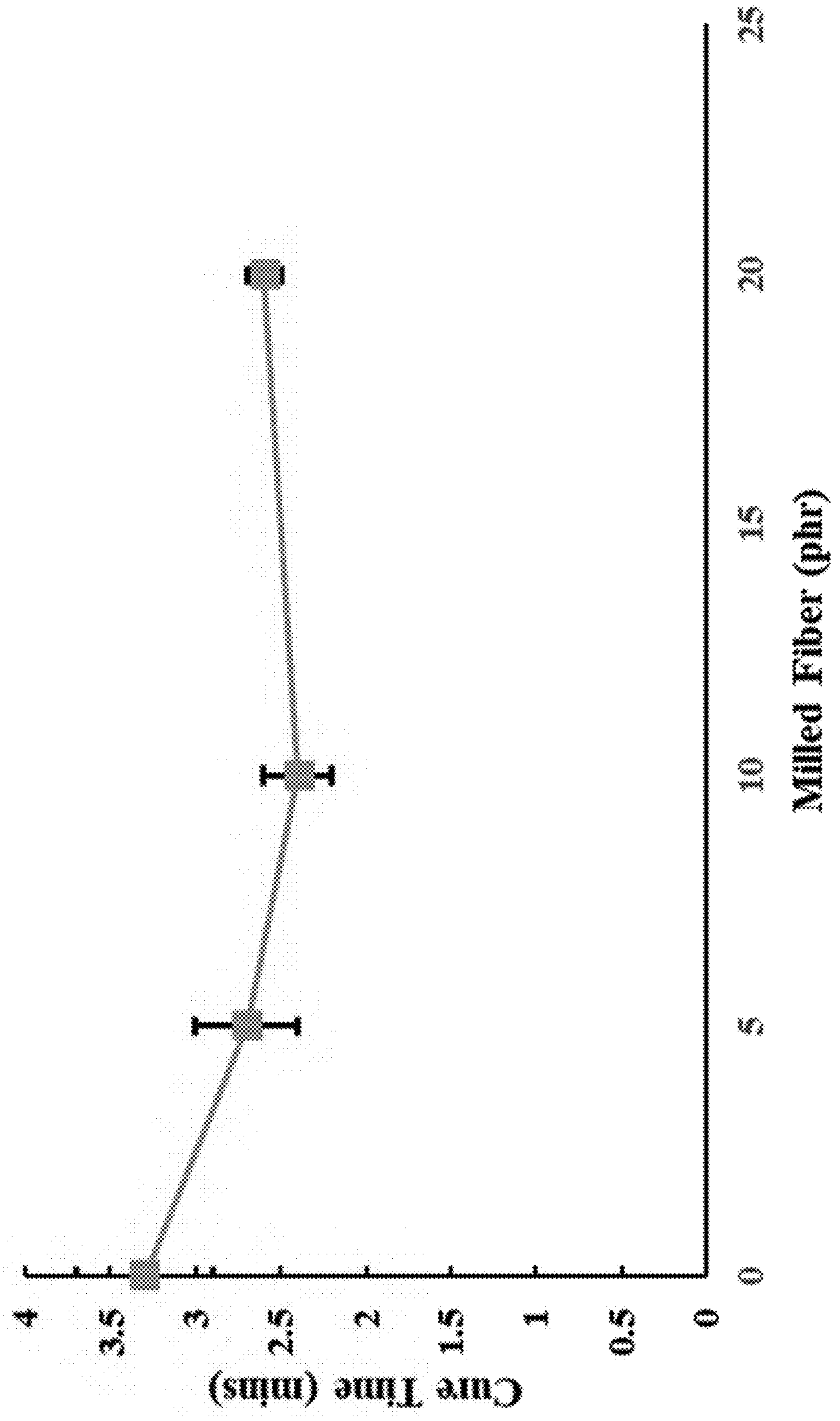
FIG. 14 is a plot showing the effect of microglass milled fiber loading on cure-time of coatings.

The plot in FIG. 14 shows that there was a slight decrease in the cure time of the coatings upon the addition of milled fiber while the front start time remained unchanged along with the front start temperature, which is shown in Table 3.

TABLE 3

Front start time and start temperature for milled fiber coatings

| Milled Fiber Loading (phr) | Front Start Time (min) | Front Start Temperature (° C.) |
|---|---|---|
| 0 | 1.9 +/− 0.1 | 105 +/− 2 |
| 5 | 2.0 +/− 0.1 | 104 +/− 4 |
| 10 | 1.9 +/− 0.1 | 82 +/− 7 |
| 20 | 2.0 +/− 0/1 | 108 +/− 2 |

Figure 15:
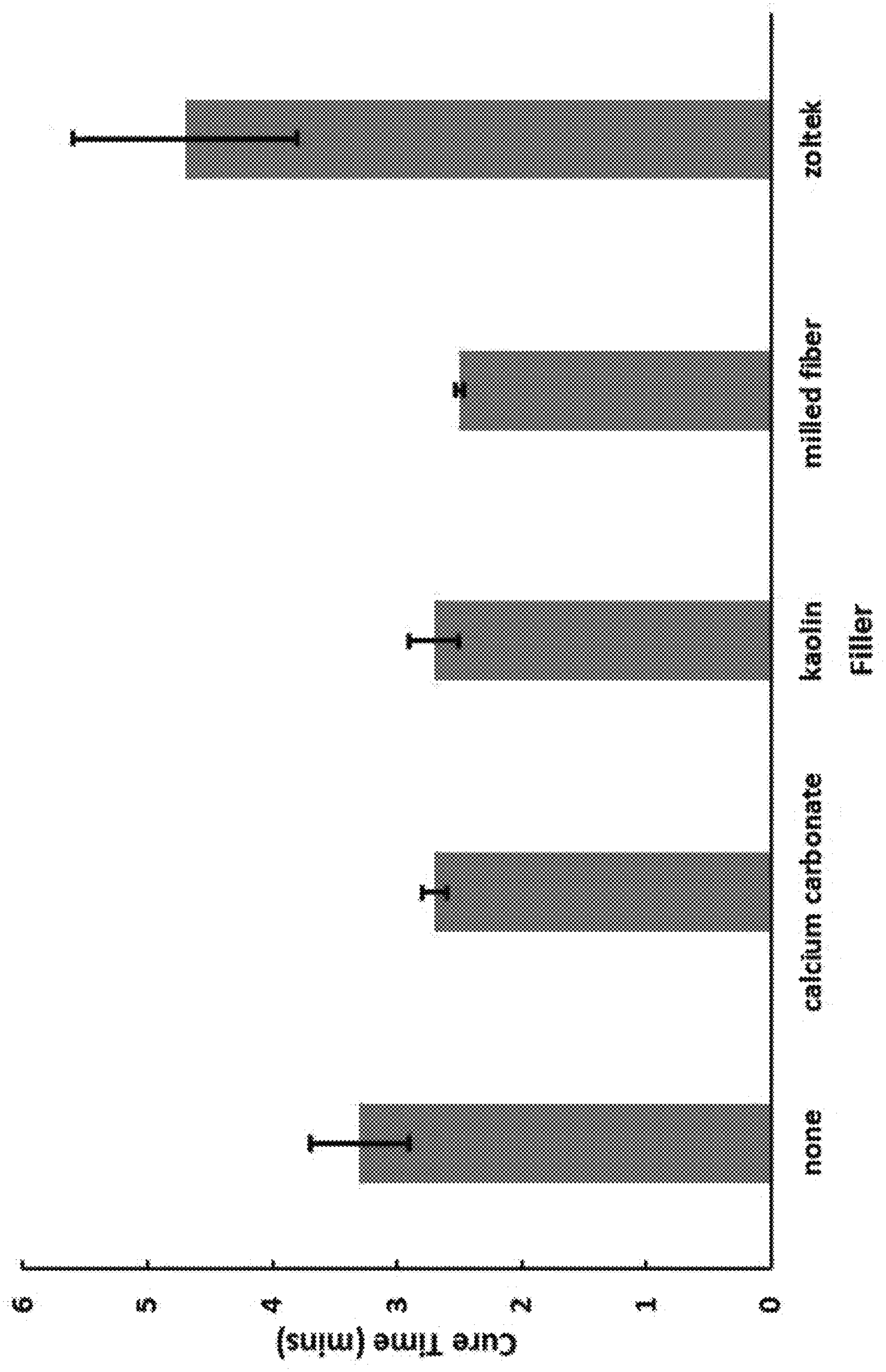
FIG. 15 is a plot of cure time for 20 phr of various fillers. The sample labeled as "none" is the base formulations containing 5 phr of fumed silica.
Figure 16:
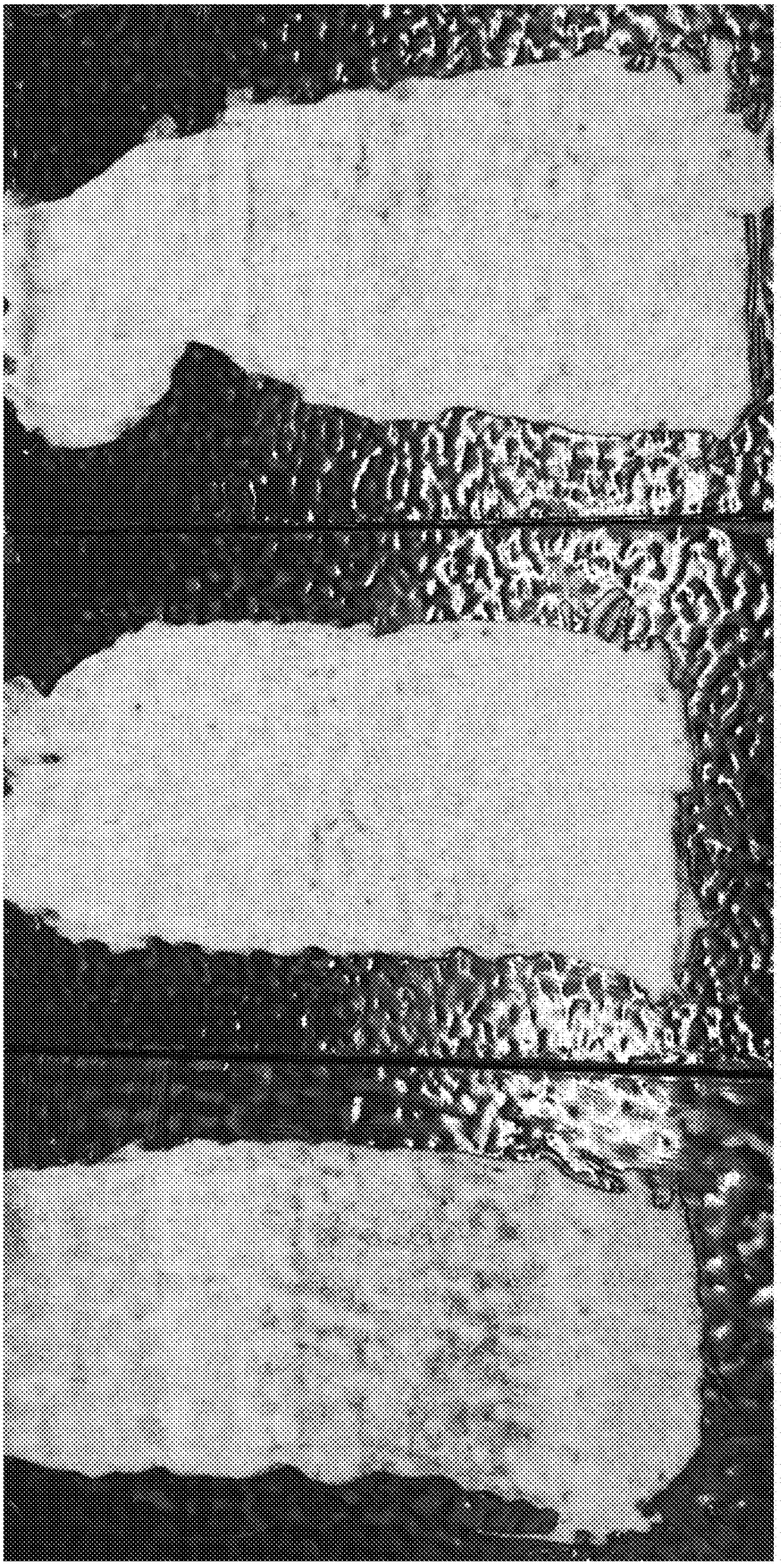
FIG. 16 is an image showing films formed containing 20 phr of calcium carbonate.
Figure 17:
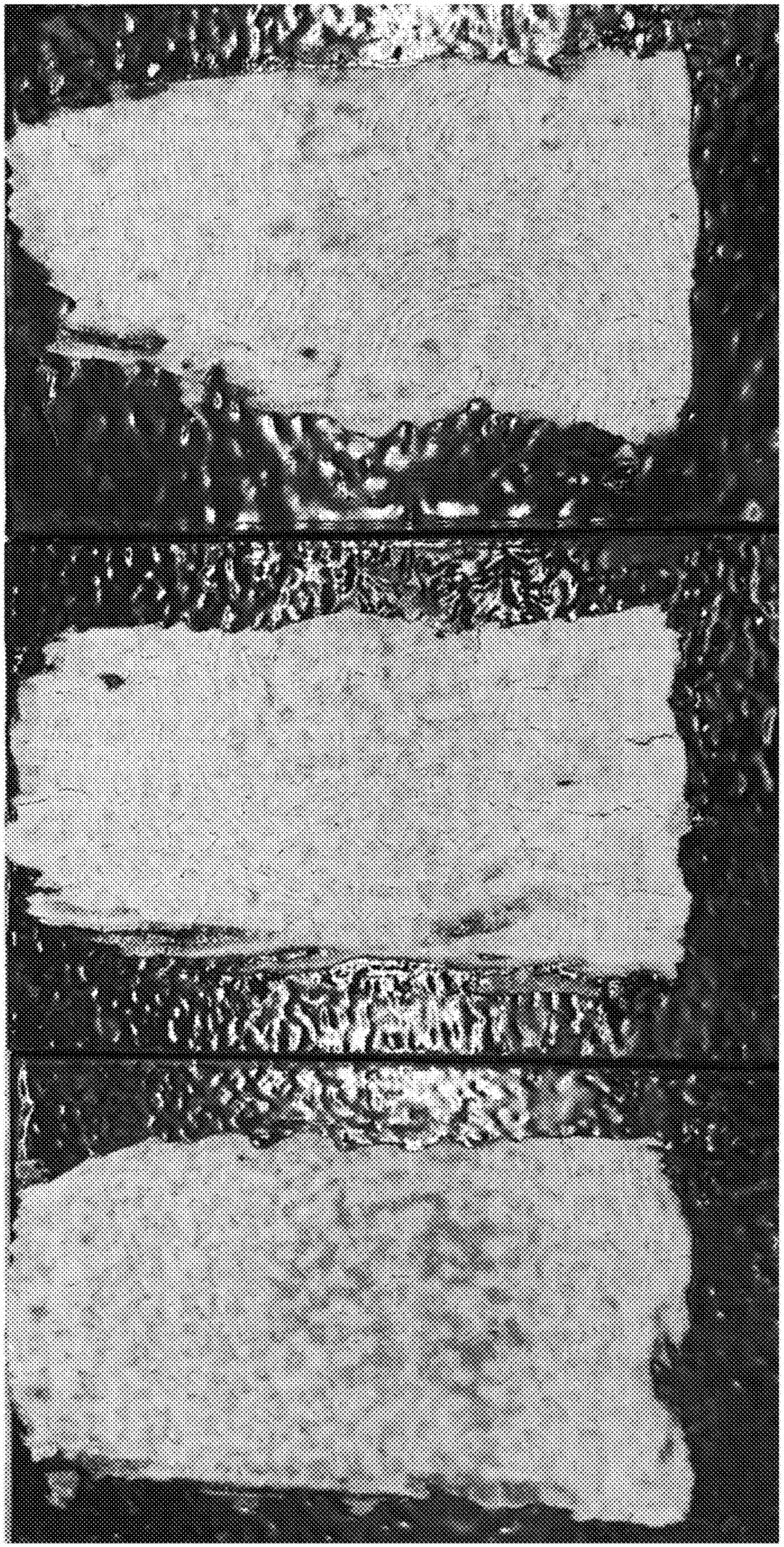
FIG. 17 is an image showing films formed containing 20 phr of kaolin.

Effects of Adding Calcium Carbonate and Kaolin Clay: FIG. 15 is a chart showing the effect on cure time of various additives and fillers. FIGS. 16 and 17 show that the films formed with the calcium carbonate and kaolin contain cracks. The kaolin and calcium carbonate have irregular shapes, so it appears that the high aspect ratios of the milled fiber and milled carbon fiber significantly reduced the cracking of the cured coatings. As shown in Table 4, the front start time for the coatings containing the Zoltek® milled carbon fiber is around 30 seconds shorter compared to the other films. Like the previous coatings, the average front start temperature for the kaolin and calcium carbonate formulations is around 100° C. As shown in FIG. 15, the overall cure time for the milled fiber containing coatings is higher (approx. 5 mins vs. ~3 mins for the other samples) than those containing calcium carbonate, kaolin, milled glass fiber, or only fumed silica. During the curing process, the edges of the coating took longer to cure in the milled carbon fiber coatings. This might be attributed to the relatively nonskid surface being formed during the curing process.

TABLE 4

Filler Data

| Filler | Front Start Time (mins) | Start Temp (° C.) |
|---|---|---|
| Fumed Silica Only (5 phr) | 2.0 +/− 0.1 | 105 +/− 2 |
| Calcium Carbonate (20 phr) | 2.1 +/− 0.1 | 104 +/− 1 |
| Kaolin (20 phr) | 2.2 +/− 0.1 | 110 +/− 1 |
| Milled Fiber (20 phr) | 2.0 +/− 0.1 | 108 +/− 2 |
| Milled Carbon Fiber (20 phr) | 1.5 +/− 0.2 | 106 +/− 8 |

Figure 18:
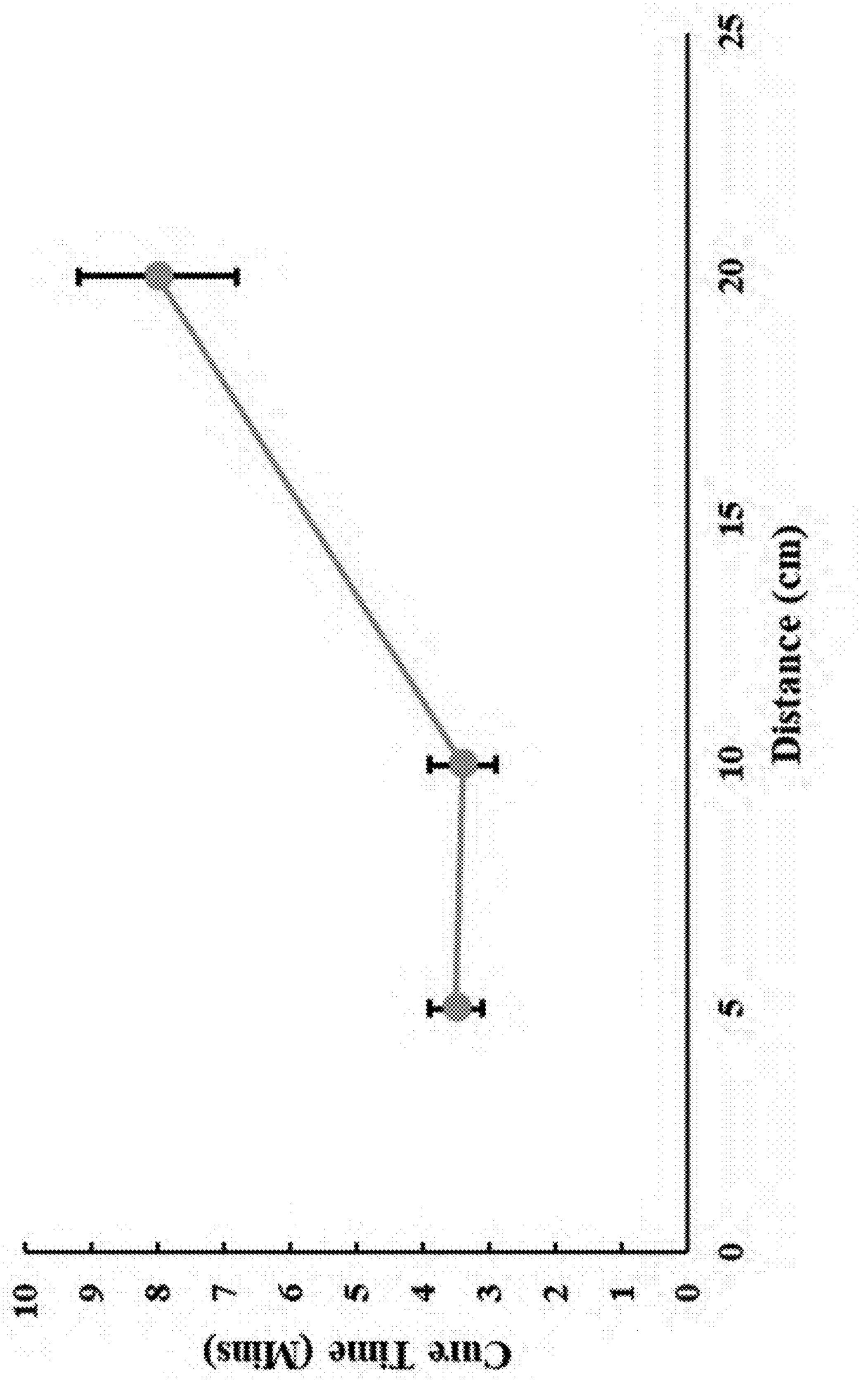
FIG. 18 is a plot of the relationship between the cure time and the distance between the IR heater and the substrate.

As shown in FIG. 18, there is a dramatic increase in the cure time when the distance between the steel substrate and the infrared heater is increased from 10 cm to 20 cm. There was little change in the cure time when the distance was decreased from 10 cm to 5 cm. Table 5 shows that it takes longer for the reaction (front) to start, this is because it takes longer for the coating's temperature to increase. In terms of cure time, it appears that 10 cm and 5 cm are both optimal.

Figure 19:
FIG. 19 is an image showing the coatings formed after curing 5 cm beneath the IR heater.
Figure 20:
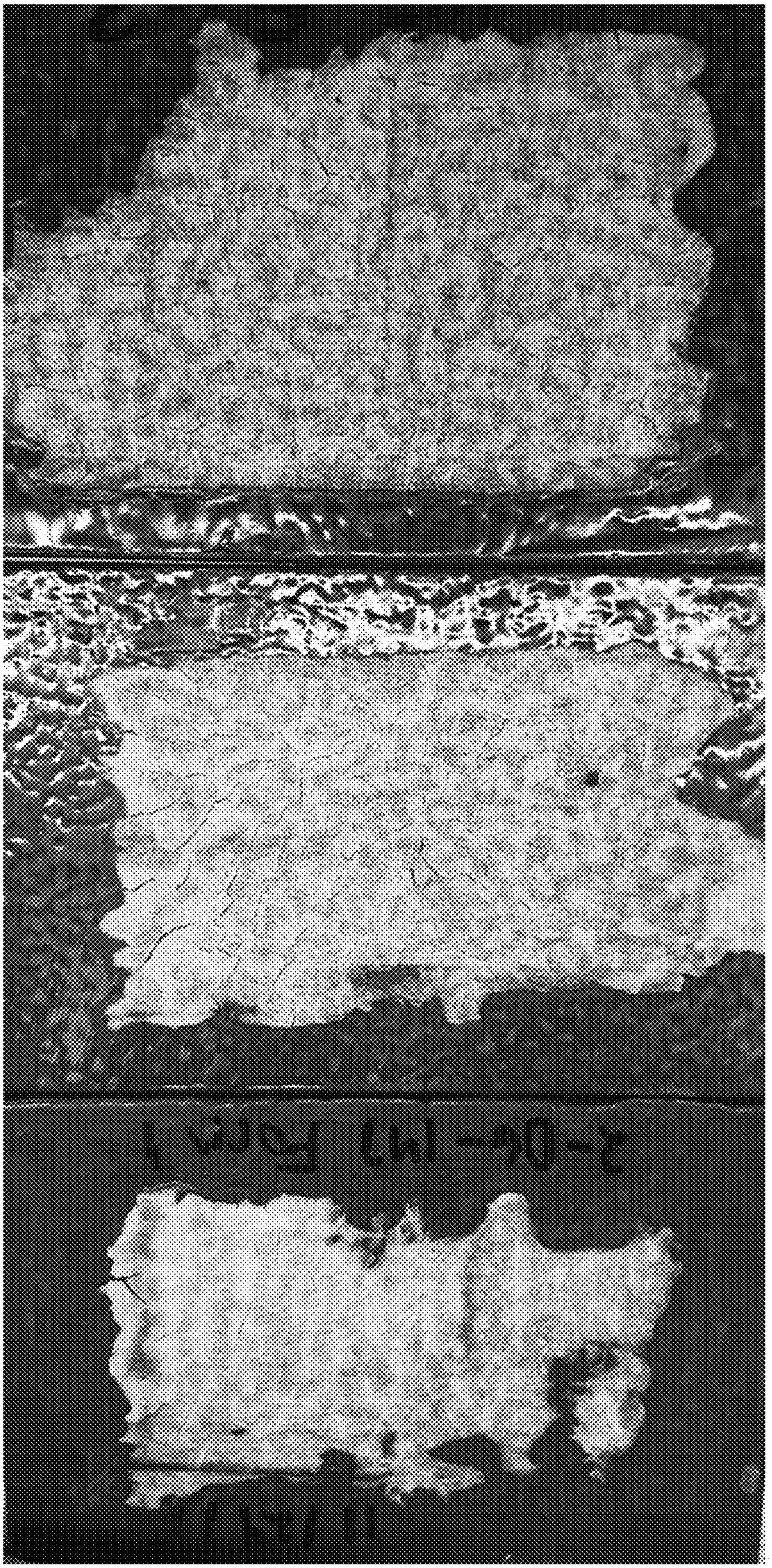
FIG. 20 is an image showing the coatings formed after curing 10 cm beneath the IR heater.
Figure 21:
FIG. 21 is an image showing the coatings formed after curing 20 cm beneath the IR heater.

FIGS. 19, 20, and 21 show how changing the distance between the IR heater and the substrate affects the appearance of the cured coating. In all cases cracking occurred as it did in previous samples, however; the cracking was much more pronounced in the coating cured 5 cm beneath the IR heater. In addition to more cracking, the film formed was scorched. In the case of 20 cm, shown in FIG. 22, there appeared to be some delamination of the coating along with the usual cracking. The results of the cure time and the appearance of the cured coating demonstrate that the ideal height between the substrate and IR heater is around 10 cm.

TABLE 5

Distance between IR heater and substrate vs. front start time and onset temperature

| Distance (cm) | Front Start Time (mins) | Front Start Temperature (° C.) |
|---|---|---|
| 5 | 0.9 +/− 0.1 | 104 +/− 13 |
| 10 | 1.9 +/− 0.1 | 105 +/− 2 |
| 20 | 6.2 +/− 0.2 | 102 +/− 2 |

Figure 22:
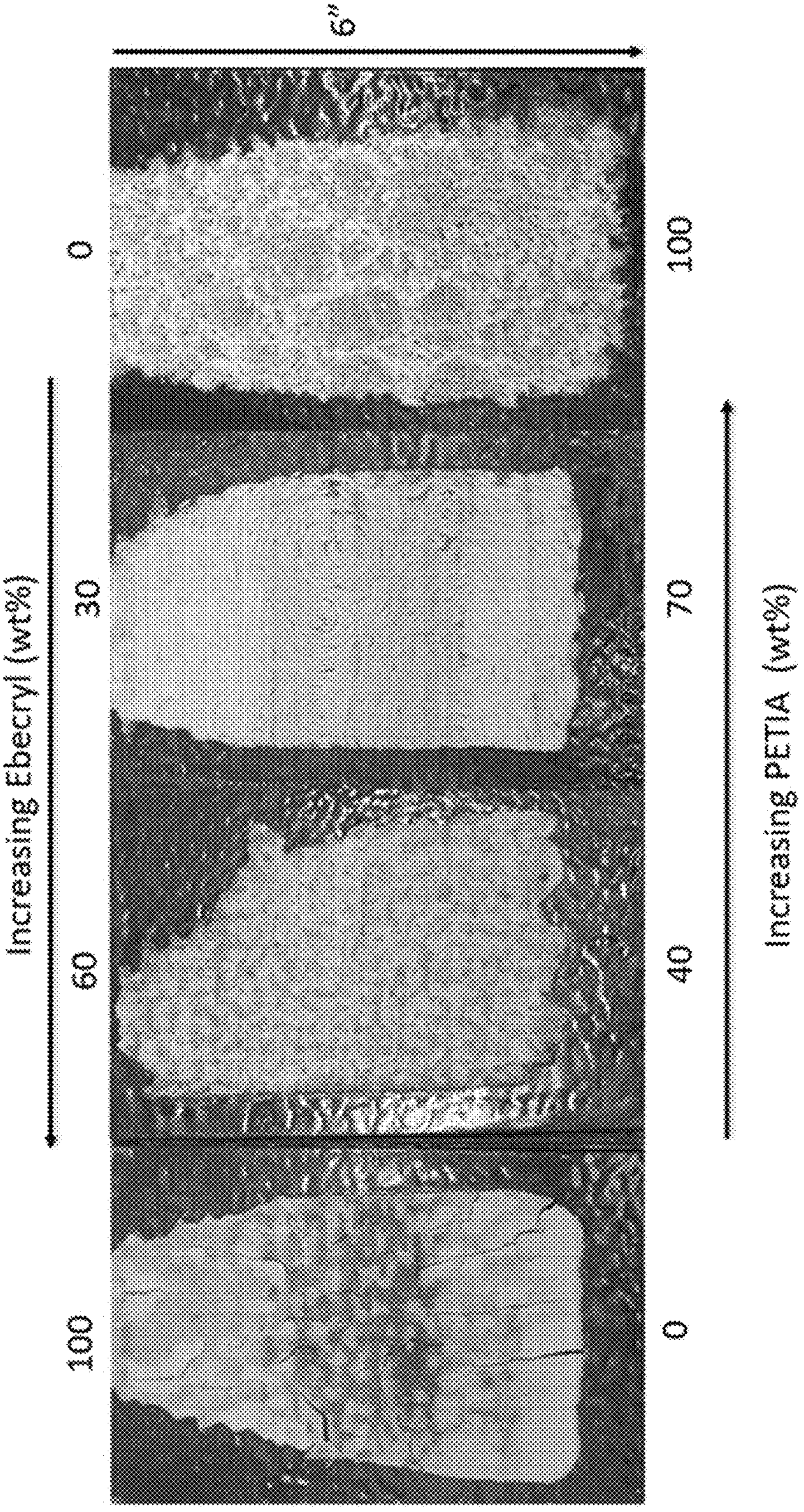
FIG. 22 is an image showing the effect of resin composition on coating formed.

Effects changing the resin composition: As shown in FIG. 22. the coating from the formulation containing only Ebecryl® 605 as the resin was severely cracked and delaminated. The coating cracked both during the curing and cooling processes. This demonstrates the issue of the CTE mismatch between the coating and the steel substrate. The amount of cracking decreased as the amount of PETIA increased and Ebecryl® 605 decreased. The coating containing 70 wt % PETIA and 30 wt % Ebecryl®605 had little to no cracking, but a few large voids were present in the cured coating. In addition to the formation of voids, the coating was more brittle. These voids turned into numerous pores when the resin consisted entirely of PETIA. In addition, several ridges formed, and the material was very brittle. The higher intrinsic viscosity of Ebecryl® 605 (6,000 to 9,000 cP at 25° C.) may be preventing the formation of bubbles, and therefore voids in the film, by decreasing nucleation. By comparison, PETIA has a viscosity range of 700 to 1,500 cP at 25° C. The best resin composition with regards to the coating formed appears to be somewhere in between 40 wt % and 70 wt % PETIA.

Figure 23:
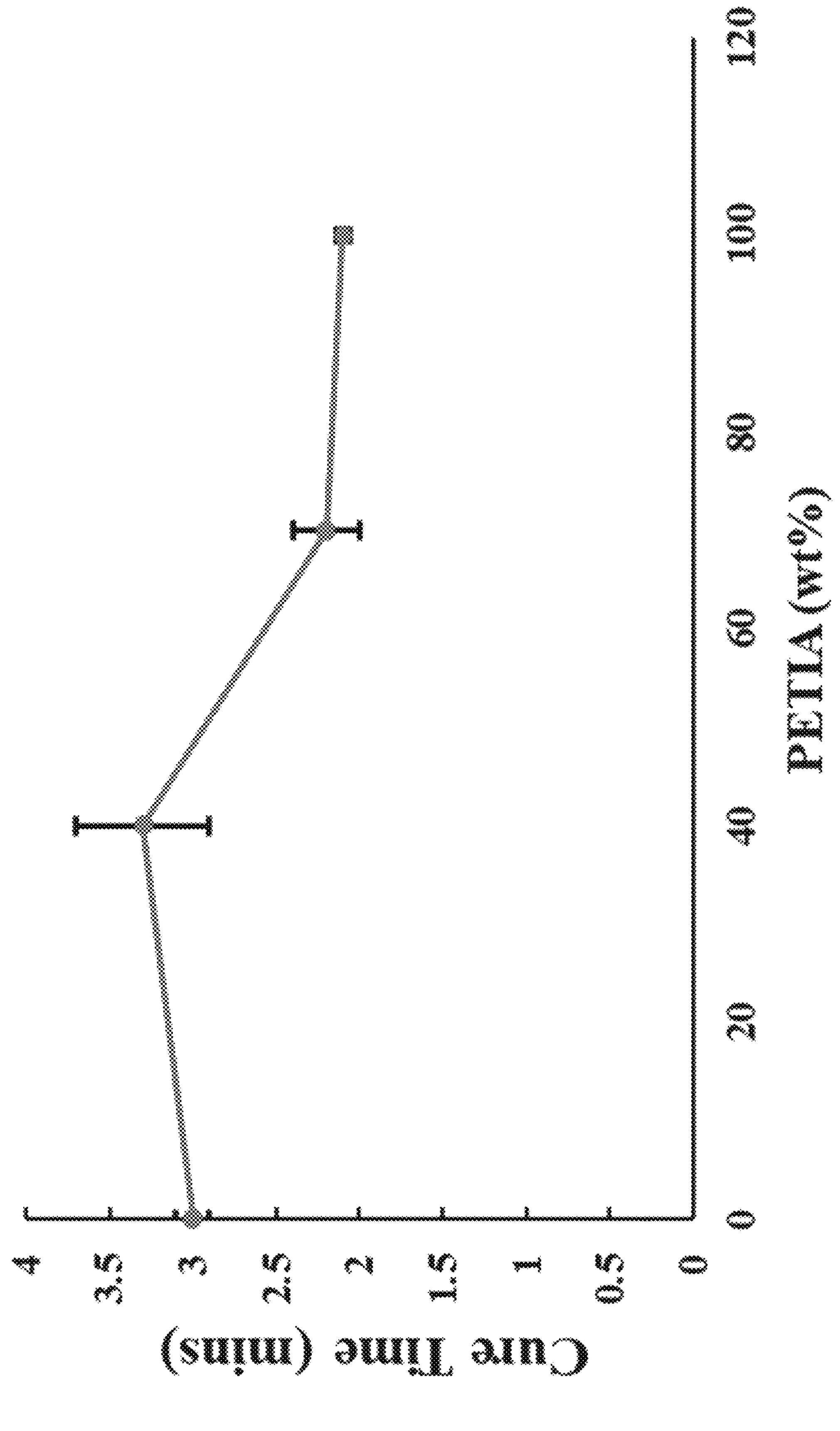
FIG. 23 is a plot of cure time versus function of PETIA wt %.

FIG. 23 shows the cure time as a function of PETIA (wt %). The cure time is lower for the formulations containing high amounts of PETIA, 70 wt %, and 100 wt %. This decrease in cure time is due to the higher density of double bonds per molecular in PETIA versus Ebecrryl®605. Studies have shown that multifunctional acrylates polymerize faster than di and monofunctional acrylates (J. S. Young, et al. Macromolecular Chemistry and Physics 1998, 199, 1043; C. Nason, et al. Macromolecules 2005, 38, 5506). Table 6 shows that the front start time and start temperature remained relatively constant as the amount of PETIA increased, this means that the front velocities were significantly faster given the overall decrease in cure time. These results agree with previous studies that suggest that front velocity generally increases as the number of double bonds per molecular weight on an acrylate increase.

TABLE 6

| Resin composition Study | | |
|---|---|---|
| PETIA (wt %) | Front Start Time (min) | Front Start Temperature (° C.) |
| 0 | 2.2 +/- 0.3 | 108 +/- 7 |
| 40 | 2.0 +/- 0.1 | 105 +/- 2 |
| 70 | 2.0 +/- 0.2 | 99 +/- 5 |
| 100 | 2.0 +/- 0.1 | 105 +/- 10 |

Figure 24:
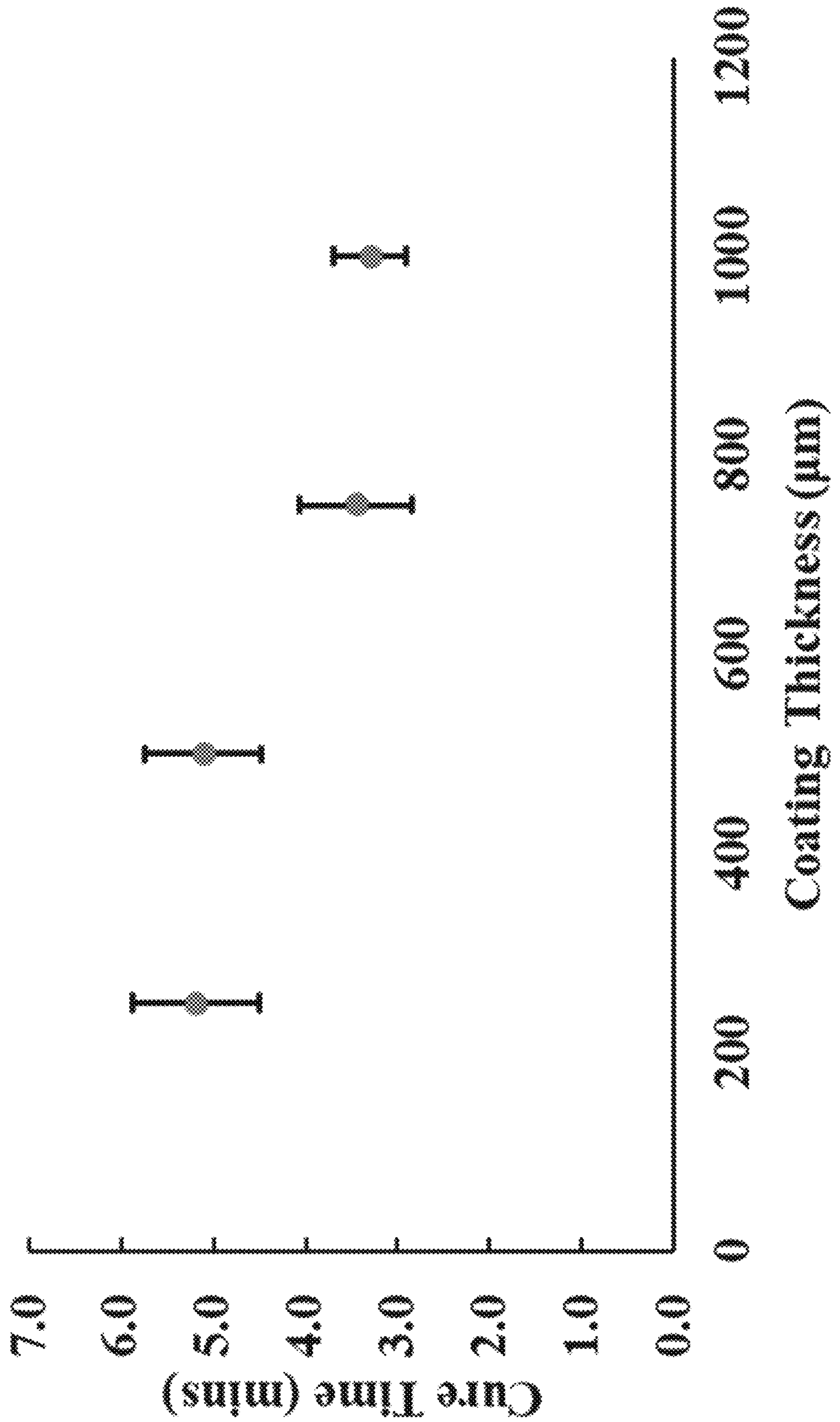
FIG. 24 is a plot of cure time versus coating thickness.

The results in FIG. 24 show that the cure time decreases once you reach a certain coating thickness. Heat loss from the system will increase as the surface area to volume area increases, which results in more heat loss as the thickness of the coating decreases. The increase in heat loss prolongs the cure time for thinner layers. Thinner layers lose more heat due to a higher surface area to volume ratio. In addition, surface tension-driven convection can also arise. Thinner layers can result in lower front velocities (K. Bansal, et al., ACS Macro Letters 2020, 9, 169). The effect of coating thickness on front start time and front start temperature are tabulated in Table 7.

TABLE 7

| Coating Thickness study | | |
|---|---|---|
| Coating Thickness (μm) | Front Start Time (min) | Front Start Temperature (° C.) |
| 250 | 2.4 +/- 0.1 | 111 +/- 6 |
| 500 | 2.2 +/- 0.1 | 105 +/- 8 |
| 750 | 2.0 +/- 0.1 | 105 +/- 9 |
| 1000 | 2.0 +/- 0.1 | 105 +/- 2 |

In summary, the cure time is lower for the thicker layers (30 and 40 mils). Thinner layers lose more heat due to a higher surface area to volume ratio. In addition, surface tension-driven convection can also arise. The cure time decreases as the weight percentage of PETIA increases relative to that of Ebecryl® 605. This result can be explained by the higher density of double bonds per molecular weight in PETIA compared to Ebecryl® 605. Front velocity generally increases as the number of double bonds per molecular weight of an acrylate increases. The non-skid formulations containing more PETIA formed more brittle coatings while those with more Ebecryl® 605 had more cracking. A resin composition consisting of Ebecryl® 605 (60 wt %) and PETIA (40 wt %) optimizes cure time while maintaining desirable physical properties. The cure time reaches a minimum when the heater is 10 cm above the substrate. Charred and cracked coatings were formed when the heater was 5 cm above the substrate. Fillers such as calcium carbonate and kaolin were not able to prevent cracking at the same loading (20 phr) as milled carbon fiber.

Corrosion is a process in which steel is converted into iron oxides through electrochemical reactions with its environment. For corrosion to occur, an electrolyte, an electronic pathway, an anode, and a cathode must all be present. Corrosion occurs due to the differences in potential between the cathodic and anodic sites. The overall differences between the two sites are what drives corrosion. As shown in equation (1), this difference is equal to sum of the reduction potentials of the oxidation and reduction reactions which occur at the anode and cathode sites, respectively. Equation 1 shows the standard reduction potentials of common half-cell reactions.

$$E^{\circ}_{cell} = E^{\circ}_{OX} + E^{\circ}_{RED} \quad (1)$$

The spontaneity of corrosion can be determined by relating the potential of a cell to Gibbs free energy (ΔG) through equation 2, where n is the number of electrons transferred in the reaction and F is faraday's constant.

$$\Delta G = -nFE_{Cell} \quad (2)$$

$$\Delta G = \Delta G^{\circ} + RT \ln Q \quad (3)$$

Equation 2 demonstrates that the larger the potential difference (the more positive $E_{cell}$ is) is between the two half cells, the more thermodynamically favorable the reaction will be. As shown in equation (3), when taking concentration into account, the change in free energy in the nonstandard state can be related to the standard state change in free energy. R is the gas constant, T is temperature, and Q is the reaction quotient. Equation 4 is found by substituting equation 2 and $$\Delta G^{\circ} = -nFE^{\circ}_{Cell}$$

into equation 3.

$$E_{Cell} = E^{\circ}_{Cell} - \frac{RT}{nF}\ln Q \quad (4)$$

Equation 4 is known as the Nernst equation and relates the electrode potential or electromotive force (emf) to the standard electrode potential of the cell and the concentrations of reductants and oxidants. The potential increases as the concentration of the oxidizer increases. Oxidizers such as oxygen and $H^+$ increase the favorability of corrosion.

It is important to note that the thermodynamics of corrosion do not determine the rate of corrosion. The rate of corrosion is governed by factors such as temperature, oxidizer concentration, and pH.

The rusting of iron in steel is a classic example of the corrosion process, which occurs through the reduction of oxygen at the cathode (1) and oxidation of iron at the anode (2).

$$2H_2O(l) + O_2(aq) + 4e^- \rightarrow 4OH^-(aq) \quad (1)$$

$$Fe(s) \rightarrow 2e^- + Fe^{2+}(aq) \quad (2)$$

Figure 25:
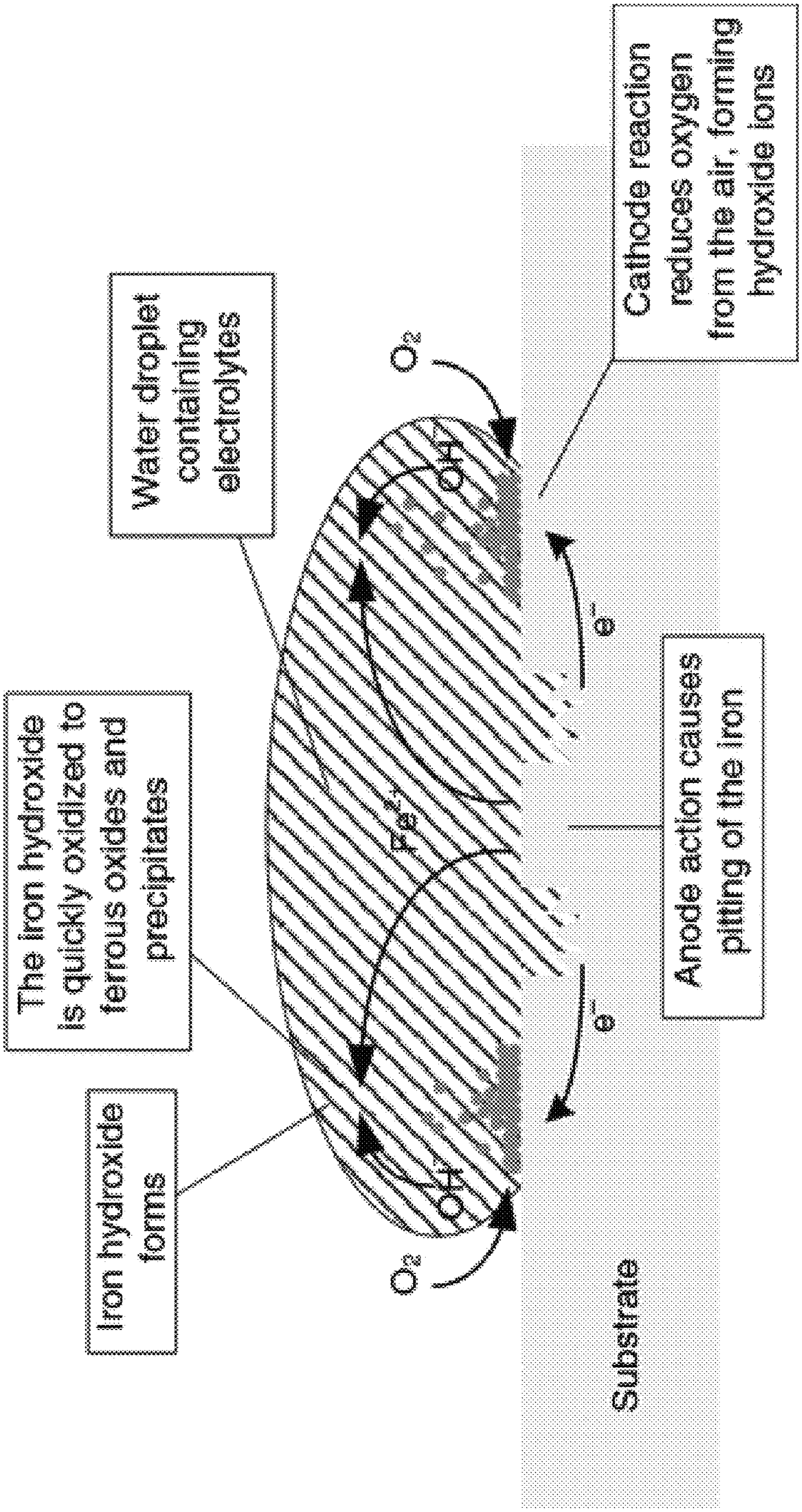
FIG. 25 is an overview of the corrosion of iron in steel.

Next Iron hydroxide will undergo oxidation and decomposition reactions to form rust ($Fe_2O_3 \cdot H_2O$). FIG. 25 gives an overview of the corrosion of iron in steel.

There are different types of corrosion such as general corrosion, galvanic corrosion, crevice corrosion, and pitting corrosion. In general, or uniform corrosion, a relatively uniform area of the steel surface is corroded. Galvanic corrosion occurs when two different alloys or metals are couple to each other. One alloy (the more active one) will preferentially corrode to the more noble metal. Crevice corrosion occurs where steel is connected to a different material which can be a different alloy or nonmetallic.

Figure 26:
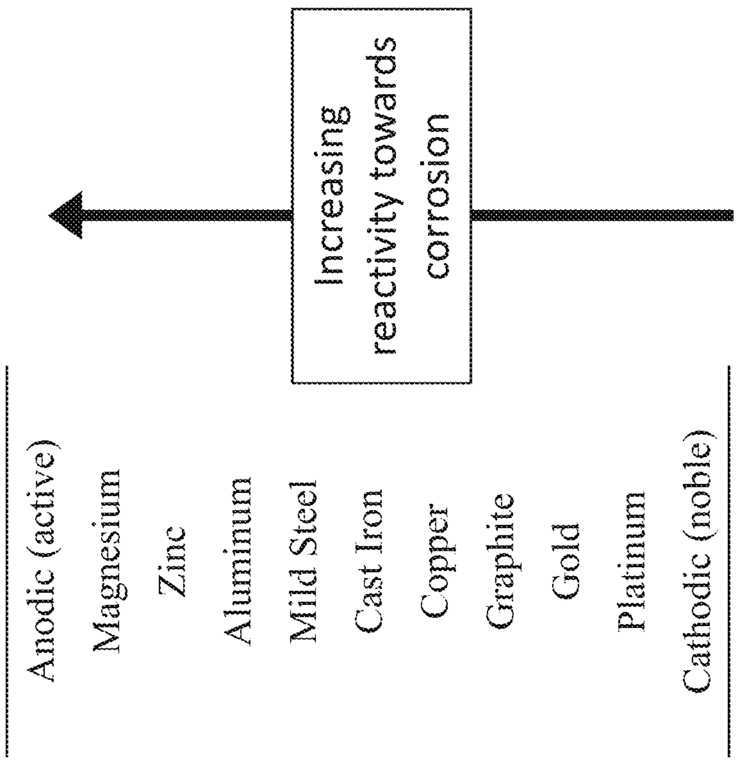
FIG. 26 is a diagram of the galvanic series, which lists metals based on their electrode potential from most active to least active (more noble).

Galvanic corrosion is due to the differences in electrode potential between the coupled metals. The galvanic series, shown in FIG. 26, lists metals based on their electrode potential from most active to least active (more noble). Corrosion will occur in the anode, which is the metal with more potential. Metals such as Al, Mg, and Zn tend to corrode preferentially to metals such as gold and platinum. Pitting corrosion is a result of localized corrosion that leads to formation of pits in the steel; these pits can be deep or shallow. This type of corrosion more problematic in comparison to general corrosion.

Three methods of corrosion protection include galvanic (sacrificial) protection, inhibitor coatings, and barrier coatings. Galvanic protection is based on the galvanic corrosion where one metal corroded preferentially to the other one. In this case a metal or alloy that has a higher electrochemical potential than the substrate to be protected. After the more active material corrodes, the corroded products will then act as a barrier against further corrosion. Galvanic protection is limited to primers as they must be in direct contact with the substrate. Powder coatings formulated with zinc dust are examples of galvanic protective coatings. Inhibitive coatings rely on the formation of protective layer on the substrate resulting from a reaction between the substrate and the dissolved components of inorganic pigments. When moisture permeates these coatings, the inorganic pigments dissolve and are then carried to the substrate.

Figure 27:
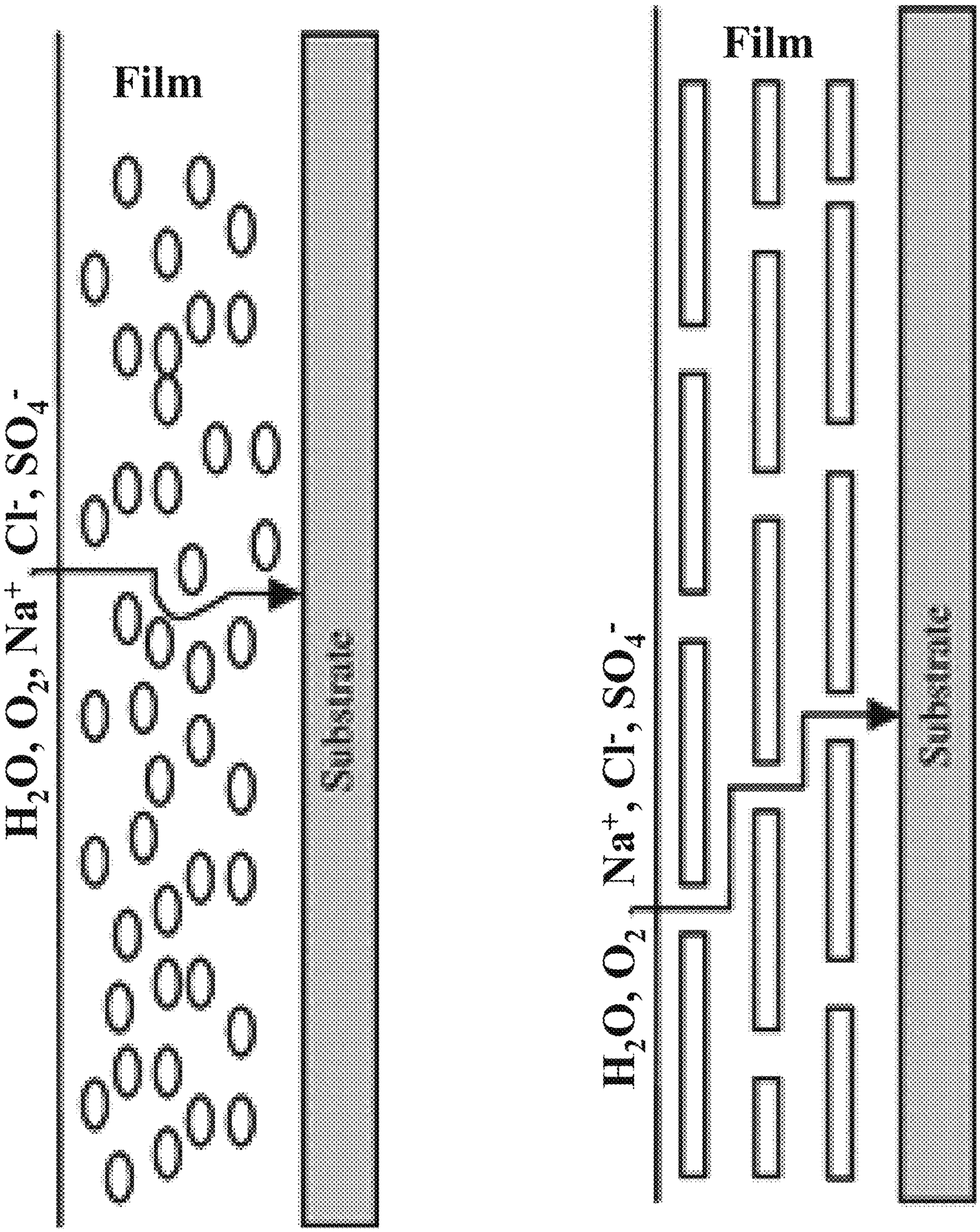
FIG. 27 is a schematic of the effect of barrier coating constitution on degradation.

Barrier coatings form a protective film on the substrate that impede the diffusion of water, salt, and oxygen. The choice of raw materials such as resins and fillers have a dramatic impact on the ability to create a good barrier against corrosion. Factors such as crosslink density and filler shape impact the permeability of the coating. A higher crosslink density decreases diffusion of molecules into the coating, and this improve resistance to corrosion and chemicals. Fillers and pigments with high aspect ratios such as lamellar shaped or needle shaped fillers create a tortuous path that impede the movement of molecules through the coating. By comparison, molecules such as water can move more easily around spherical shaped fillers and pigments. FIG. 27 demonstrates this movement.

Corrosion of maritime vessels is a significant economic and environmental issue. The annual cost of corrosion is estimated to constitute a significant percentage of the gross national product of the western world (P. A. Sorensen, et al. Journal of Coatings Technology and Research 2009, 6, 135). In addition, more drag on ships leads to higher fuel costs and more burning of fossil fuels. In addition to economics, corrosion failures have led to loss of life, such examples include collapse of bridges, airline accidents, and ruptures in pipes. Due these large economic and safety concerns, significant research and product development is done to protect against corrosion.

As shown in FIG. 28, current nonskid coating technology often takes days to cure to service and requires two-part mixing of separate formulations. In addition to curing time and mixing, there is an increasing desire to reduce VOCs (A. Marrion. The Chemistry and Physics of Coatings, 2004).

The formulations described herein were utilized in non-skid coatings. Aluminum oxide was added to provide a non-skid texture. The high crosslink density of the coating provided good chemical and corrosion resistance as well as hardness. Epoxy acrylates such as Ebecryl® 605 are known to provide good barrier properties while PETIA provided a high crosslink density and reduced cure time. The high aspect ratio of Zoltek® PX35 created a torturous path and further enhance barrier properties. Characterization such as impact testing, flexibility, and corrosion & chemical resistance is done to show potential application.

Figure 29:
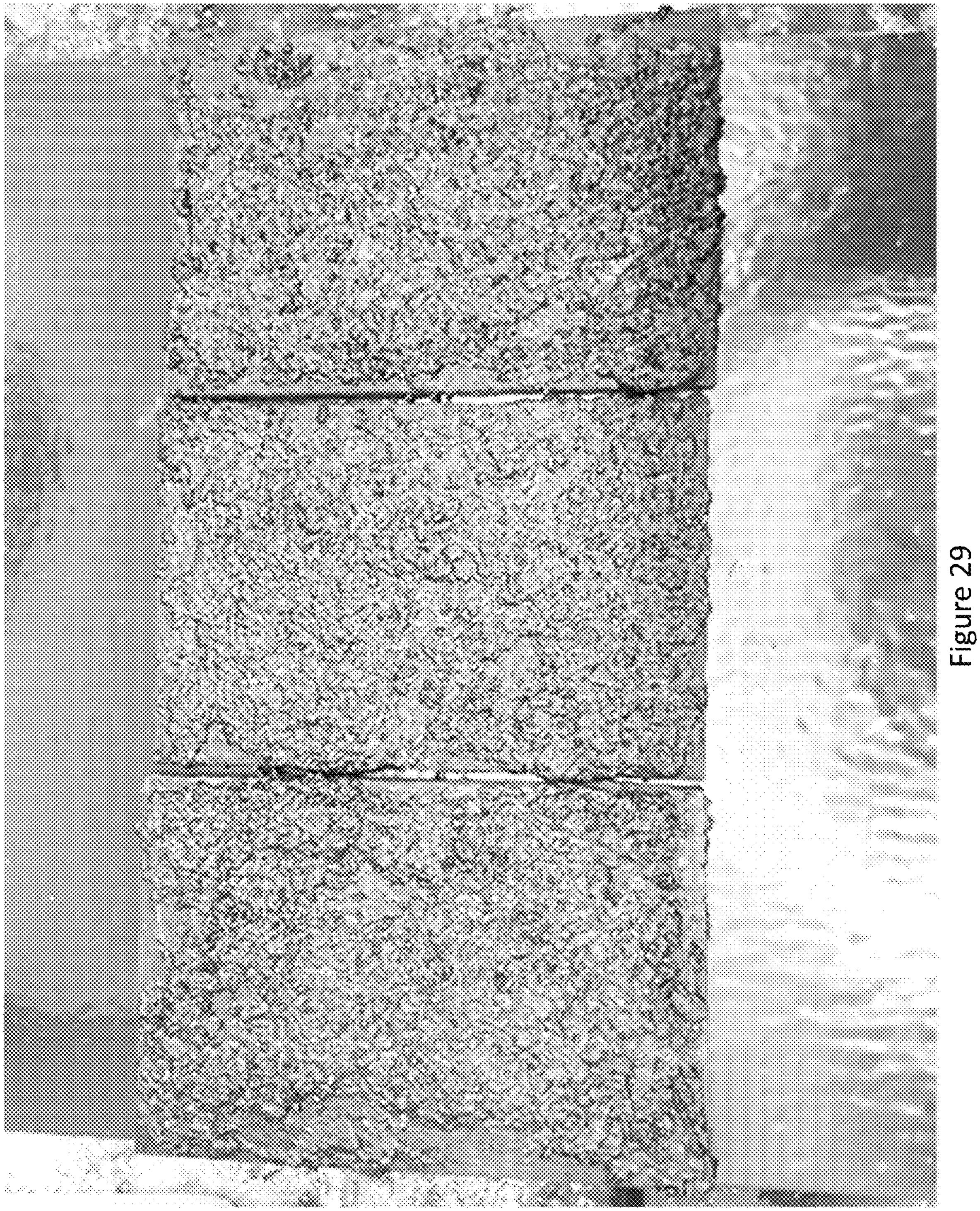
FIG. 29 is an image of the nonskid coating containing 100 phr of aluminum oxide and applied by paintbrush.

FIG. 29 shows an image of the cured non-skid coatings while Table 8 shows the curing data. No cracking or delamination occurred in any of the coatings formed and an average cure time of around 7 minutes was achieved. To gauge carbon emissions (such as volatile organic compounds, or VOCs), the difference between the mass of the coating resin before and after curing was determined. It was found that the coating lost approximately 5 wt % of its resin mass after curing. The higher cure time in comparison to earlier formulations can be explained by the peaks and valleys of the non-skid. As shown in FIG. 24, the cure time decreases as the thickness of the film decreases and this is attributed to heat loss. The heat loss prevents the propagation of the front in the thinner areas of the coating. The overall result is that the thicker areas cure quickly while the thinners area takes longer to cure as no propagating front is generated. This also explains the wider range of cure times in comparison to the base formulation. To gauge carbon emissions, the difference between the mass of the coating resin before and after curing was determined. Table 9 provides non-skid data for a formulation comprising 100 phr aluminum oxide.

TABLE 8

| Nonskid coatings | | | | |
|---|---|---|---|---|
| Panel Number | Front Start Time (min) | Start Temp (° C.) | Cure Time (min) | Weight Loss % |
| One | 1.4 | 116 | 8.0 | 4.8 |
| Two | 1.6 | 115 | 6.8 | 4.5 |
| Three | 1.5 | 114 | 6.8 | 4.7 |
| Average | 1.5 +/− 0.1 | 115 +/− 1 | 7.2 +/− 0.7 | 4.7 +/− 0.2 |

TABLE 9

| Data for non-skid (100 phr aluminum oxide) | | | |
|---|---|---|---|
| Parameter | Nonskid 1 | Nonskid 2 | Average |
| Initial Substrate Temp (° C.) | 24 | 23 | 24 |
| Front Start Temp of Substrate (° C.) | 75 | 70 | 73 |
| Substrate Temp at End of Cure (° C.) | 192 | 183 | 188 |
| Front start Time (mins) | 1.02 | 1.33 | 1.17 |
| Total Cure Time (mins) | 6.17 | 7.67 | 6.92 |

Figure 30:
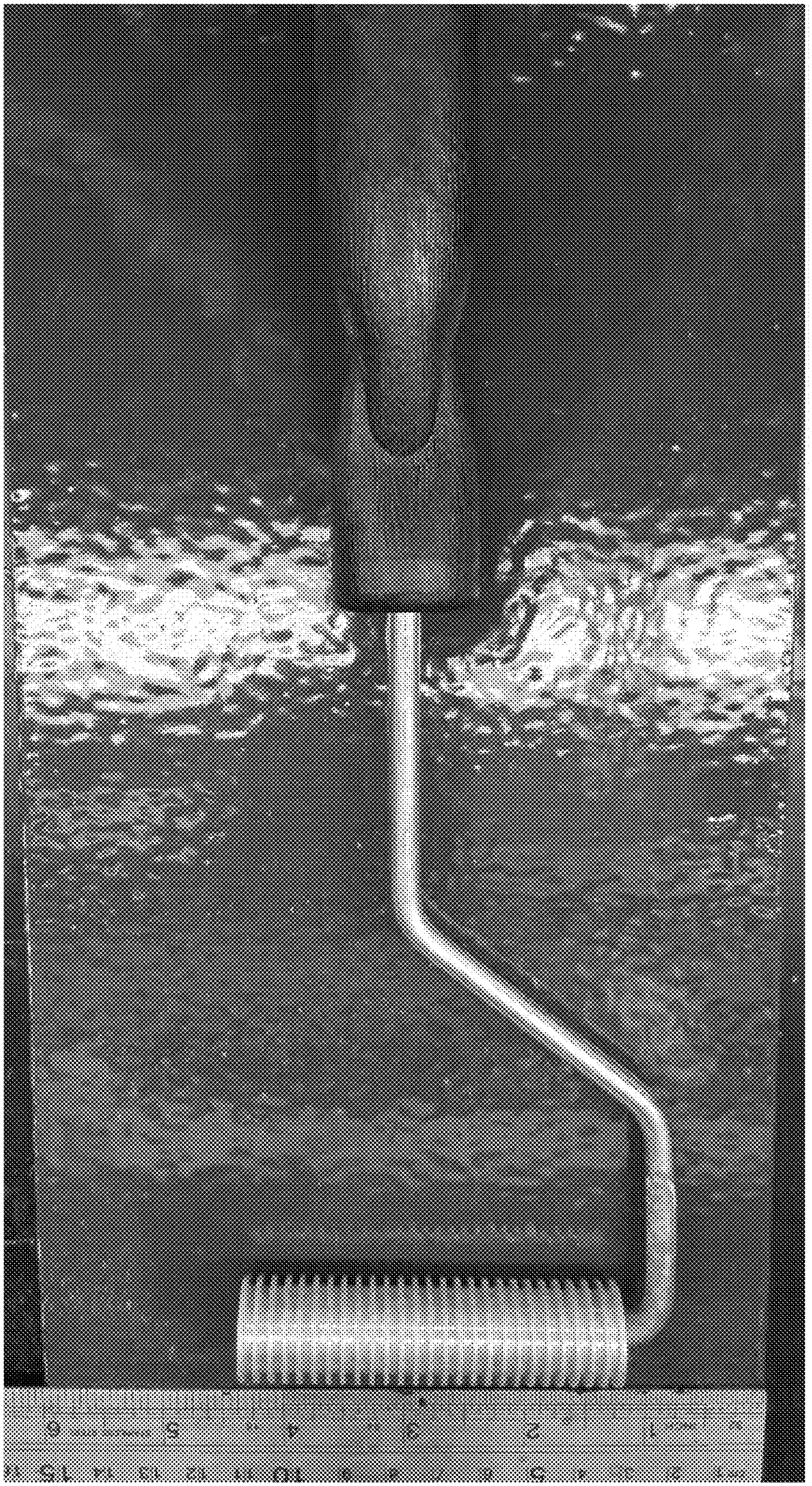
FIG. 30 is a photograph of the metallic roller used to apply the nonskid coatings.

One exemplary method of applying the coatings to a substrate is via a roller (FIG. 30).

Example 2: Impact Testing

Figure 31:
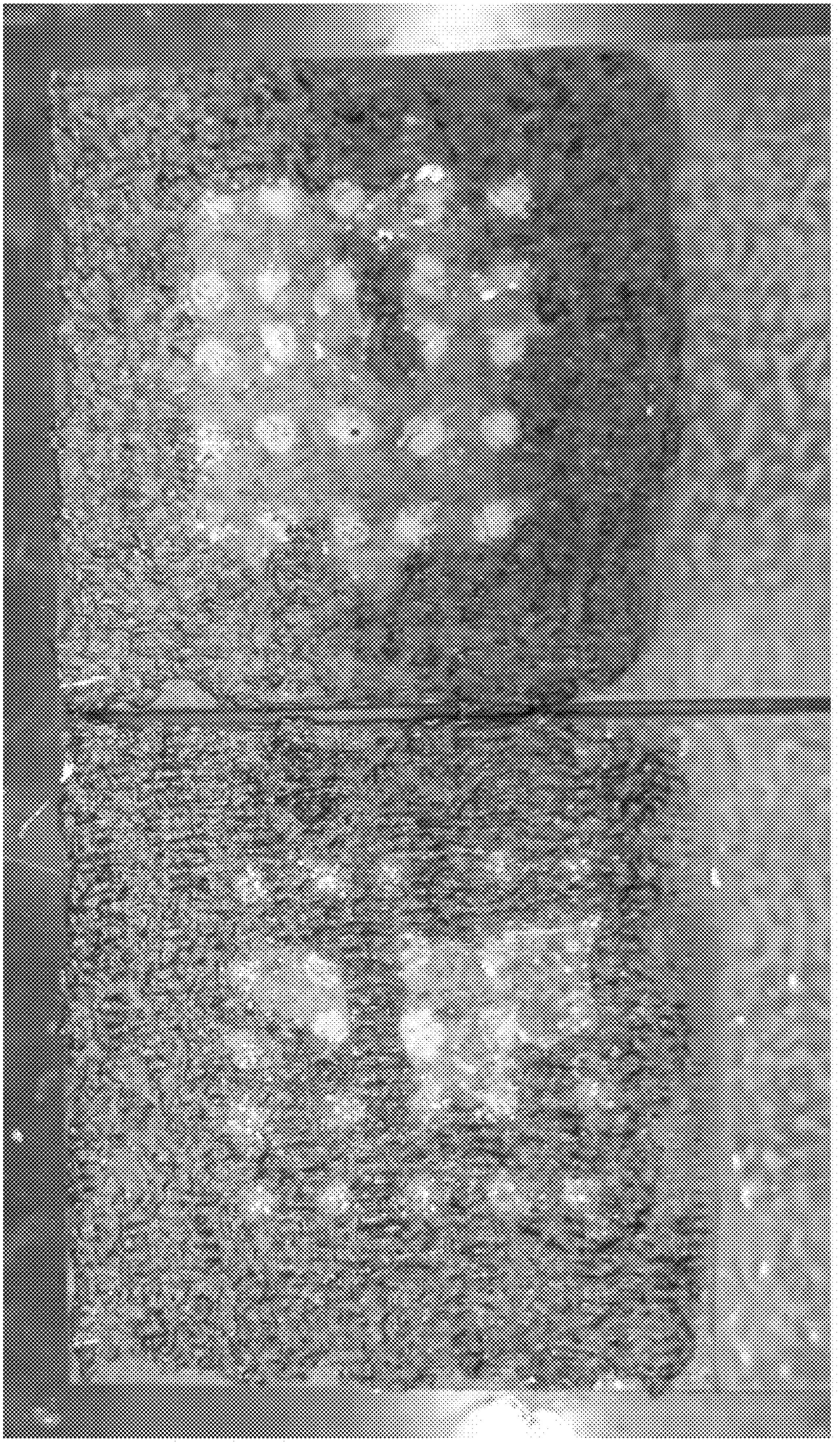
FIG. 31 is an image of the results of an impact test with exemplary Zoltek® PX35 non-skid coatings that were applied via roller. The panel on the left scored a 52.5 while the panel on the right scored a 15.

FIG. 31 shows two coatings formed from the milled carbon fiber non-skid formulations (including 100 phr aluminum oxide) after the impact test. Neither coating meets the required specification and the score range is very large (52.5 vs 15). The large discrepancy in the scores could be due to defects in the coatings. The impact test is done in a certain order and removal of the coating upon impact tends to exacerbate the removal of additional coating on further impacts. The coating that scored a 52.5 did not have any failure before impact 22 while failure occurred on impact 5 in the coating that scored a 15. Failure at this earlier impact led to the removal of coating in subsequent impacts. This poor and inconsistent performance was attributed to the high loading of the aluminum oxide. This loading led to increased brittleness of the coating and therefore poor impact resistance. To improve impact resistance, the amount of aluminum oxide was reduced from 100 to 25 phr.

Figure 32:
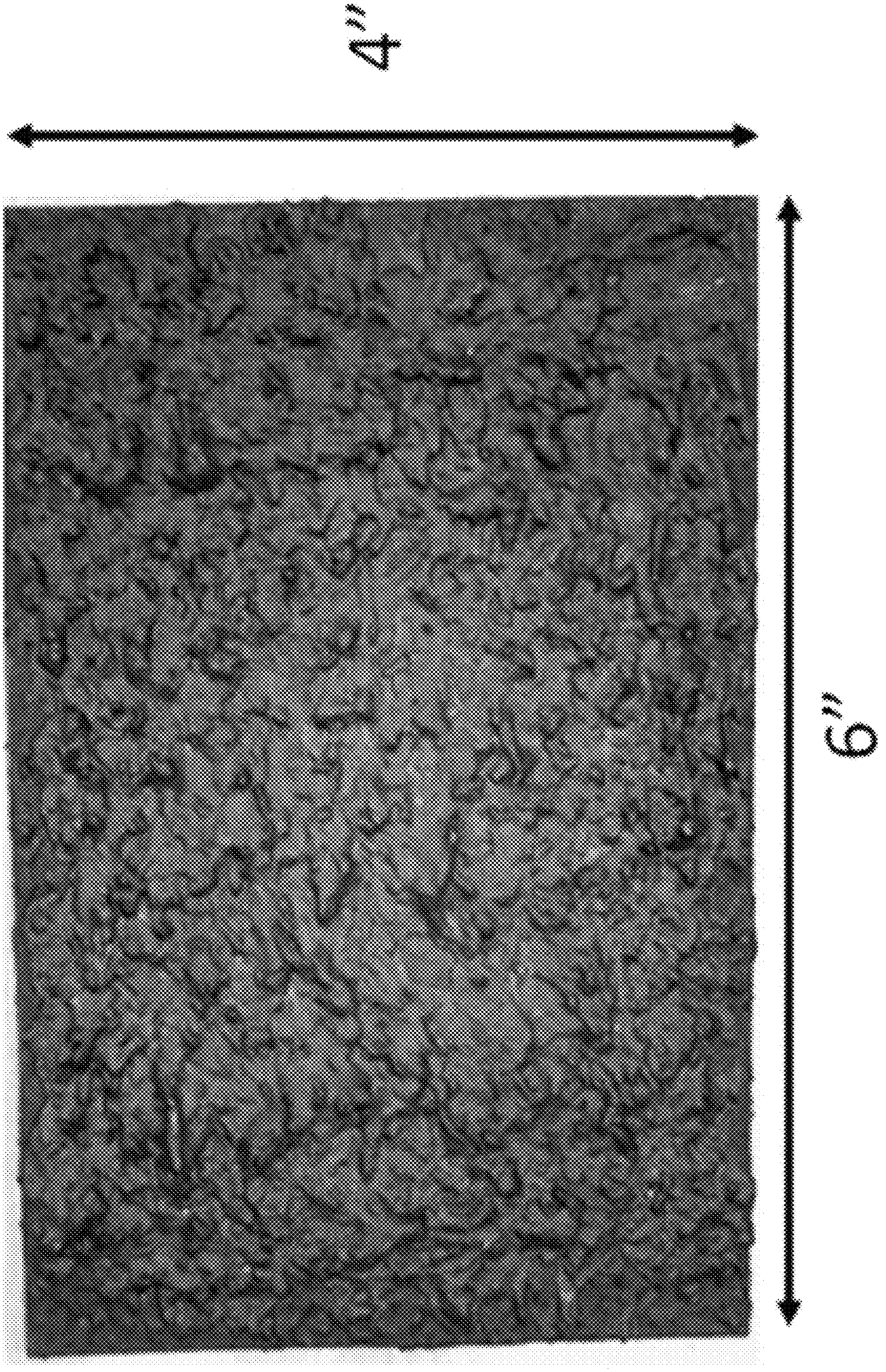
FIG. 32 depicts a nonskid formed using 25 phr of aluminum oxide and applied with a roller.
Figure 33:
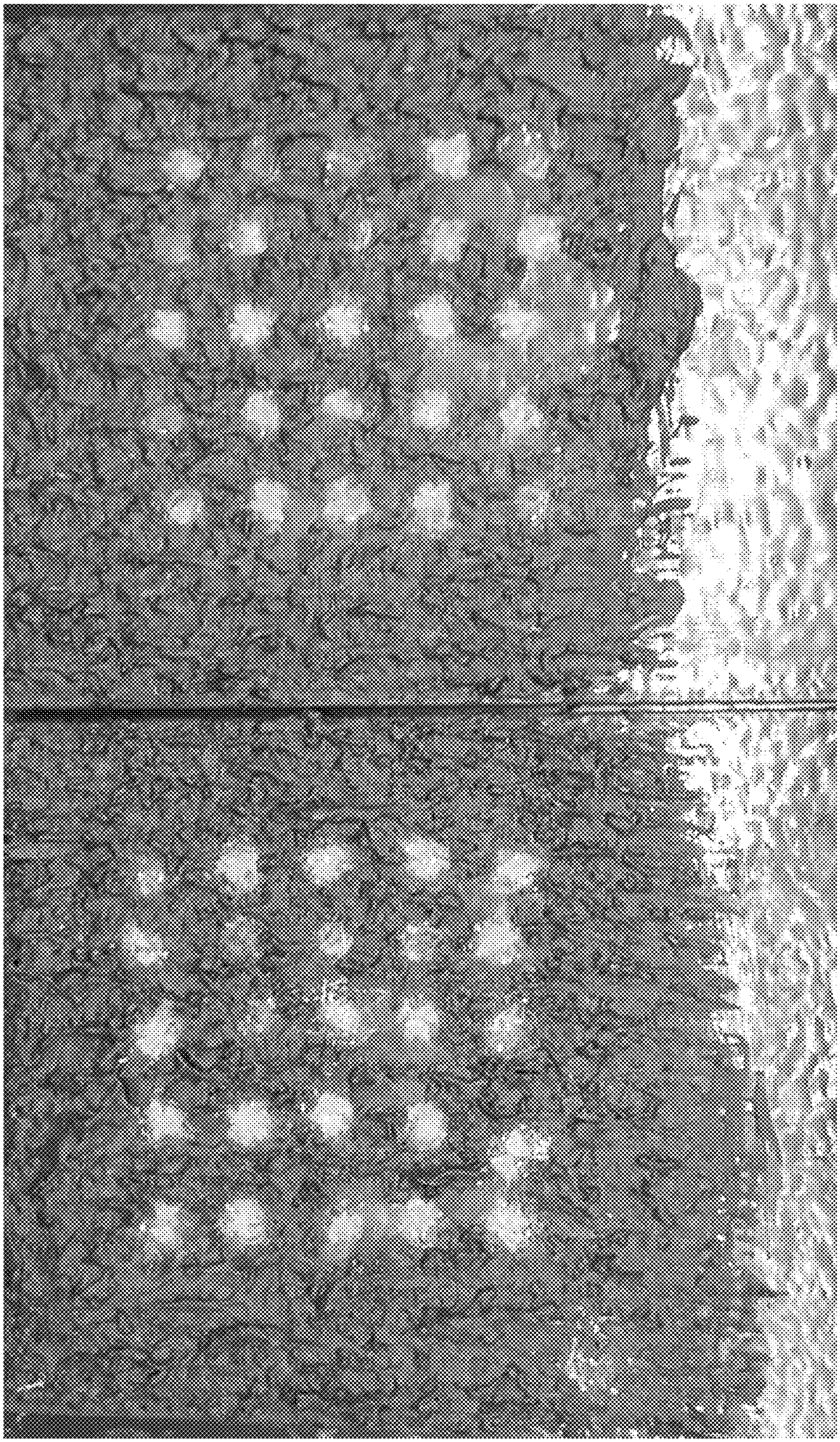
FIG. 33 depicts nonskid coatings containing Zoltek® PX35 and aluminum oxide (25 phr) after impact test. The coating on the left scored a 77.5 and the coating on the right scored an 87.5.

The previous non-skid formulations utilize 100 phr of the aluminum oxide. This large amount may be causing the coating to be more brittle and therefore decreasing the impact resistance. To determine if this is the case, the non-skid loading was reduced to 25 phr (FIG. 32). Data for the 25 phr aluminum oxide coatings prior to the impact test are presented in Table 10. The results of the impact test for milled carbon fiber formulations are shown in FIG. 33. In one case, the impact score was 77.5; in the other, 87.5. The score was significantly higher in comparison to the samples having 100 phr aluminum oxide, and it was more consistent.

TABLE 10

Data for nonskid (25 phr aluminum oxide) for impact test

| Parameter | Nonskid 1 | Nonskid 2 | Average |
|---|---|---|---|
| Initial Substrate Temp (° C.) | 24 | 24 | 24 |
| Front Start Temp of Substrate (° C.) | 54 | 58 | 56 |
| Substrate Temp at End of Cure (° C.) | 167 | 181 | 174 |
| Front Start Time (mins) | 0.900 | 0.967 | 0.933 |
| Total Cure Time (mins) | 5.43 | 8.67 | 7.05 |

As shown in Table 11, the cure times were in the 6-minute range while most of the fronts started before 1 minute of irradiation from the heater. The cure kinetics did not change significate from the nonskid coating containing 100 phr of aluminum oxide.

TABLE 11

Nonskid coating with 25 phr of aluminum oxide

| Panel Number | Front Start Time (mins) | Start Temp (° C.) | Cure Time (mins) |
|---|---|---|---|
| One | 0.950 | 99 | 6.50 |
| Two | 1.02 | 103 | 6.82 |
| Three | 0.667 | 86 | 6.53 |
| Average | 0.879 +/− 0.189 | 96 +/− 9 | 6.62 +/− 0.18 |

The results in FIG. 33 show that reducing the amount of aluminum oxide will increase the impact resistance. The cure time of 7 minutes is similar to the cure times of the previous non-skids as are the temperatures.

Figure 34:
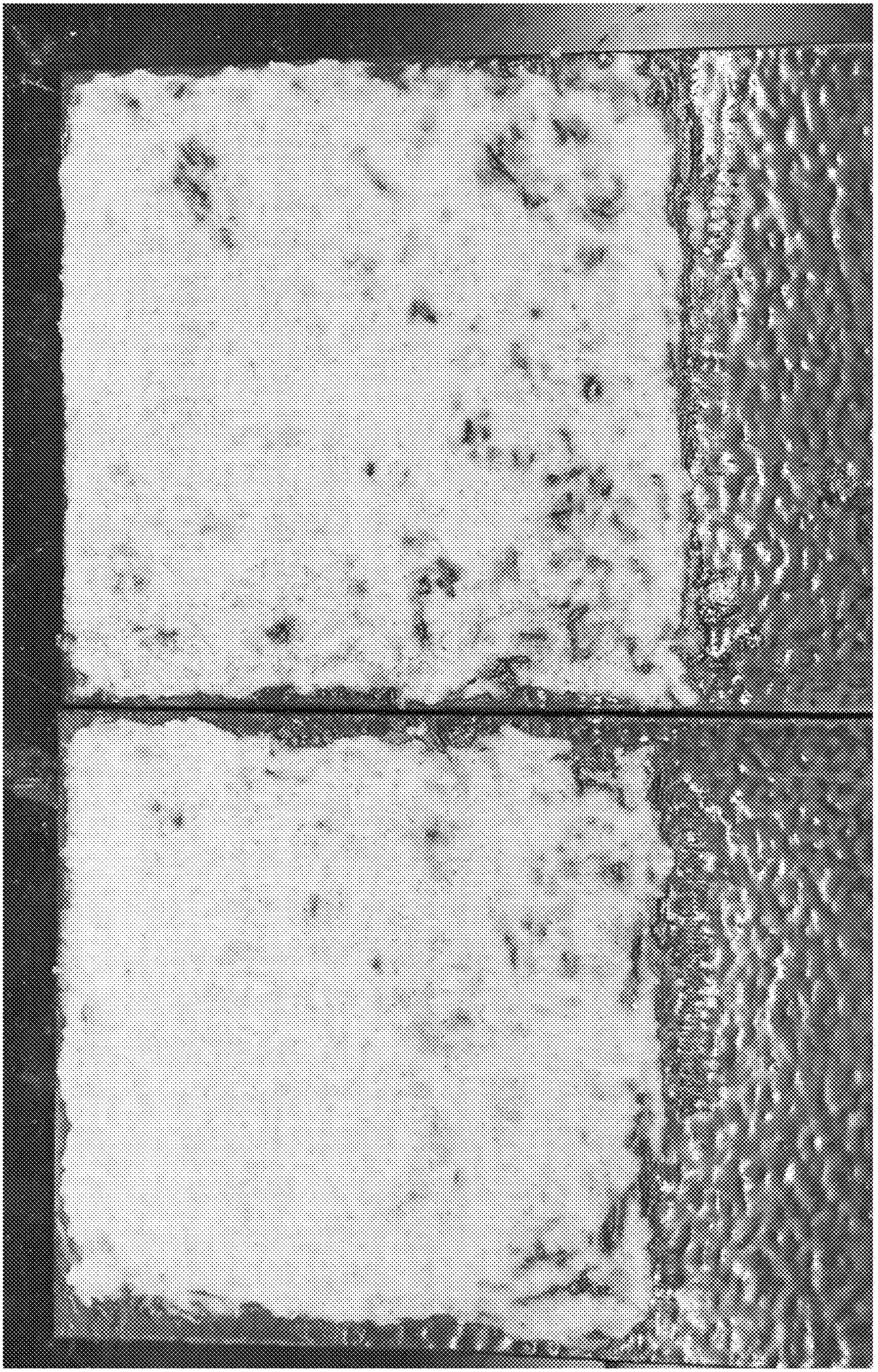
FIG. 34 is an image showing coatings formed from milled glass fiber non-skid formulation (100 phr of aluminum oxide).
Figure 35:
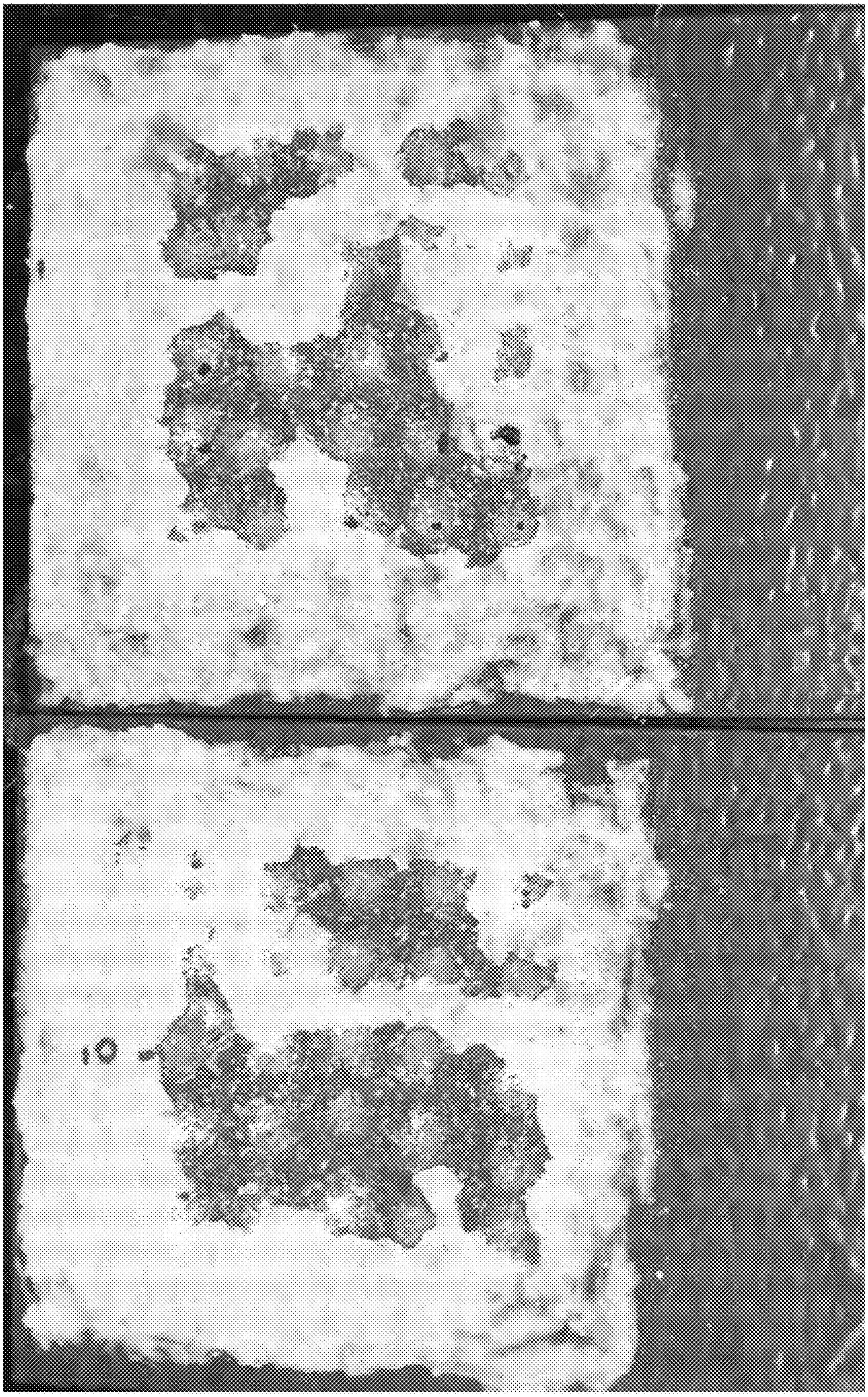
FIG. 35 shows the results of impact test on milled glass fiber nonskid. The coating on the left scored a 35 while the coating on the right scored a 32.

FIG. 34 shows the milled glass fiber non-skid coatings before the impact test. Despite the appearance, most of the 6"×6" area was coated. FIG. 35 shows the results of the impact test. The coating on the left scored a 35 while the coating on the right scored a 32.5. The average score of the two non-skilled glass milled fiber coatings is 34. In comparison, the milled carbon fiber coatings scored an average of 42.5. The impact scores for the two non-skids are similar; however, one Zoltek® PX35 non-skid scored a 70. More testing will need to be done but as of now, it appears that the Zoltek® PX35 (milled carbon fiber) is the better option with regards to impact resistance.

Table 9 shows that the cure time for the milled glass fiber nonskid is shorter in comparison to the milled carbon fiber nonskid. This may be due to the more nonskid surface of the coating formed in the latter. The valleys of the nonskid take longer to cure and this results in a longer cure time. In addition to having a more nonskid surface, the black color of carbon fiber may reduce the amount of pigment needed to meet the specified gray-blue color. As previously stated, the milled glass fiber also appears to not wet well with the resin. For these reasons, milled carbon fiber is the preferred additive for this application.

TABLE 9

Data for non-skid (100 phr milled glass fiber)

| Parameter | Nonskid 1 | Nonskid 2 | Average |
|---|---|---|---|
| Initial Substrate Temp (° C.) | 24 | 24 | 24 |
| Front Start Temp of Substrate (° C.) | 85 | 89 | 87 |
| Substrate Temp at End of Cure (° C.) | 139 | 156 | 148 |
| Front Start Time (mins) | 1.95 | 1.92 | 1.94 |
| Total Cure Time (mins) | 4.28 | 5.32 | 4.8 |

Figure 36:
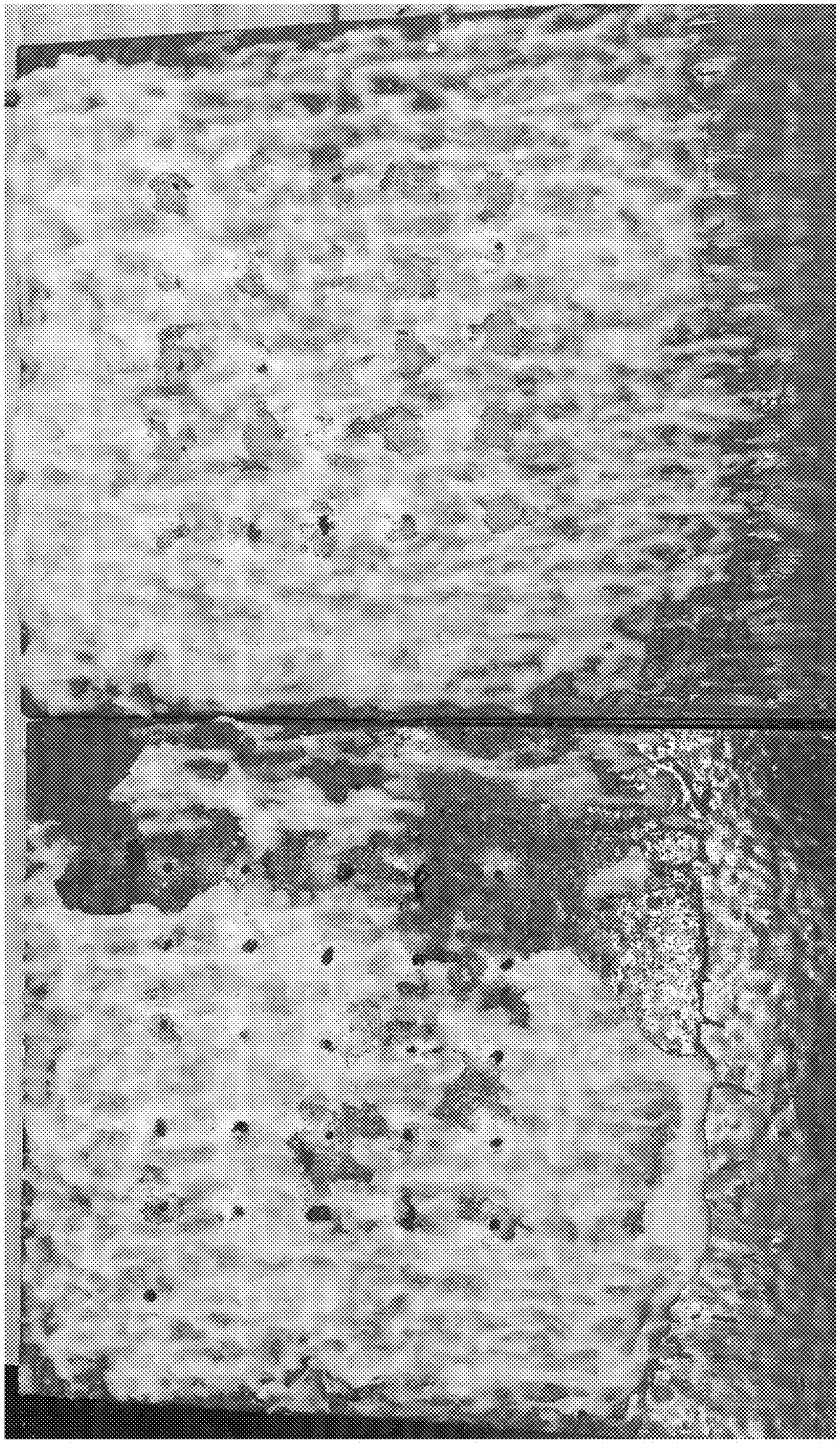
FIG. 36 depicts nonskid coatings containing milled fiber and aluminum oxide (25 phr) after impact tests. The coating on the left scored 72.5% and the one on the right scored 97.5%.

Reducing the aluminum oxide loading from 100 to 25 phr was also tested using milled glass fiber instead of milled carbon fiber. As shown in FIG. 36, the nonskid coatings scored 72.5% and 97.5% on the impact test (this gives an average of 85%). Like the Zoltek® nonskid, reducing the aluminum oxide loading resulted in a significant improvement in impact resistance. Despite this improvement, the inconsistency between the two scores along with the previously mentioned wetting issue hinders this milled glass fiber as a filler in this nonskid. Table 12 provides temperature and cure time for the panels prior to the impact test.

TABLE 12

Temperature and cure time data for milled glass fiber nonskid and aluminum oxide (25 phr)

| Parameter | Nonskid 1 | Nonskid 2 | Average |
|---|---|---|---|
| Initial Substrate Temp (° C.) | 23 | 23 | 23 |
| Front Start Temp of Substrate (° C.) | 80 | 70 | 75 |
| Substrate Temp at End of Cure (° C.) | 187 | 168 | 178 |
| Front Start Time (mins) | 1.33 | 1.73 | 1.53 |
| Total Cure Time (mins) | 8.15 | 7.37 | 7.76 |

Example 3: Corrosion Tests

Figure 37:
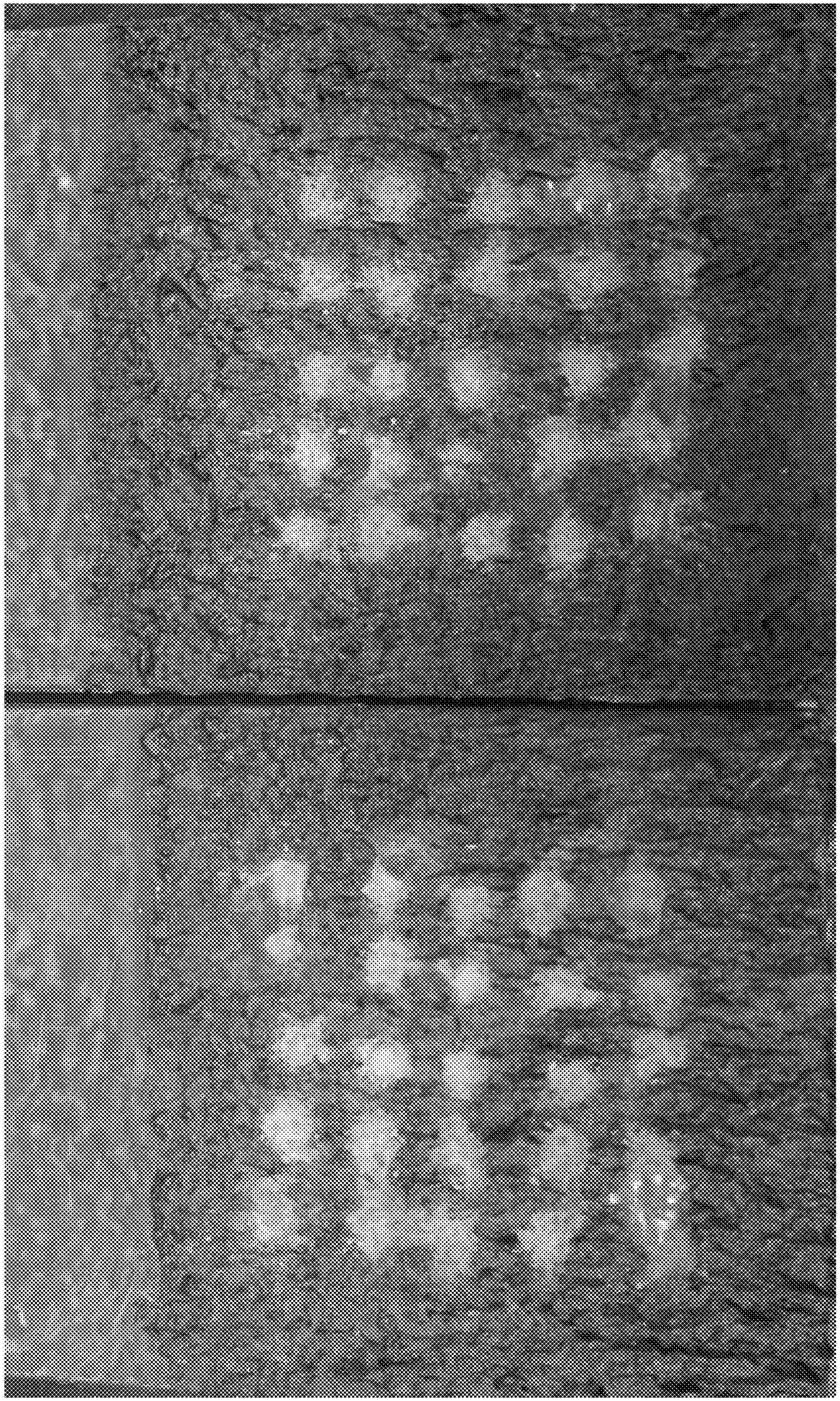
FIG. 37 depicts nonskid coatings containing milled carbon fiber after impact test. both coatings were submerged in synthetic salt water (ASTM D1141) for 15 days prior to testing and each scored 87.5%.
Figure 38:
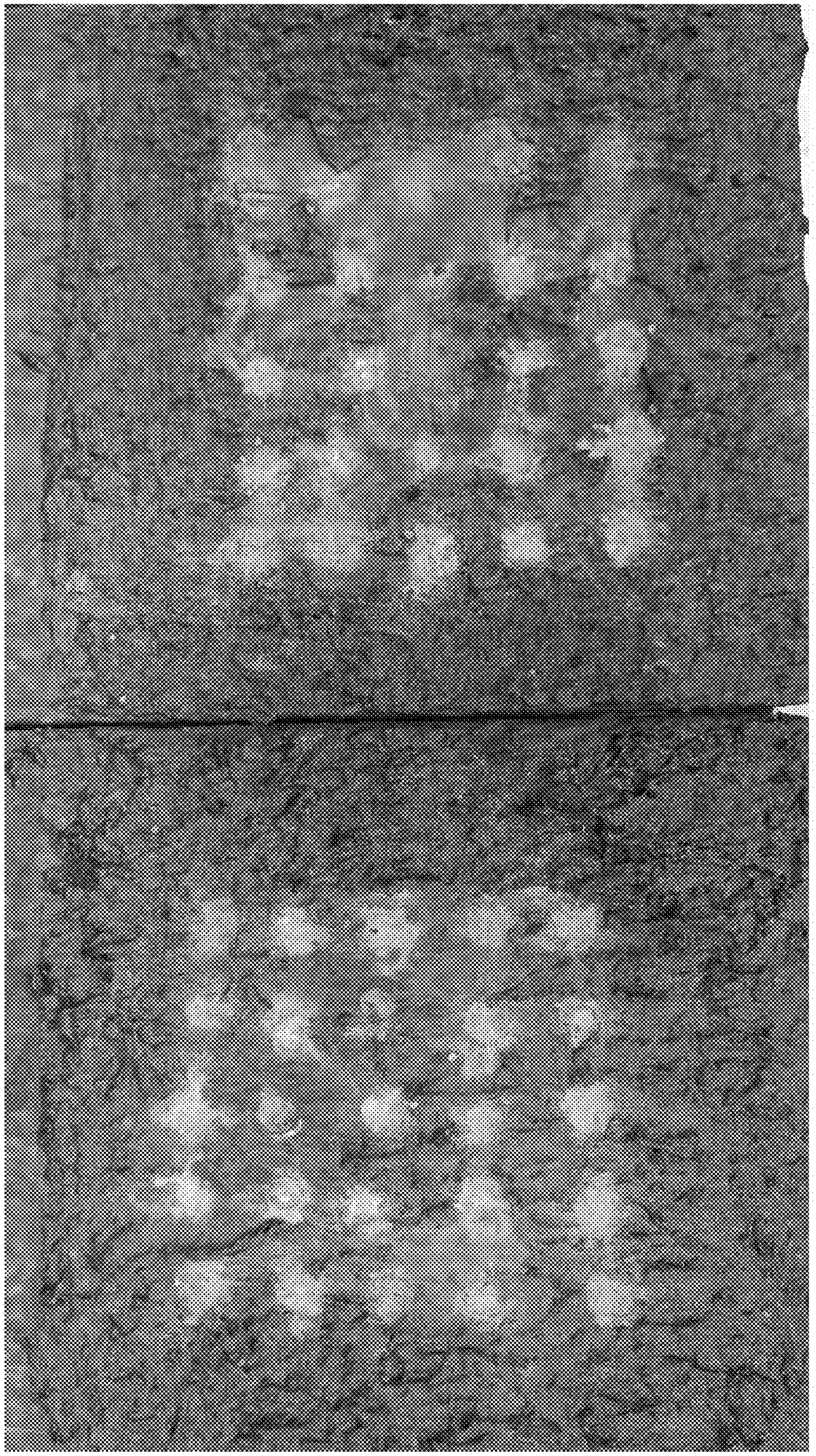
FIG. 38 depicts nonskid coatings containing milled carbon fiber after impact test. the coating on the left scored 57.5% and the coating on the right scored 35%. Both coatings were submerged in synthetic salt water (ASTM D1141) for 15 days prior to testing.
Figure 39:
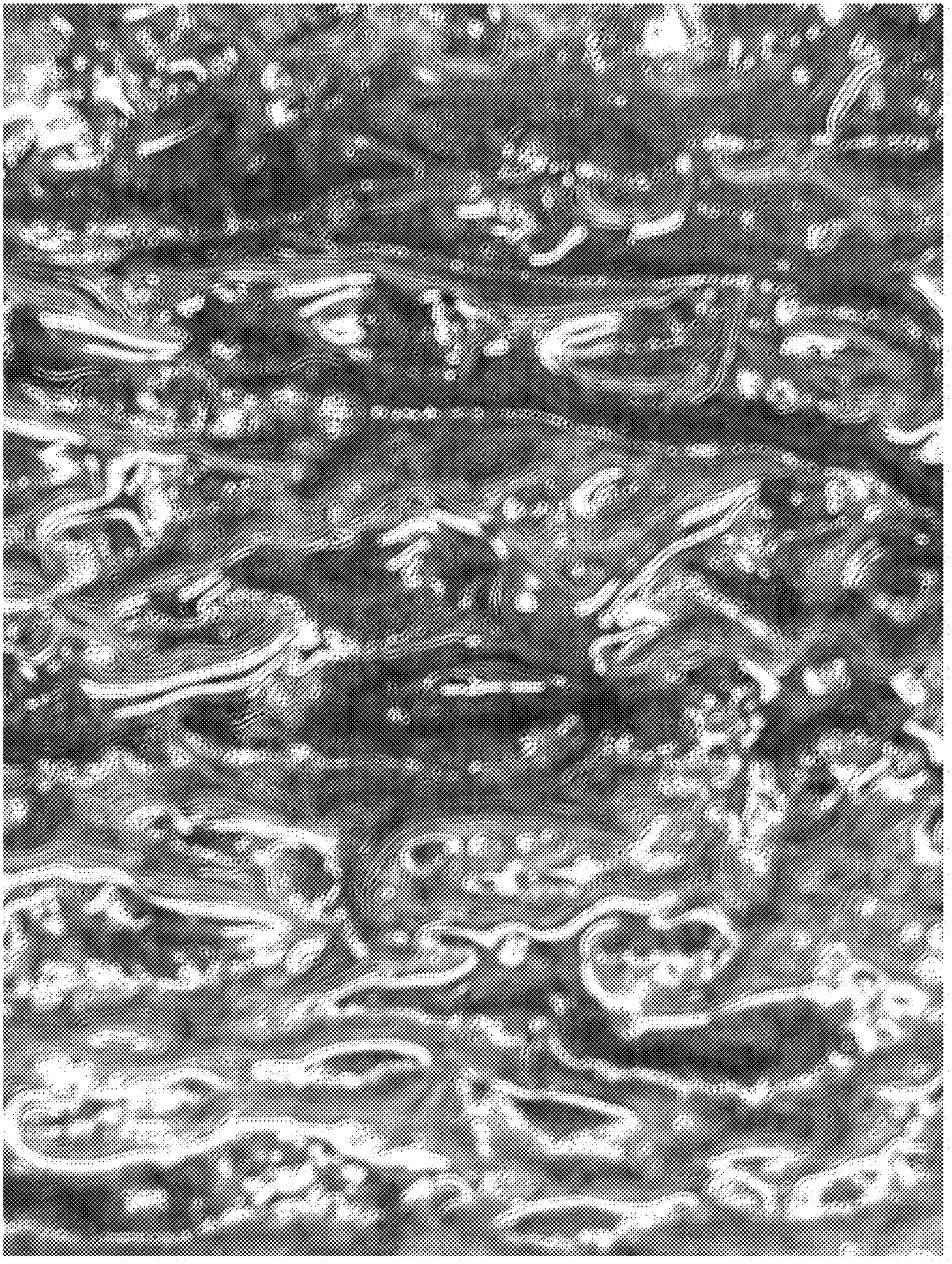
FIG. 39 is a close-up showing an example of a hole present on one of the non-skid coatings after treatment with synthetic salt water (ASTM D1141) for 15 days.

Four milled carbon fiber nonskid panels were submerged in synthetic sea water (ASTM D1141) for a total of 15 days. Two of the nonskid coatings scored the same as the untreated nonskid (FIG. 37). The other two treated nonskid coatings showed a large reduction in the impact resistance; however, both coatings had defects such as holes and corrosion within the impact zone (FIG. 38). FIG. 39 shows an example of a defect after the nonskid was treated. The lower impact score is likely due to the penetration of water into the holes of the nonskid. The presence of the sea water may have disrupted the adhesion between the nonskid and the primer and this resulted in larger areas of removal upon impact. This is also evident by the lack of primer on the nonskid that was removed during impact. These defects likely occurred during the application; it is therefore important to ensure ample coverage when applying the nonskid. These results demonstrate that the nonskid can maintain impact resistance after treatment with seawater as long as noticeable defects are not present.

Figure 40:
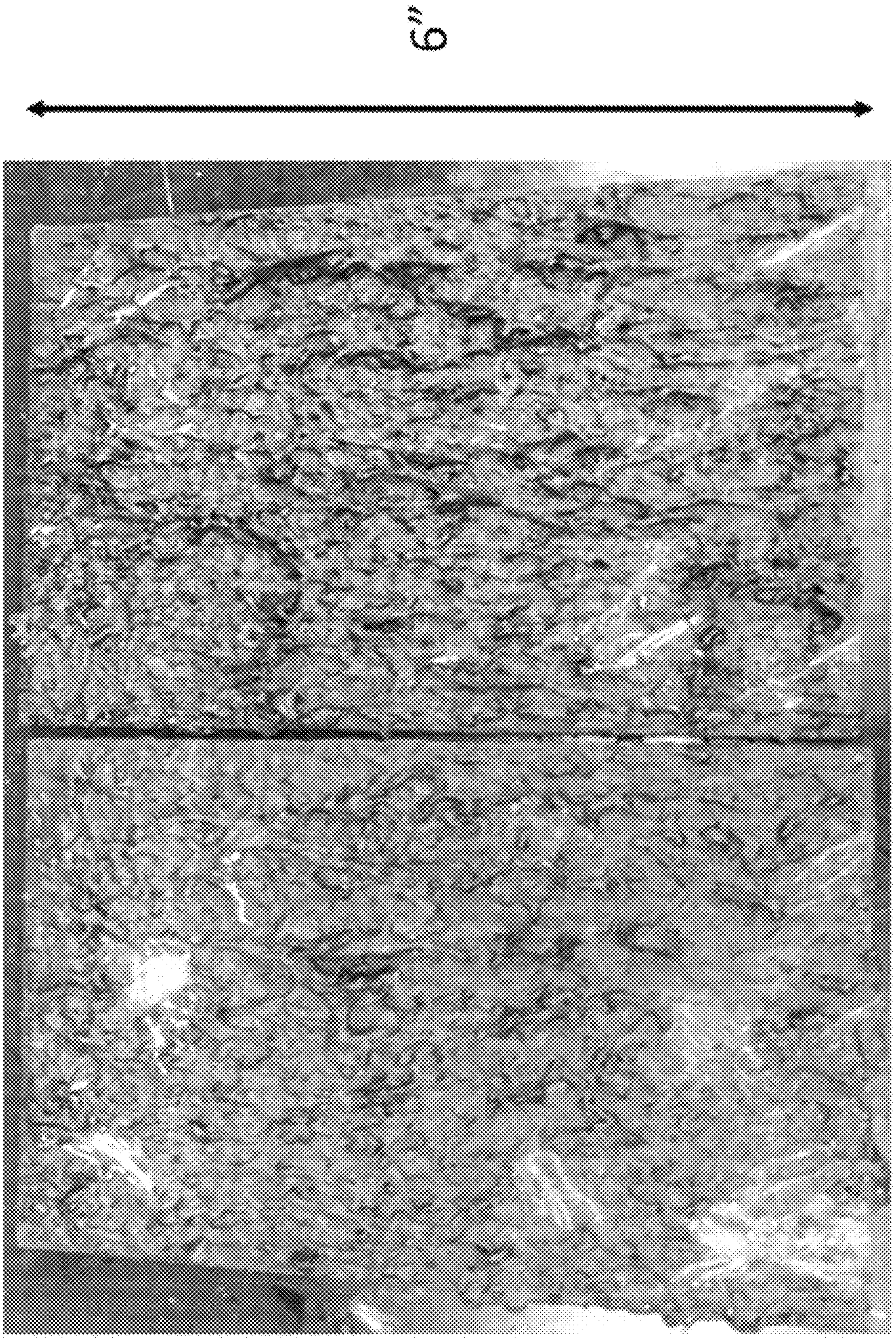
FIG. 40 depicts a nonskid after being submerged in seawater for a month and undergoing the qualitative chemical resistance test.

The nonskid coatings showed no delamination or softening upon being submerged in the various chemicals. No differences between such properties were observed between the submerged and non-submerged areas and the impacted and non-impacted coating. Table 13 lists various chemicals tested. These results demonstrate the good chemical resistance performance of the nonskid. As an example, FIG. 40 shows the result of the qualitative test after being submerged in natural seawater for four weeks. The corrosion present isn't of concern as it only occurred in the impact zone and in areas where the coating was not applied.

TABLE 13

| Results of qualitative chemical testing on nonskid | | |
|---|---|---|
| Chemical | Time Submerged | Result |
| Ethanol | 24 hours | Pass |
| Natural Seawater | 4 weeks | Pass |
| Detergent | 4 weeks | Pass |
| Deicing/Defrosting Fluid | 24 hours | Pass |
| Motor Oil | 4 weeks | Pass |

Example 4: Increasing Scale of System

Figure 41:
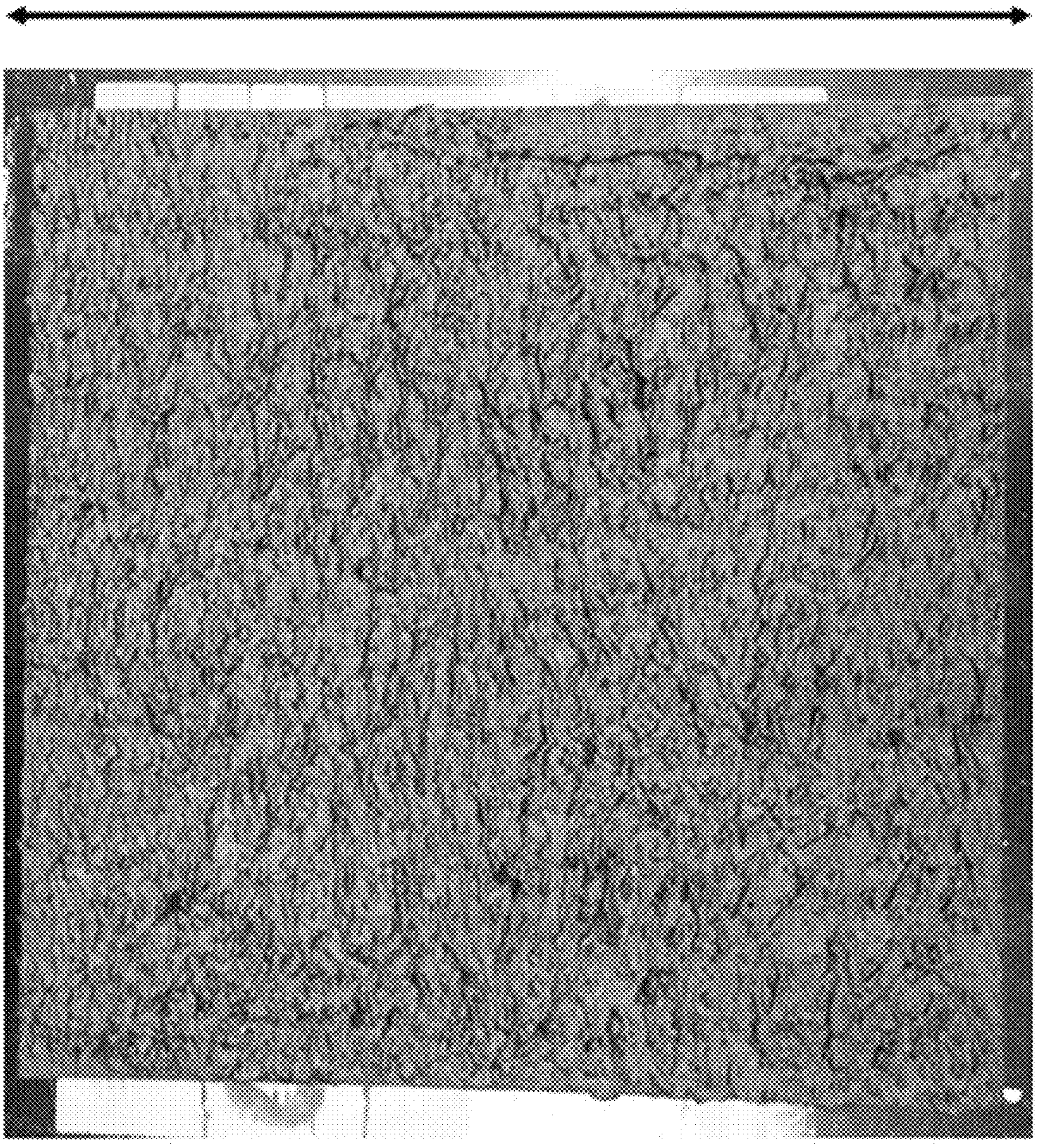
FIG. 41 depicts a nonskid cured on 12"×12" steel panel.

Scaling up the nonskid from 6"×6" and 6"×4" coverage to 12"×12" (FIG. 41) is a challenge, as the current infrared heater only covers an area of approximately 36 $in^2$. The coating will cure after around 7 minutes under such an area, but additional passes are required to completely cure the coated panel. Given the additional passes, areas of the coating are exposed to heat longer which results in additional thermal stresses and cracking. Minor repairs to the coatings were necessary before corrosion testing.

Figure 42:
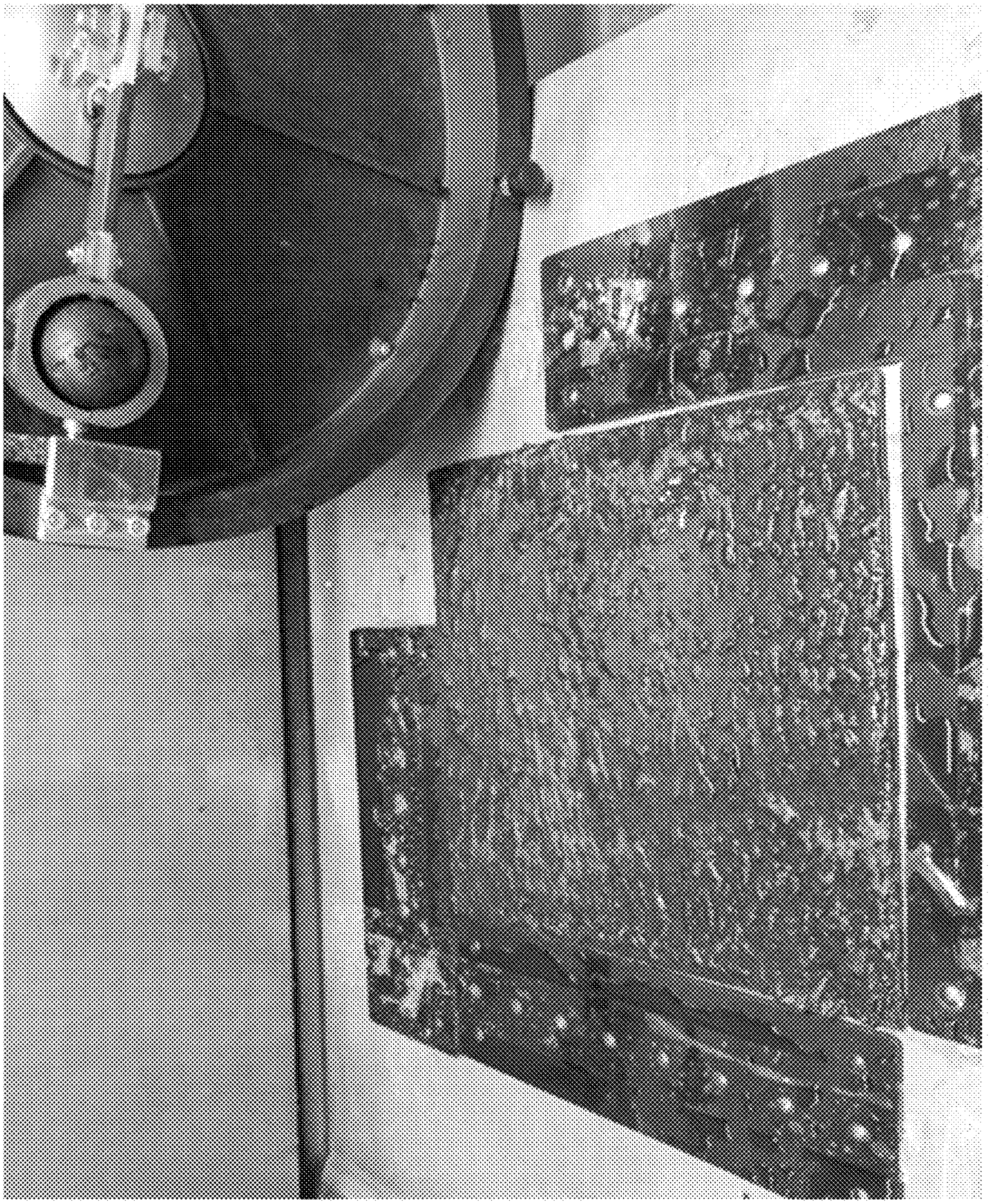
FIG. 42 depicts nonskid coatings after undergoing coefficient of friction testing.

FIG. 42 shows the nonskid panels after the coeffect of friction (COF) test. The instrument shown uses a revolving arm with a constant weight (the ball) to determine the COF. The COF value required to pass are 1.4 (dry) and 1.1 (wet) according to the MIL-PRF-24667D specification. The results in Table 13 demonstrate that the nonskid exceeding the passing requirements which allow room for further optimizing of the formulation. The impact test results demonstrated that decreasing the aluminum oxide loading increased the impact test resistivity. The aluminum oxide loading can be reduced further to improve the impact test while also meeting the required COF specifications.

TABLE 13

| Coefficient of friction values | | |
|---|---|---|
| Summary | Average COF Dry | Average COF Wet |
| Panel 1 | 1.81 | 1.50 |
| Panel 2 | 1.80 | 1.45 |

Figure 43:
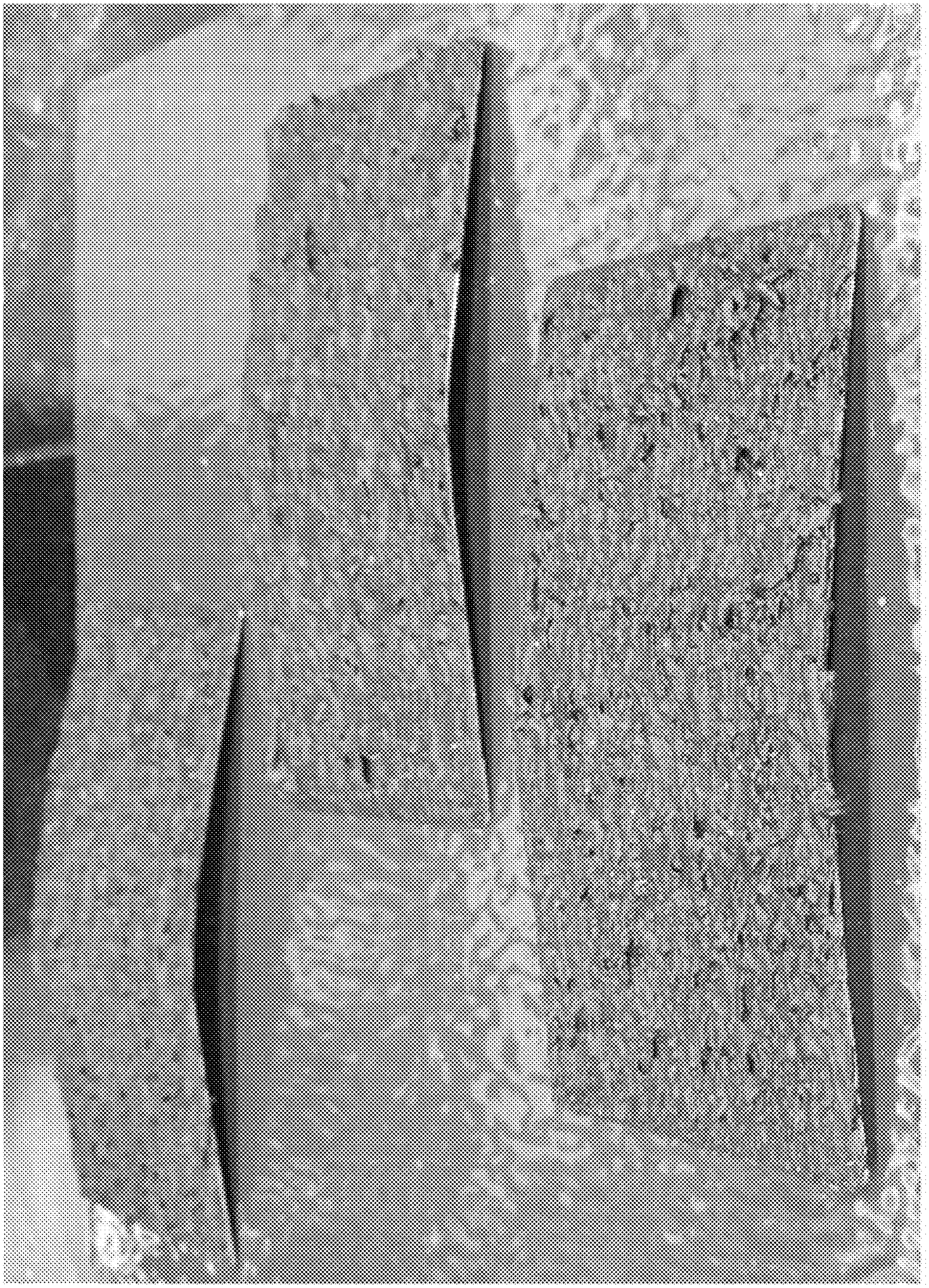
FIG. 43 depicts nonskid panels after mandrel bending.
Figure 44:
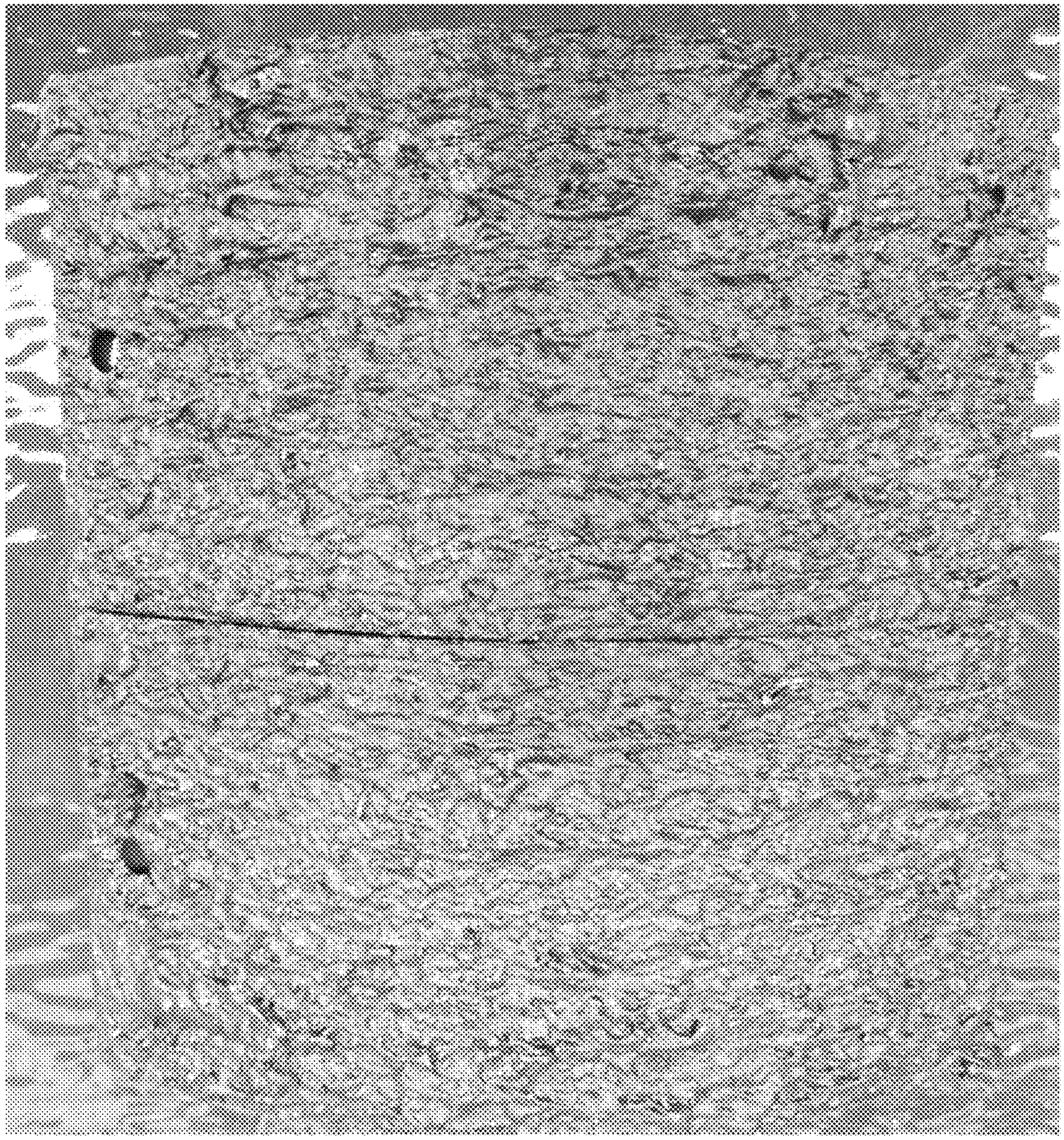
FIG. 44 depicts the surface of nonskid panels bent at 20° over a 5" mandrel.

Mandrel flexibility: The non-skid on average was able to bend 120 before the appearance of cracks. FIG. 43 shows the bent nonskid coatings. With this flexibility, the nonskid coatings can tolerate a reasonable amount of bend without failure such as cracking or delamination. As shown in FIG. 44, delamination is not present even if the coatings are bent to the maximum 200 over the mandrel. Cracking is minor even at these bends. The data in table 3 shows that the cure time is dramatically lower (less than 1 minute) in comparison to the non-skid applied on the other panels. This lower cure time can be attributed to a reduction in heat loss to these thinner steel panels.

CONCLUSIONS

A base formulation consisting of a bisphenol A epoxy acrylate mixture and PETIA was optimized for cure time and properties using various fillers. Fumed silica (5 phr) was added to eliminate convection thereby allowing frontal polymerization. Other parameters such as wet film thickness, resin composition, and distance between the heater and substrate were tested for optimization of the coating. Milled carbon fiber was added to eliminate cracking, provide a non-skid appearance, and enhance impermeability of the coating. The resulting base formulation had a cure time in the 5-minute range when applied as a 40-mil thick coating.

Aluminum oxide was added to the base formulation to provide a desirable non-skid texture. This combination allowed for the development of a cure-on-demand high solids non-skid coating for corrosion protection on marine vessels. The coating has an average cure to service time in the 7-minute range and curing starts when the surface of the steel panel exceeds 54° C. The non-skid demonstrated impact resistance with average scores of 82.5% before and 87.5% after treatment in synthetic seawater. Qualified chemical testing demonstrated a wide range of resistance to chemicals such as ethanol and motor oil. Mandrel bending indicates that the coating will not crack below a bend of 12° and delamination does not occur. It was also determined that the non-skid will cure more quickly when applied to thinner steel substrates. The non-skid meets military COF specifications and corrosion testing is currently ongoing. The current formulation demonstrates promise as a repair coating for non-skid decks on maritime vessels.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A resin composition comprising:

20-70 wt % of an aromatic di(meth)acrylate component; 5-25 wt % of a flexible di(meth)acrylate component; and 10-70 wt % of a crosslinker component;

wherein the resin composition further comprises:

0.1-10 phr initiator;

0.1-10 phr silica;

5-50 phr milled carbon fiber; and 10-100 phr non-skid component.

2. The composition of claim 1, wherein the aromatic di(meth)acrylate component comprises a bisphenol moiety selected from the group consisting of bisphenol A (4,4'-isopropylidenediphenol), bisphenol (p,p-methylenediphenol), bisphenol F (a mixture of 2,2'-, 2,4'-, and 4,4'-dihydroxydiphenylmethane), and bisphenol S (4,4'-dihydroxydiphenylsulfone).

3. The composition of claim 1, wherein the aromatic di(meth)acrylate component comprises a bisphenol A epoxy diacrylate, a bisphenol A epoxy dimethacrylate, ethoxylated bisphenol diacrylate, propoxylated bisphenol diacrylate, ethoxylated bisphenol A diacrylate, propoxylated bisphenol A diacrylate, ethoxylated bisphenol F diacrylate, propoxylated bisphenol F diacrylate, ethoxylated bisphenol S diacrylate, or propoxylated bisphenol S diacrylate.

4. The composition of claim 1, wherein the flexible di(meth)acrylate component comprises at least one diacrylate or dimethacrylate ester of a substituted or unsubstituted, linear or branched, diol selected from aliphatic diols containing 3 to 18 carbon atoms, polyalkylene ether glycols containing 3 to 50 carbon atoms, cycloaliphatic diols containing about 4 to 18 carbon atoms, and combinations thereof.

5. The composition of claim 1, wherein the flexible di(meth)acrylate component is selected from the group consisting of polyethylene glycol-200-diacrylate, polyethylene glycol-400-diacrylate, polyethylene glycol-600-diacrylate, glyceryl ethoxylate diacrylate, glyceryl propoxylate diacrylate, hexanediol diacrylate, hydroxypivalic acid neopentanediol diacrylate, monomethoxy trimethylolpropane ethoxylate diacrylate, pentaerythritol diacrylate, polycaprolactone diol diacrylate, polypropylene glycol diacrylate, propoxylated trimethylolpropane diacrylate, tetraethylene glycol diacrylate, tetraethylene glycol dimethacrylate, tetrapropylene glycol diacrylate, thiodiethanol diacrylate, triethylene glycol diacrylate, triethylene glycol dimethacrylate, trimethylolpropane diacrylate, trimethylolpropane ethoxy triacrylate, tripropylene glycol diacrylate, and combinations, oligomers, co-polymers, and block co-polymers thereof.

6. The composition of claim 1, wherein the crosslinker component comprises a multifunctional (meth)acrylate compound having three or more (meth)acrylate moieties.

7. The composition of claim 1, wherein the crosslinker component comprises two or more multifunctional (meth) acrylate compounds, each having three or more (meth) acrylate moieties.

8. The composition of claim 1, wherein the crosslinker component comprises a multifunctional (meth)acrylate compound selected from the group consisting of dimethylolpropane tetraacrylate, dipentaerythritol ethoxylate pentaacrylate, dipentaerythritol hexaacrylate, dipentaerythritol hexamethacry late, dipentaerythritol pentaacrylate, dipentaerythritol propoxylate pentaacrylate, ditrimethylolpropane ethoxylate tetraacrylate, ethoxy pentaerythritol triacrylate, ethoxy trimethylolpropane triacrylate, ethoxylated (15) trimethylolpropane triacrylate, ethoxylated (20) trimethylolpropane triacrylate, ethoxylated (3) trimethylolpropane triacrylate, ethoxylated (6) trimethylolpropane triacrylate, ethoxylated (9) trimethylolpropane triacrylate, ethoxylated glycerol triacrylate, ethoxylated pentaerythritol tetraacrylate, ethoxylated pentaerythritol triacrylate, glycerol propoxylate triacrylate, glycerol propoxylate trimethacrylate, glycerol triacrylate, glycerol trimethacrylate, glyceryl ethoxylate triacrylate, pentaerythritol tetraacrylate, pentaerythritol tetramethacrylate, pentaerythritol triacrylate, pentaerythritol trimethacrylate, sorbitol triacrylate, sorbitol trimethacrylate, sucrose pentaacrylate, sucrose tetraacrylate, sucrose triacrylate, trimethylolethane triacrylate, rimethylolpropane ethoxylate triacrylate, trimethylolpropane propoxylate triacrylate, and combinations, oligomers, co-polymers, and block co-polymers thereof.

9. The composition of claim 1, wherein the resin composition comprises: 40-50 wt % aromatic di(meth)acrylate component; 10-20 wt % flexible di(meth)acrylate component; and 30-50 wt % crosslinker component.

10. The composition of claim 1, wherein the silica component comprises fumed silica, precipitated silica, silica sol, silica gel, or pyrogenic silica.

11. The composition of claim 1, wherein the initiator comprises 1, 1-bis(t-butylperoxy)-3,3,5-trimethylcyclohexane.

12. The composition of claim 1, wherein the non-skid component comprises crushed/milled glass, silica, or aluminum oxide.

13. A polymerized coating disposed over a substrate, the coating comprising: 20-70 wt % aromatic di(meth)acrylate subunits; 5-25 wt % flexible di(meth)acrylate subunits; and 10-70 wt % crosslinker subunits; wherein the coating further comprises: 0.1-10 phr silica; 10-100 phr non-skid component; and 5-50 phr milled carbon fiber.

14. The coating of claim 13, wherein the coating further comprises a non-skid component selected from the group consisting of crushed/milled glass, silica, and aluminum oxide.

15. The coating of claim 13, wherein the substrate comprises steel from a maritime vessel.

16. The coating of claim 13, wherein the coating has a coefficient of friction greater than 1.7 when dry, and a coefficient of friction greater than 1.4 when wet.

17. The composition of claim 1, wherein the non-skid component comprises aluminum oxide.

18. The composition of claim 1, wherein the silica component is fumed silica.

19. The composition of claim 1, wherein the amount silica is 3-8 phr.

* * * * *